US008312184B2

(12) United States Patent
Ito et al.

(10) Patent No.: US 8,312,184 B2
(45) Date of Patent: Nov. 13, 2012

(54) PERIPHERAL DEVICE USABLE WITHOUT INSTALLING DRIVER IN COMPUTER BEFOREHAND

(75) Inventors: Kiyoshi Ito, Fujimi (JP); Hirokazu Higuchi, Fujisawa (JP); Ayaka Sato, Kashiwa (JP); Yuuki Taguchi, Chigasaki (JP)

(73) Assignee: Canon Denshi Kabushiki Kaisha, Chichibu-Shi, Saitama-Ken (JP)

( * ) Notice: Subject to any disclaimer, the term of this patent is extended or adjusted under 35 U.S.C. 154(b) by 32 days.

(21) Appl. No.: 12/942,956

(22) Filed: Nov. 9, 2010

(65) Prior Publication Data

US 2011/0125937 A1    May 26, 2011

(30) Foreign Application Priority Data

Nov. 25, 2009 (JP) ................................. 2009-267149
Mar. 12, 2010 (JP) ................................. 2010-056531

(51) Int. Cl.
G06F 3/00 (2006.01)
G06F 5/00 (2006.01)
G06F 12/00 (2006.01)
G06F 17/30 (2006.01)

(52) U.S. Cl. .................. 710/36; 710/8; 710/10; 710/13; 707/822

(58) Field of Classification Search .................... None
See application file for complete search history.

(56) References Cited

U.S. PATENT DOCUMENTS

| 5,640,592 | A   | * | 6/1997  | Rao ................................. 710/5      |
| 6,606,669 | B1  | * | 8/2003  | Nakagiri ....................... 719/327         |
| 7,010,624 | B1  | * | 3/2006  | Zhou et al. ...................... 710/8         |
| 7,142,317 | B2  |   | 11/2006 | Naito et al.                                     |
| 7,196,811 | B2  |   | 3/2007  | Naito et al.                                     |
| 2005/0038934 | A1 | * | 2/2005 | Gotze et al. ..................... 710/15        |
| 2005/0162688 | A1 | * | 7/2005 | Nakaoka et al. ............. 358/1.15             |
| 2008/0071935 | A1 | * | 3/2008 | Ohta ............................... 710/10       |
| 2008/0123135 | A1 | * | 5/2008 | Inoue .......................... 358/1.15         |
| 2009/0100444 | A1 | * | 4/2009 | Harris .......................... 719/321         |
| 2009/0109486 | A1 | * | 4/2009 | Kato et al. ................... 358/1.16          |
| 2009/0138650 | A1 | * | 5/2009 | Lin et al. ....................... 711/103        |
| 2009/0198839 | A1 | * | 8/2009 | Banerjee et al. ............... 710/10            |
| 2009/0240885 | A1 | * | 9/2009 | Adachi ......................... 711/115          |

FOREIGN PATENT DOCUMENTS

JP    2001-008002 A    1/2001
JP    2004-334449 A    11/2004

OTHER PUBLICATIONS

U.S. Appl. No. 12/989,409, filed Oct. 22, 2010, Ochiai, et al.
U.S. Appl. No. 12/827,580, filed Jun. 30, 2010, Taguchi, et al.

* cited by examiner

Primary Examiner — Kris Rhu
(74) Attorney, Agent, or Firm — Fitzpatrick, Cella, Harper & Scinto

(57) ABSTRACT

The storage unit of a peripheral device has a first storage area and a second storage area. The first storage area stores a plurality of control programs corresponding to a plurality of operating systems of different types. The second storage area is a storage area which is recognized by an information processing apparatus as an external storage device and in which at least one control program is replicated from the first storage area. The information processing apparatus reads out the control program from the second storage recognized by it as the external storage device, and executes the program. The information processing apparatus thus controls the peripheral device.

20 Claims, 32 Drawing Sheets

FIG. 15

Capture Application

| | |
|---|---|
| MODE | MONOCHROME ▶ |
| PAPER SIZE | A4-210×297mm ▶ |
| RESOLUTION | 300dpi ▶ |
| READING SURFACE | DOUBLE-SIDED ▶ |
| FILE NAME | test 1 ▶ |
| OS NAME | ACTIVATE BY Windows ▶ |

SCAN — 301

CANCEL

F I G. 26

```
Setting.dat                                    ☒

[DefaultSetting]
UserName=NULL
Mode=MONOCHROME
PaperSize=A4
Resolution=300
ReadSide=DOUBLE-SIDED
FileName=test1
DisplayImage=TRUE

[UserSetting]
UseName=User1
Mode=256 GRAY
PaperSize=A3
Resolution=600
ReadSide=SINGLE-SIDED
FileName=test2
DisplayImage=FALSE UseName=User2
Mode=COLOR
PaperSize=B5
Resolution=200
ReadSide=DOUBLE-SIDED
FileName=test3
DisplayImage=TRUE
```
~212

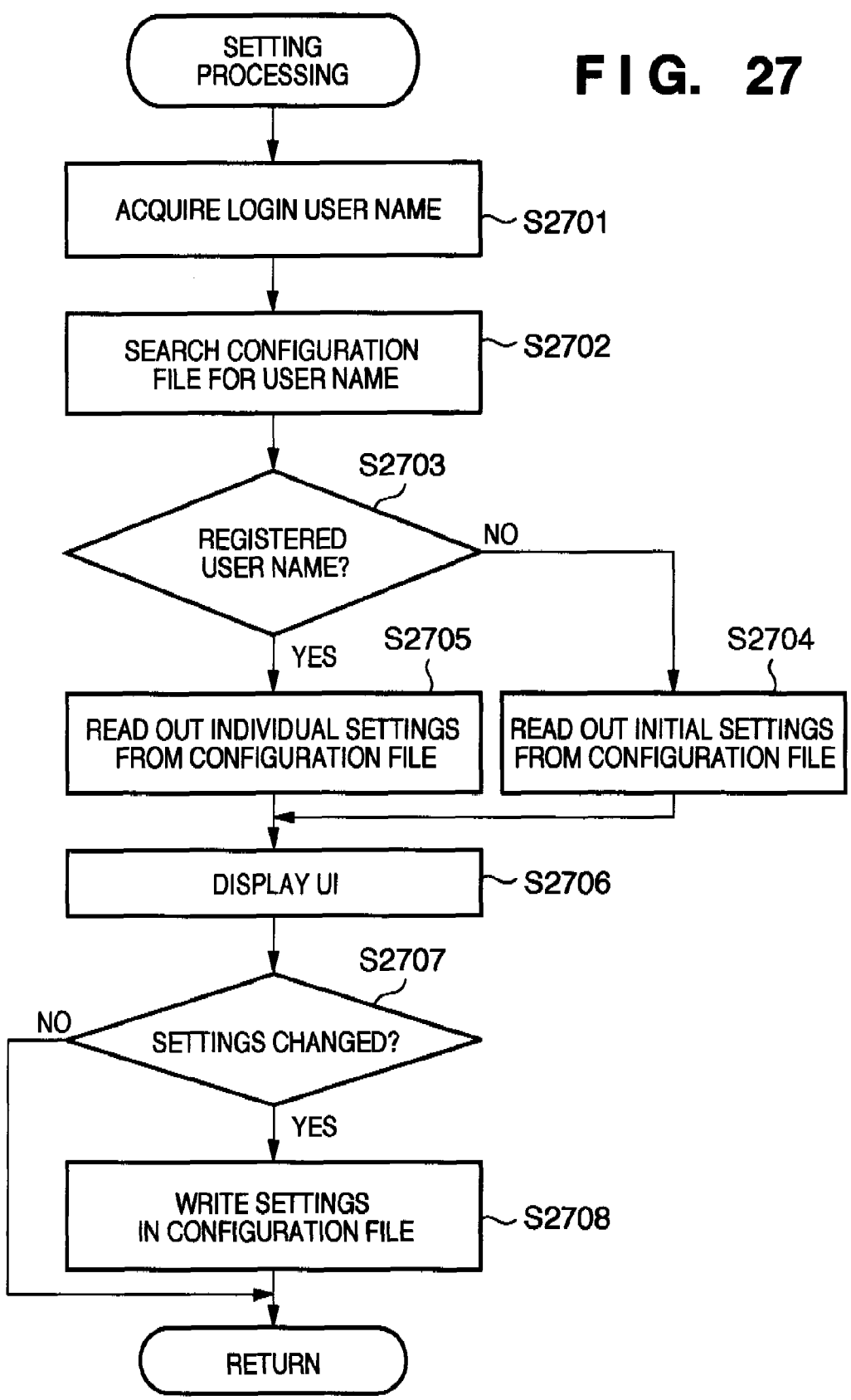

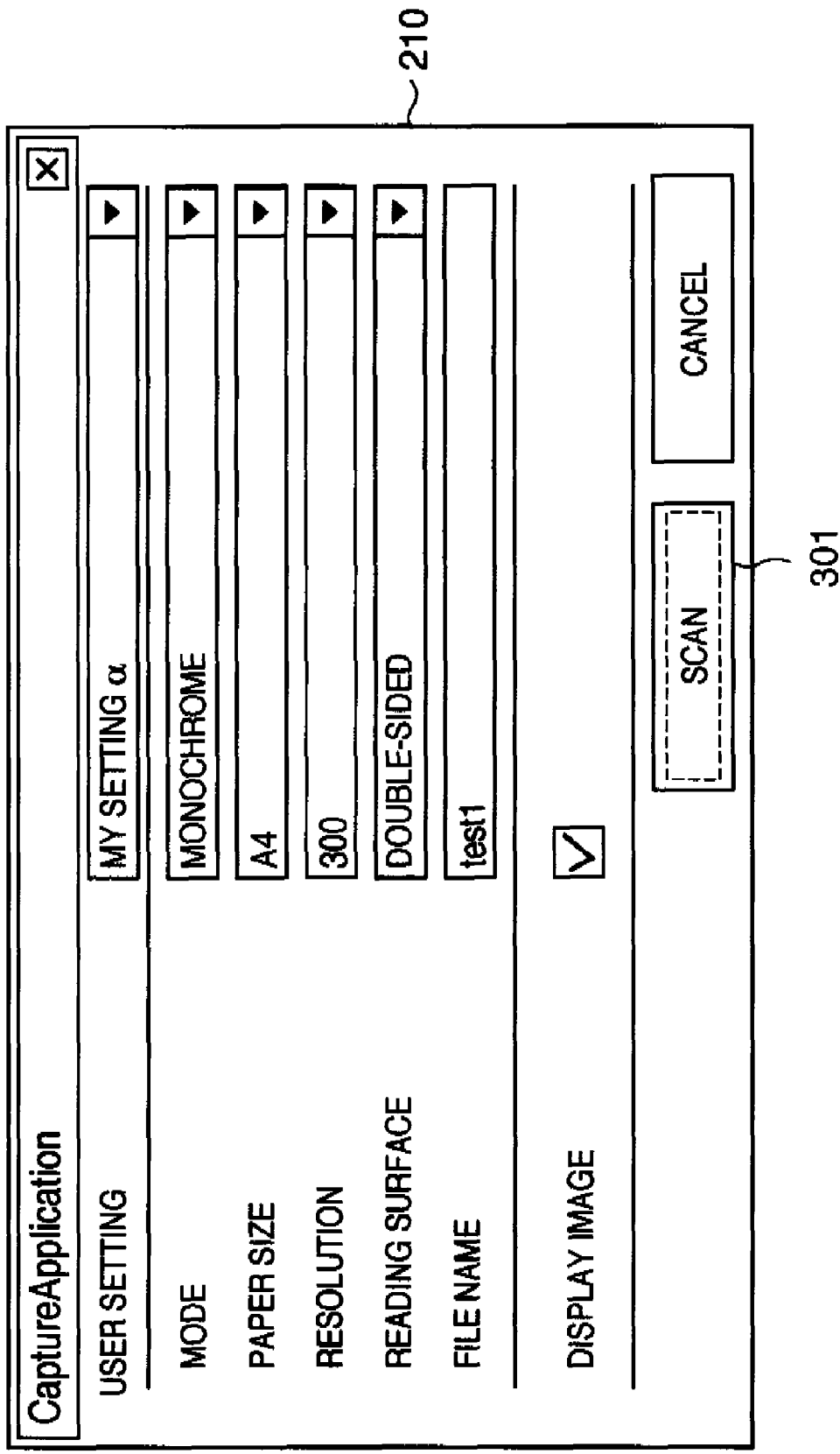

F I G. 32
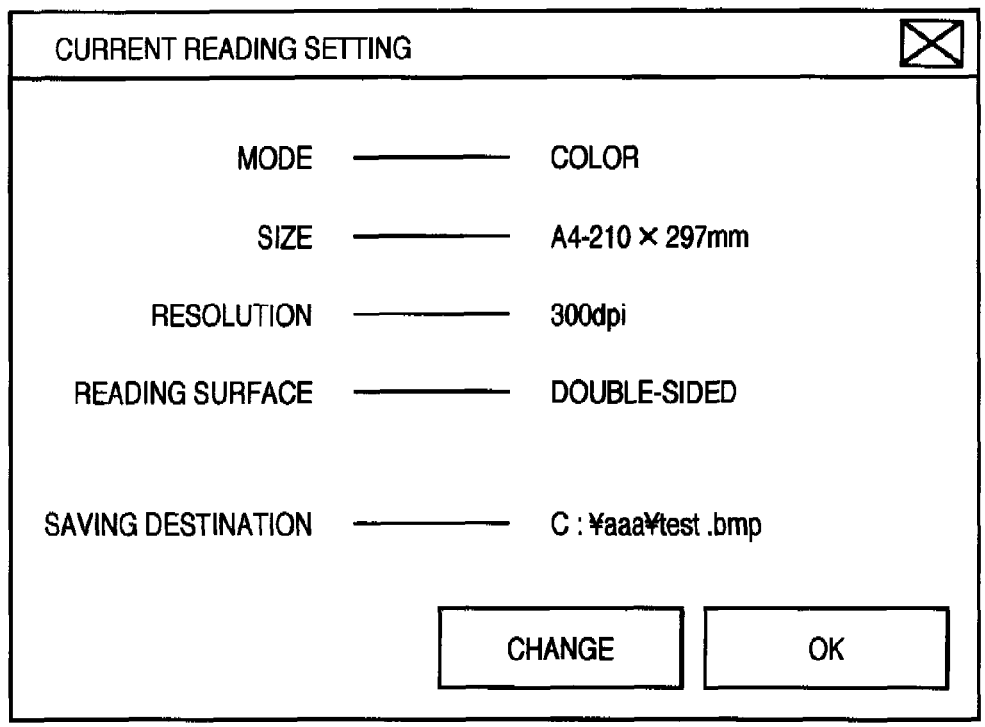

PERIPHERAL DEVICE USABLE WITHOUT INSTALLING DRIVER IN COMPUTER BEFOREHAND

BACKGROUND OF THE INVENTION

1. Field of the Invention

The present invention relates to a peripheral device such as an image scanner, printer, or multi function peripheral.

2. Description of the Related Art

Peripheral devices such as an image scanner, printer, and multi function peripheral are becoming widespread. As interfaces to connect these peripheral devices, a serial interface, parallel interface USB, IEEE1394, LAN, and the like are known. To make a peripheral device usable on a computer, a device driver or application software for the peripheral device needs to be installed (Japanese Patent Laid-Open No. 2004-334449).

However, there are computers in which installation of device drivers and application software is limited. In many cases, the limitation is placed for the sake of security. For example, in an operating system (OS) such as Microsoft Windows®, only a user who has administrator authority can install device drivers. A general user cannot use peripheral devices because he/she cannot install device drivers or application software. Such a situation is expected to frequently occur for on-the-road use of a computer. In addition, even a user having administrator authority conventionally needs to install a device driver in advance before connecting an image reading device. That is, it is conventionally impossible to use the peripheral device without installing the device driver in the personal computer (PC). Device drivers are generally distributed by CD-ROMs. The device drivers cannot be installed unless the CD-ROMs are prepared. For example, losing a CD-ROM makes device driver installation impossible. Although the device driver may be available via the Internet, this requires an environment connectable to the Internet. It is also necessary to correctly grasp the URL of the WEB site where the device driver is provided and the type and name of the peripheral device, resulting in cumbersomeness.

Hence, there is a social need to provide a peripheral device that is usable from an information processing apparatus without installing a device driver in it. More specifically, in the present invention, a PC is caused to recognize a peripheral device as an external storage device. Application software stored in one of the storage areas of the peripheral device, which is recognized as the external storage device, is activated on the PC. Then, the PC writes a control command to control the peripheral device in the storage area recognized as the external storage device in accordance with the application software. The peripheral device writes a response corresponding to the control command in the storage area recognized as the external storage device. This allows the PC to, for example, cause the peripheral device to read an image while recognizing the peripheral device as the external storage device.

SUMMARY OF THE INVENTION

There exist various types of operating systems used by computers. Examples are Microsoft Windows®, MacOS®, and Linux®. Additionally, the file systems supported by these operating systems also vary widely. Different execution files are used depending on the operating systems. Hence, peripheral devices specialized for each operating system may be manufactured. However, this complicates the manufacturing process, resulting in an increase in the manufacturing cost. From a user's point of view, he/she must buy a peripheral device for each operating system, and this increases the burden on purchase. These problems are solved if a single peripheral device is usable on a plurality of operating systems.

For example, according to the feature of the present invention, a peripheral device is made usable on a plurality of operating systems without installing a device driver or software in a computer.

Further features of the present invention will become apparent from the following description of exemplary embodiments with reference to the attached drawings.

BRIEF DESCRIPTION OF THE DRAWINGS

FIG. 15 is a view showing an example of the user interface of capture applications 210 and 215 according to the fourth embodiment of the present invention;

FIG. 26 is a view showing an example of a configuration file;

FIG. 27 is a flowchart illustrating an example of scanner setting processing;

FIG. 28 is a view showing an example of a user interface displayed when a capture application 210 is activated;

FIG. 32 is a view showing a screen that displays current reading settings;

DESCRIPTION OF THE EMBODIMENTS

An embodiment of the present invention will be described below. Individual embodiments to be described below will serve to understand various concepts including the superordinate concept, intermediate concept, and subordinate concept of the present invention. The scope of the invention is determined by the claims which follow the description and is not limited to the individual embodiments to be described below.

<First Embodiment>

The first embodiment is characterized by comprising a first storage area which stores a plurality of control programs corresponding to a plurality of operating systems of different types, respectively, and a second storage area which is recognized by an information processing apparatus as an external storage device and in which at least one control program is replicated from the first storage area. More specifically, control programs corresponding to operating systems that are different for information processing apparatuses are stored in a peripheral device. An information processing apparatus, which is executing one of the operating systems, recognizes the second storage area of the peripheral device as an external storage device, thereby reading out and executing a corresponding control program. This enables the information processing apparatus to control the peripheral device based on the control program.

Figure 1:
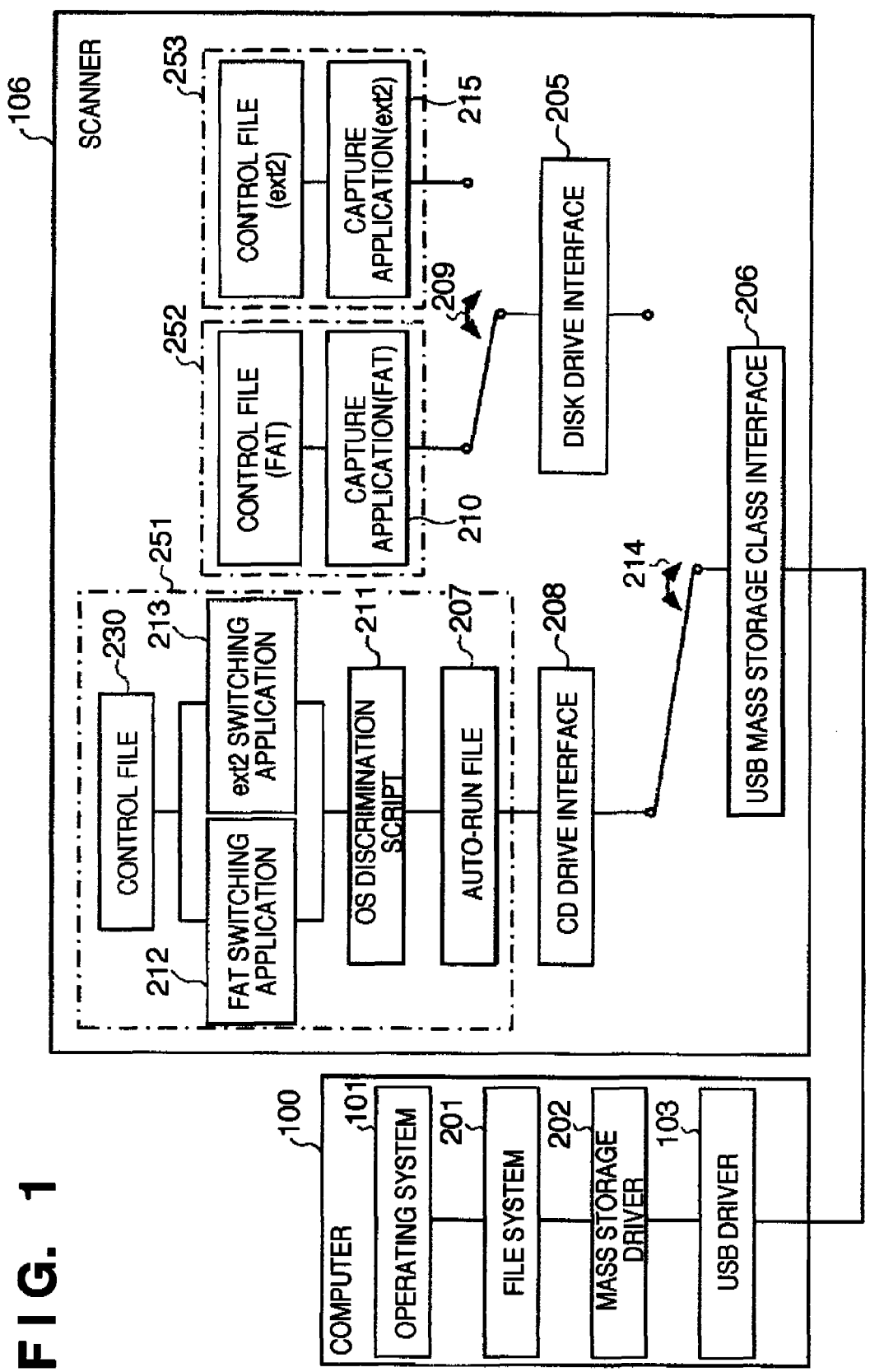
FIG. 1 is a software block diagram of a computer exemplified as a personal computer and a scanner serving as an image reading device according to the first embodiment of the present invention.

FIG. 1 is a software block diagram of a computer exemplified as a personal computer and a scanner serving as an image reading device according to the first embodiment of the present invention. In the present invention, an information processing system is formed by an information processing apparatus such as a personal computer and a peripheral device such as an image scanner.

An operating system 101, file system 201, USB mass storage driver 202, and USB interface driver 103 are installed in a computer 100 that is an example of the information processing apparatus. The operating system 101 is a so-called OS serving as the fundamental software of the computer 100. Famous examples are Microsoft Windows®, MacOS®, and UNIX®. The file system 201 is software configured to store files in a storage device such as a hard disk drive. There are various kinds of file systems such as FAT, NTFS, HFS, ext2, ext3, ext4, ISO9660, HPFS, XFS, and ZFS. The USB mass storage driver 202 is software configured to control a mass storage such as a hard disk drive, CD-ROM, DVD-ROM, CD-R, DVD-R, or USB memory. The USB interface driver 103 is software configured to control a USB device connected to a USB interface. Note that these pieces of software may be part of the OS.

On the other hand, a scanner device 106 that is an example of the peripheral device includes a USB disk drive interface 205, USB mass storage class interface 206, and USB disk drive interface 208. The USB disk drive interface 205 is software configured to use a memory (for example, flash memory or EEPROM) provided in the scanner device 106 as a disk drive. The USB mass storage class interface 206 is software configured to use the memory as a USB mass storage via the USB disk drive interface 205. The USB disk drive interface 208 is software configured to use the memory as a USB disk drive via the USB disk drive interface 205.

Note that in this embodiment, the USB drive has been exemplified as a drive writable independently of various operating systems. However, for example, a CD-RW may be selected as a writable CD media drive. Alternatively, a CD-R, DVD-R, DVD-RW, or the like may be used.

A capture application 210 for FAT and a capture application 215 for ext2 (file name: CaptureApplication.exe) are software to be executed by the computer 100 to control image reading. These programs are oriented to different operating systems and are therefore different at binary level but identical in terms of function. A control file 204 for FAT and a control file 216 for ext2 (file name: Control.dat) are used by the computer 100 to write a control command and the like in accordance with the capture applications 210 and 215. In the present invention, the scanner device 106 fundamentally executes image reading while being recognized as an external storage device. To do this, it is necessary to write a control command or image data in a storage area recognizable and accessible from both the scanner device 106 and the computer 100. That is, the control files 204 and 216 function as a mediator or broker of information. In this embodiment, the mediator or broker is implemented by the control files 204 and 216 held in advance in folders corresponding to a memory area recognized as a disk drive. Alternatively, after the capture application 210 or 215 is activated, a file or fixed sector address may dynamically be generated by the capture application 210 or 215 to implement the mediator or broker of information. The control files may include the capture applications 210 and 215 as well. Alternatively, only the capture applications 210 and 215 may be used as the control files.

Note that the storage area of the scanner device 106 includes a disk area 251 that is readable/writable independent of various operating systems, a FAT area 252 corresponding to FAT, and an ext2 area 253 corresponding to ext2. Note that although the disk area 251 can be, for example, a CD-RW disk area corresponding to ISO9660, the present invention is not limited to this. According to the feature of this embodiment, the storage area to be recognized as an external storage device and accessed by the computer 100 is selectively switched. In FIG. 1, two switches implement the switching. A first switch 214 switches the connection destination of the USB mass storage class interface 206 between the USB disk drive interface 208 and the USB disk drive interface 205. A second switch 209 switches the storage area to be connected to the USB disk drive interface 205 between the FAT area 252 and the ext2 area 253. In the first embodiment, the switch 209 functions as a system switching unit which switches the file system of the second storage area in accordance with the operating system of the information processing apparatus connected to the connection unit. Note that referring to FIG. 1, the disk area 251 stores an auto-run file 207, OS discrimination script 211, FAT switching application 212, ext2 switching application 213, and control file 230. The FAT area 252 stores the capture application 210 for FAT and the control file 204 for FAT. The ext2 area 253 stores the capture application 215 for ext2 and the control file 216 for ext2. Note that the control file 230 is recognized by the computer 100 as a readable/writable file on the disk. Hence, the control file 230 functions to transfer an instruction from the FAT switching application 212 or ext2 switching application 213 to a CPU 110 (to be described later) of the scanner device 106.

The scanner device includes a USB scanner class interface in place of these pieces of software. The personal computer includes capture application software and a dedicated scanner driver. In the present invention, the USB scanner class interface is not always necessary because the scanner device 106 need only be recognized as an external storage device. In addition, the personal computer does not always need the capture application software or dedicated scanner driver.

Figure 2:
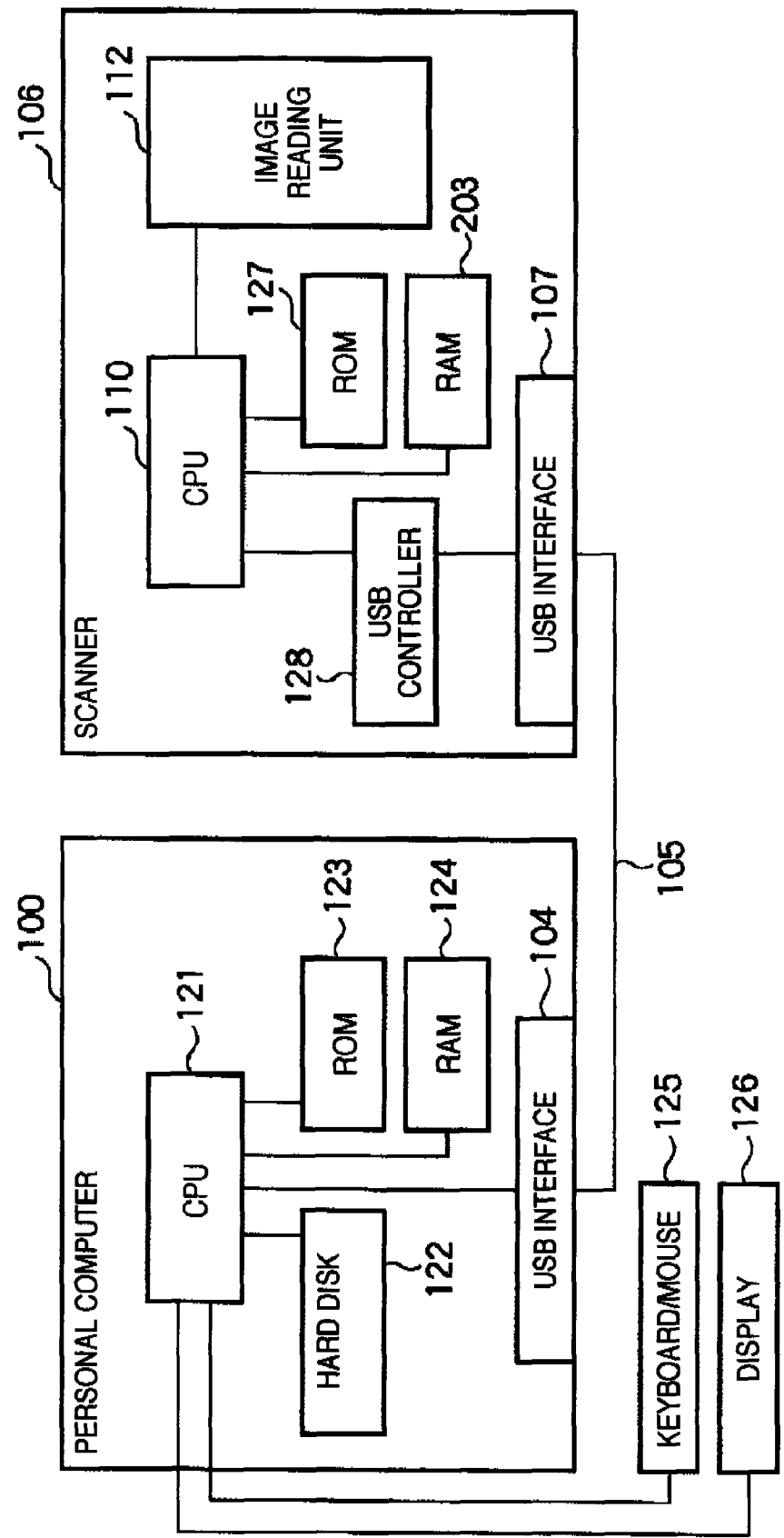
FIG. 2 is a hardware block diagram of the scanner and the computer exemplified as a personal computer.

FIG. 2 is a hardware block diagram of the scanner and the computer exemplified as a personal computer. Referring to FIG. 2, the computer 100 includes a CPU 121, ROM 123, RAM 124, hard disk drive 122, and USB interface 104. The USB interface 104 includes a USB connector and is connected to the scanner device 106 via a USE cable 105. The CPU 121 is connected to a keyboard/mouse 125 and a display 126.

When the computer 100 is powered on, the CPU 121 activates firmware from the ROM 123 and the operating system 101 such as Microsoft Windows® from the hard disk drive 122. Necessary software such as the OS is loaded to the RAM 124. Microsoft Windows® has been explained here as the operating system 101. However, the arrangement is basically the same even when the operating system 101 is another OS such as Linux®.

On the other hand, the scanner device 106 includes the CPU 110, ROM 127, RAM 203, image reading unit 112, USB controller 128, and USB interface 107. When the scanner device 106 is powered on, the CPU 110 activates firmware from the ROM 127. The USB interface 107 includes a USB connector and is connected to the computer 100 via the USB cable 105. The USB interface 107 functions as a connection unit to be connected to the information processing apparatus. Each of the CPU 110 and the image reading unit 112 functions as a processing unit which executes predetermined processing based on a control signal from the information processing apparatus. The USB controller 128 functions as a communication unit which communicates with the information processing apparatus via the connection unit. Each of the ROM 127 and the RAM 203 functions as a storage unit having a plurality of storage areas. Especially, the ROM 127 functions as a first storage area that stores a plurality of control programs corresponding to a plurality of operating systems of different types. For example, the ROM 127 stores disk images of a plurality of file systems corresponding to the plurality of operating systems. In FIG. 1, a disk image that forms the disk area 251, a disk image that forms the FAT area 252, and a disk image that forms the ext2 area 253 are stored on the ROM 127. These areas are formed by replicating or rasterizing the corresponding disk images on the RAM 203. Each formed area is recognized by the computer 100 as an external storage device. The RAM 203 functions as a second storage area which is recognized by the information processing apparatus as an external storage device and in which at least one control program is replicated from the first storage area.

When the scanner device 106 is connected to the computer 100, the operating system 101 (CPU 121) detects connection of some type of peripheral device to the USB interface 104. The CPU 121 accesses the USB interface 107 of the scanner device 106 via the USB cable 105.

When the computer 100 accesses the USB interface 107, the CPU 110 of the scanner device 106 operates the switch 214 so as to connect the USB mass storage class interface 206 to the USB disk drive interface 208. This causes the operating system 101 to access the USB disk drive interface 208 of the scanner device 106.

If the operating system 101 is Microsoft Windows® or Linux®, the auto-run file 207 (file name: autorun.inf) is executed when a disk is inserted into the USB disk drive. The auto-run file 207 is automatically activated because it is accessed via the USB disk drive interface 208. To enable the automatic execution function, the CPU 110 of the scanner device 106 causes the operating system 101 to virtually recognize that no disk is inserted in the USB disk drive at the time of connection to the computer 100. Then, the CPU 110 causes the operating system 101 to virtually recognize disk insertion so as to control to automatically execute the auto-run file 207. At this time, the computer 100 forms, in a folder associated with the file system 201, a table corresponding to the auto-run file 207, the OS discrimination script 211, the FAT switching application 212 that switches the file system to FAT, the ext2 switching application 213 that switches the file system to ext2, and the control file 230.

Note that the formed table corresponds to only a file system capable of read/write on the operating system 101 of the computer 100. If the file system cannot read/write, a warning of formatting or a message representing that read is impossible is displayed. Hence, the scanner device 106 needs to display only a file system supported by the operating system 101.

In this embodiment, the following description will be made assuming that when the operating system 101 is Microsoft Windows®, the supportable file system is FAT, and when the operating system 101 is Linux®, the supportable file system is ext2 for the descriptive convenience.

Figure 3:
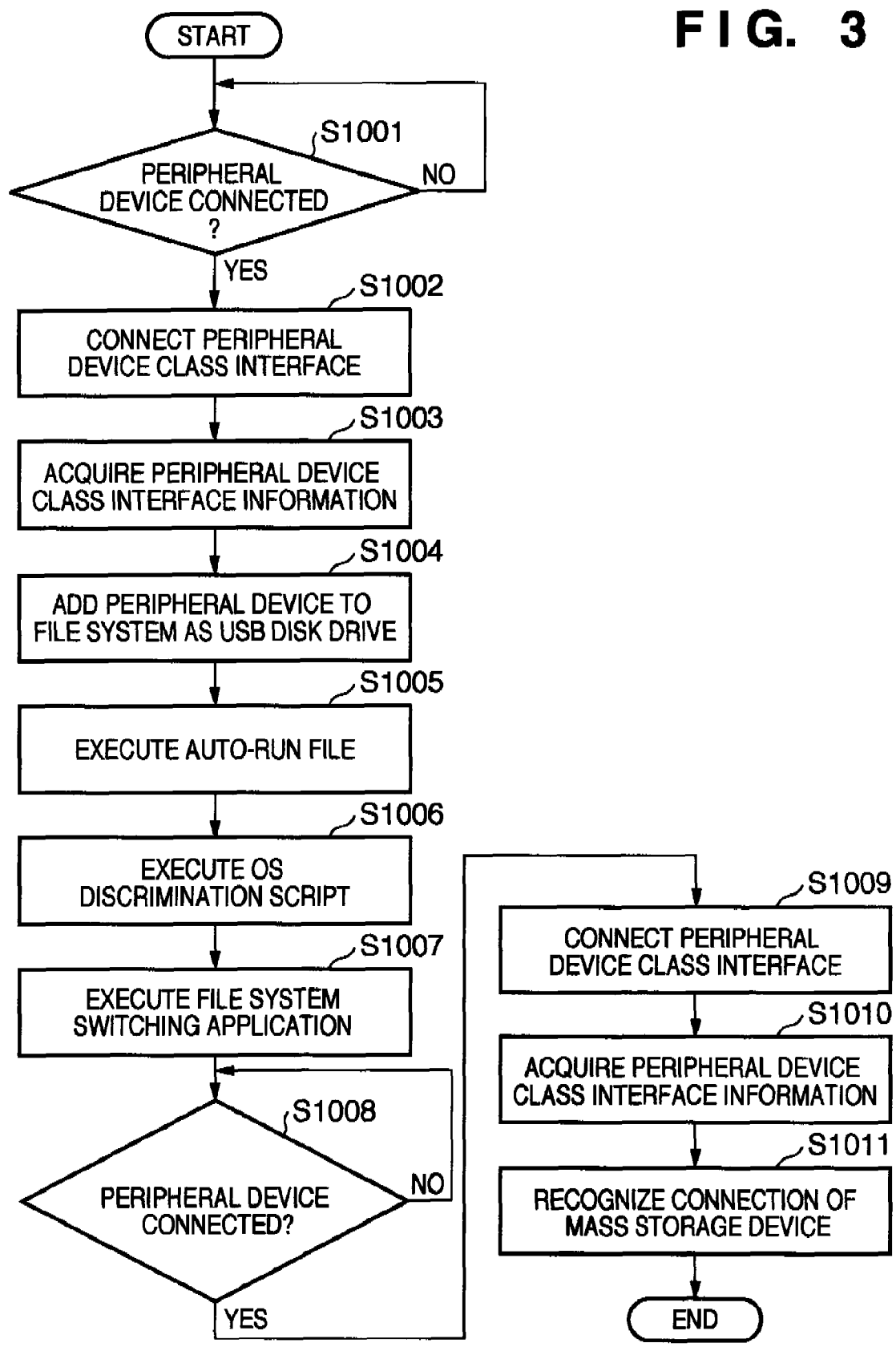
FIG. 3 is a flowchart of processing upon connecting the scanner device to the computer according to the first embodiment of the present invention.

FIG. 3 is a flowchart of processing upon connecting the scanner device 106 to the computer 100. The CPU 121 of the computer 100 determines whether the scanner device 106 is connected (step S1001). If the scanner device 106 is connected (YES in step S1001), the CPU 121 connects the scanner device 106 as a peripheral device class interface (step S1002). The CPU 121 acquires peripheral device class interface information from the scanner device 106 (step S1003). The CPU 110 and the USB controller 128 function as a connection detection unit which detects connection of the connection unit to the information processing apparatus. More specifically, upon detecting that the computer 100 is connected to the scanner device 106 via the USE cable 105, the CPU 110 and the USE controller 128 send the peripheral device class interface information to the CPU 121 of the computer 100. The CPU 121 recognizes the type of peripheral medium based on the information. As described above, the scanner device 106 has the USB mass storage class interface 206. For this reason, when the scanner device 106 is connected to the computer 100, the CPU 121 recognizes that a USB mass storage device is connected (step S1004). The scanner device 106 also has the USB disk drive interface 208 and the USB disk drive interface 205 as the sub classes of the USB mass storage class interface 206. In this case, the switch 214 is connected to validate the USB disk drive interface 208. The CPU 121 thus recognizes the connected scanner device 106 as a USB disk drive that is a kind of external storage device (step S1004). That is, the CPU 110 of the scanner device 106 or the like functions as a control unit which controls the information processing apparatus to make it recognize the second storage area as an external storage device. The USB controller 128 functions as a communication unit which sends, to the information processing apparatus, information to make it recognize the second storage area as a read only disk device.

Figures 4, 5:
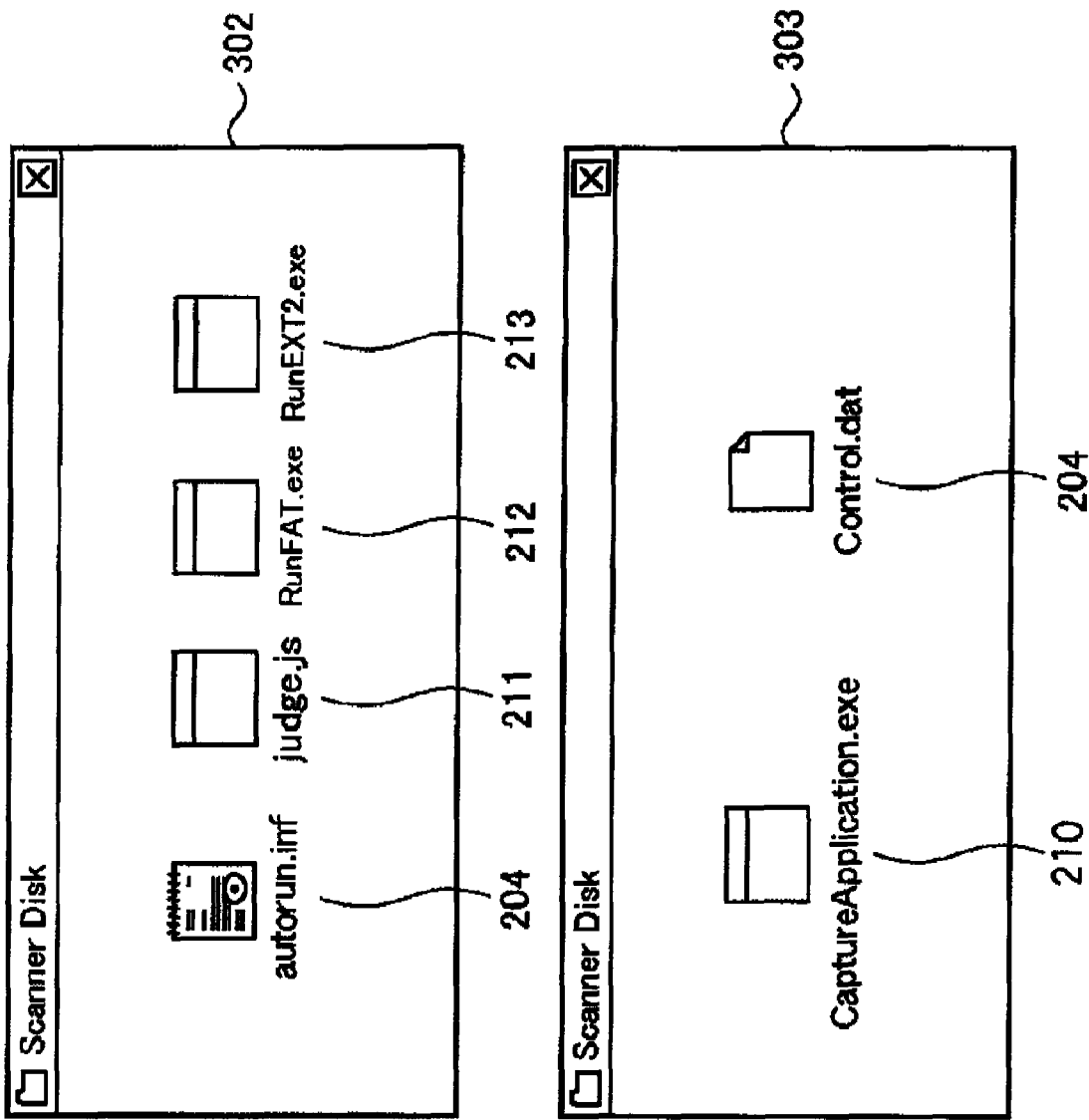
FIG. 4 is a view showing an example of a folder corresponding to a memory area recognized as a USB disk drive.
FIG. 5 is a view showing an example of a folder corresponding to a memory area recognized as a FAT disk drive.

FIG. 4 is a view showing an example of a folder corresponding to a memory area recognized as a USB disk drive. Out of the ROM 127 of the scanner device 106, the disk image of a memory area to be recognized as a USB disk drive is rasterized on part of the RAM 203 so that the computer 100 recognizes the part of the RAM 203 as a folder 302. Hence, it appears to the computer 100 that the folder 302 stores the auto-run file 207 (file name: autorun.inf), OS discrimination script 211 (file name: judge.js), FAT switching application 212 (file name: RunFAT.exe), the ext2 switching application 213 (file name: Runext2.exe), and the control file 230 (file name: Control.dat).

As described above, in the operating system such as Microsoft Windows® or Linux®, when a disk is inserted into the USB disk drive, the CPU 121 detects a file called "autorun.inf" on the disk, and executes a command file designated to automatically run by the description in "autorun.inf" (S1005). The auto-run file 207 is a control file of auto-run format. The auto-run file 207 is described in advance to activate the OS discrimination script 211 described in Java® script. Hence, the CPU 121 interprets the description of the auto-run file 207, and executes the OS discrimination script 211 (step S1006). The OS discrimination script 211 is preferably activatable on various operating systems. For this reason, Java® script is adopted as an example of a processing module independent of the operating system. However, the OS discrimination script 211 may be described using any other script language or the like. Note that the OS discrimination script 211 functions as a discrimination unit which discriminates the type of operating system running on the information processing apparatus. The OS discrimination script 211 is Java® script replicated from the first storage area to the second storage area. Note that the OS discrimination script 211 acquires information capable of specifying the OS from the computer 100, and transfers it to the CPU 110 of the scanner device 106 via the control file 230 writable on the disk. In this case, the CPU 110 discriminates the type of operating system running on the information processing apparatus based on this information. In this case, the CPU 110 functions as a discrimination unit.

On the other hand, the CPU 110 of the scanner device 106 monitors write in the control file 230 on the RAM 203 functioning as the disk inserted into the USB drive.

The CPU 110 of the scanner device 106 rasterizes a disk image corresponding to the operating system running on the information processing apparatus from the first storage area to the second storage area based on the discrimination result of the OS discrimination script 211. For example, if the operating system 101 is Microsoft Windows®, the CPU 121 executes the FAT switching application 212 in accordance with the OS discrimination script 211. At this time, the control file 230 and the like held on the ROM 127 in the scanner device 106 are preferably replicated or rasterized on the RAM 203. The replication or rasterization of the control file 230 and the like can be done either before or after execution of the FAT switching application 212 based on the discrimination result of the OS discrimination script 211. In this embodiment, however, the replication or rasterization is performed before execution of the FAT switching application 212 for the descriptive convenience. In accordance with the FAT switching application 212, the CPU 121 writes, in the control file 230, information representing that the selected file system is FAT so as to instruct the CPU 110 of the scanner device 106 to switch the file system image to be rasterized on the RAM 203 to the image of FAT out of the file systems held on the ROM 127 in the scanner device 106. If the operating system 101 is Linux®, the CPU 121 executes the ext2 switching application 213 in accordance with the OS discrimination script 211 (step S1007). In accordance with the ext2 switching application 213, the CPU 121 writes, in the control file 230, information representing that the selected file system is ext2 so as to instruct the scanner device 106 to switch the file system to be rasterized on the RAM 203 to ext2 out of the file systems held on the ROM 127 in the scanner device 106. Note that the timing the control file 230 and the like are replicated or rasterized from the ROM 127 to the RAM 203 in the scanner device 106 is the same as that in Microsoft Windows® described above. However, the timing may be different.

At this time, the scanner device 106 instructs the USB controller 128 to temporarily disconnect communication from the computer 100. This aims at switching from the USB disk drive interface 208 to the USB disk drive interface 205 by the switch 214. The CPU 110 rasterizes, out of the file system images held on the ROM 127 serving as the first storage area, the file system image designated by the FAT switching application 212 or ext2 switching application 213 serving as a file system switching application on the RAM 203 serving as the second storage area via the control file 230. In addition, the CPU 110 operates the switch 214 to validate the USB disk drive interface 205. Finally, the CPU 110 is reconnected to the computer 100 via the USB controller 128 and the USB interface 107. The CPU 110 thus functions as a control unit which controls to replicate at least one of the control programs from the first storage area to the second storage area when the connection detection unit detects connection of the connection unit and the information processing apparatus.

The CPU 121 of the computer 100 determines whether the scanner device 106 is connected (step S1008). If the scanner device 106 is connected (YES in step S1008), the CPU 121 connects the scanner device 106 as a peripheral device class interface (step S1009). The CPU 121 also acquires peripheral device class interface information from the scanner device 106 (step S1010). In this case, the switch 214 is operated to validate the USB disk drive interface 205. Hence, the CPU 110 and the USB controller 128 send the peripheral device class interface information representing a USB disk device to the computer 100. The CPU 121 thus recognizes the connected scanner device 106 as a USB disk drive (step S1011). That is, the USB controller 128 functions as a communication unit which sends, to the information processing apparatus, information to cause it to recognize the second storage area as a readable/writable USB disk device. Note that the ROM 127 stores peripheral device class interface information representing a USB disk device and a USB disk drive. That is, the ROM 127 stores first information that causes the information processing apparatus to recognize the second storage area as a USB memory device and second information that causes the apparatus to recognize the second storage area as a USB disk device. The USB controller 128 sends the first information or second information to the information processing apparatus upon receiving a command from the USB mass storage driver activated in the information processing apparatus.

Figure 6:
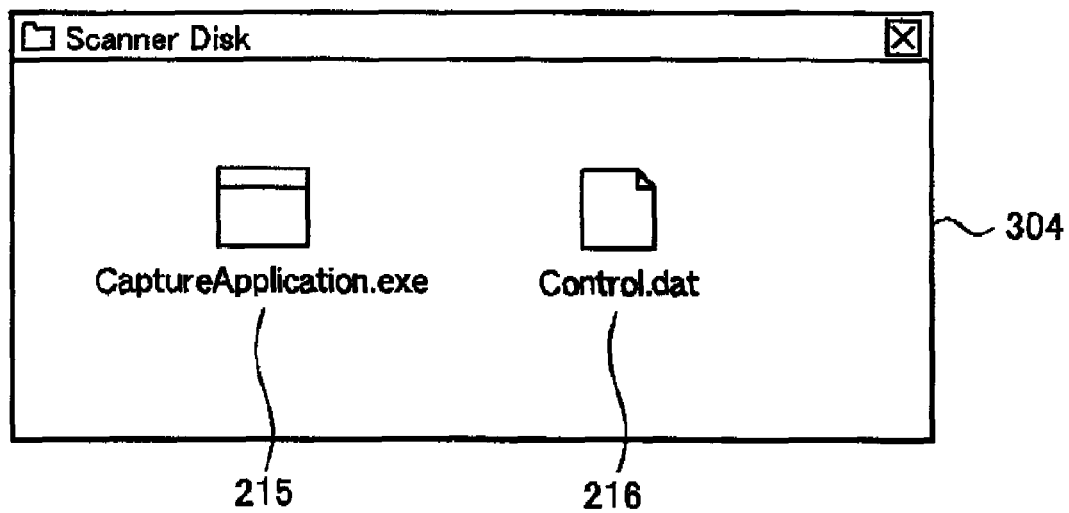
FIG. 6 is a view showing an example of a folder corresponding to a memory area recognized as an ext2 disk drive.

When part of the RAM 203 of the scanner device 106 is recognized as a USB memory drive, and the rasterized file system is FAT, the CPU 121 forms a table corresponding to the capture application 210 for FAT and the control file 204 for FAT in a folder associated with the file system 201. The computer 100 recognizes it as a folder 303, as shown in FIG. 5. Hence, it appears to the CPU 121 that the control file 204 and the like are stored in the folder 303. On the other hand, when the rasterized file system is ext2, the CPU 121 forms a table corresponding to the capture application 215 for ext2 and the control file 216 for ext2 in a folder associated with the file system 201. The computer 100 recognizes it as a folder 304, as shown in FIG. 6. It appears to the CPU 121 that the control file 216 and the like are stored in the folder 304.

According to the present invention, the CPU 121 can recognize only a file system that can be handled by the operating system 101 running on the computer 100. Generally, if a file system incapable of read/write is recognized, a warning of formatting or a message representing that read is impossible is displayed. Since the present invention enables to avoid such display, burden on the operator can be relaxed.

Figure 7:
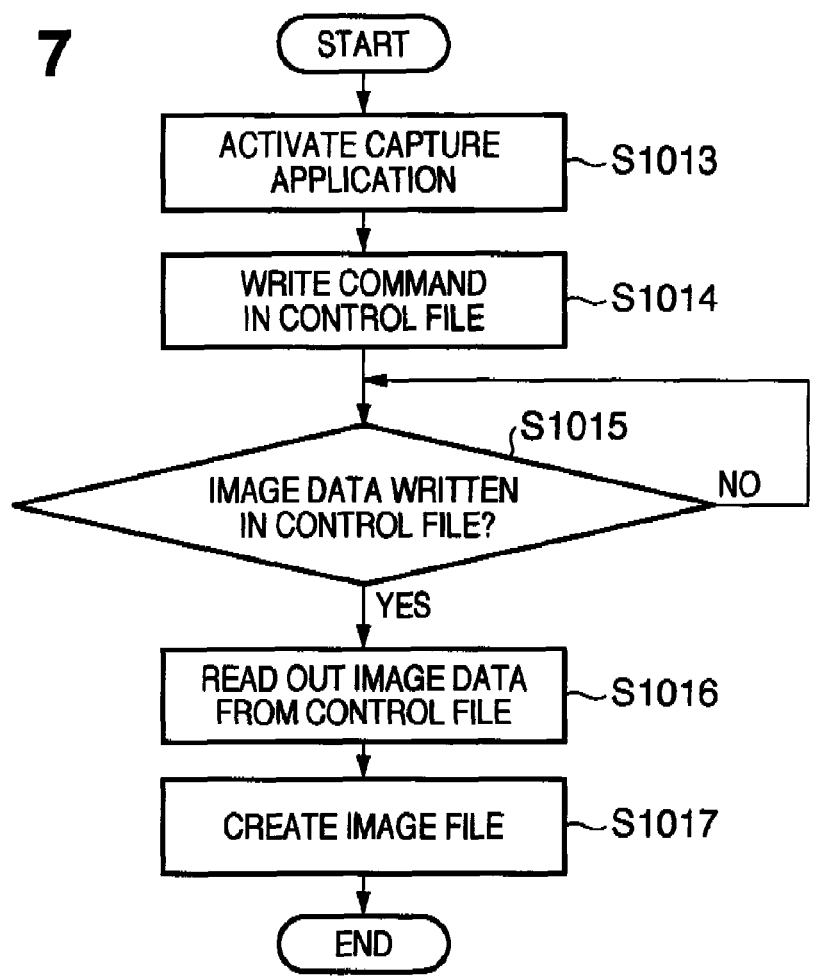
FIG. 7 is a flowchart illustrating a procedure of causing the scanner device to read an image using capture applications.

A procedure of image reading will be explained next. FIG. 7 is a flowchart illustrating a procedure of image reading using the capture applications 210 and 215. Note that since the capture applications 210 and 215 have the same function, the capture application 210 will be described here. Note that when executing the capture application 215, the control file 216 is used in place of the control file 204.

Figure 8:
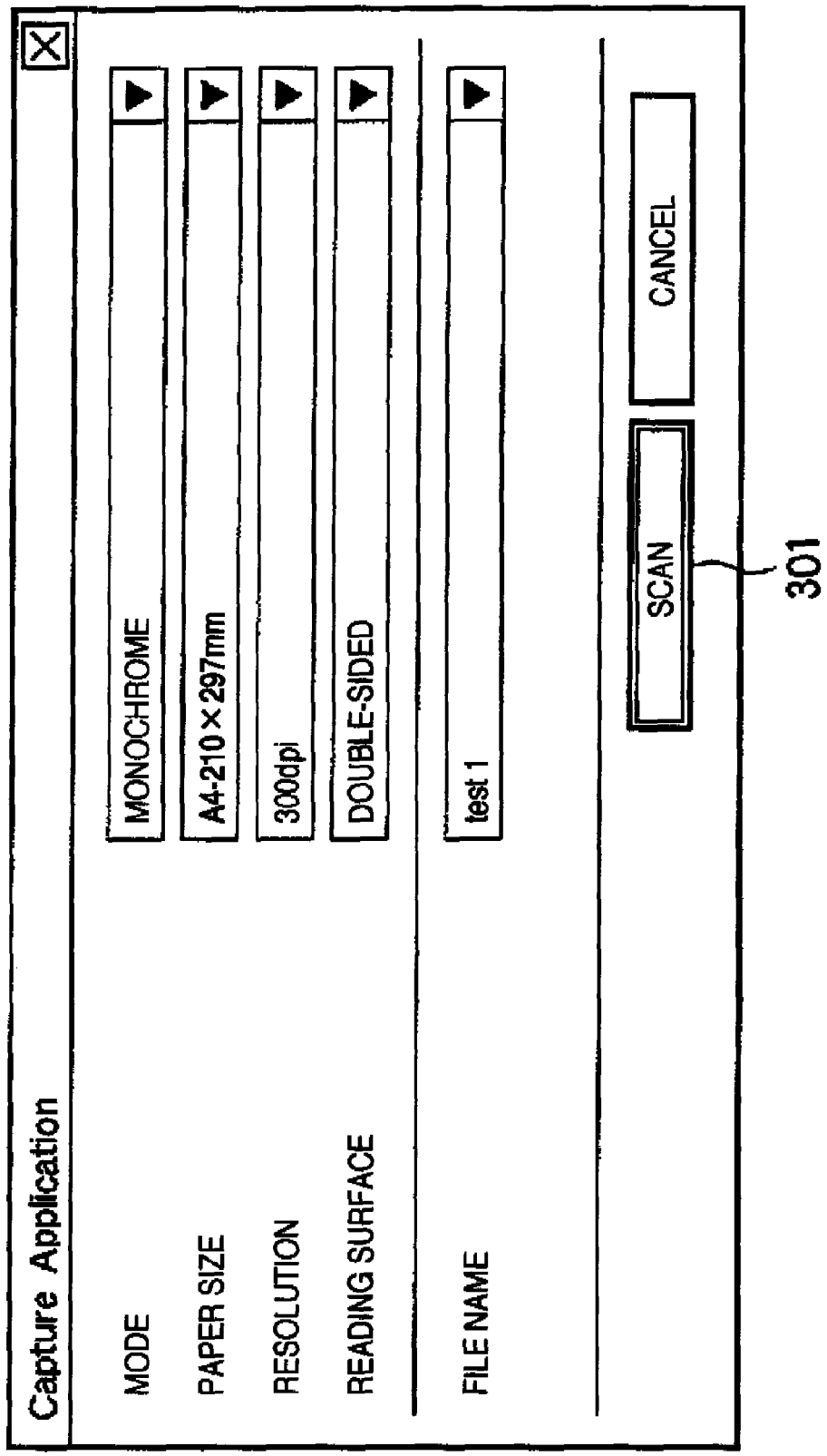
FIG. 8 is a view showing an example of a user interface displayed when the capture application is activated.

When the operator executes the capture application 210 included in the folder, the CPU 121 activates the capture application 210 (step S1013). The display 126 thus displays a screen with a user interface as shown in FIG. 8. When the user interface of the capture application 210 as shown in FIG. 8 is displayed, the operator operates the keyboard/mouse 125 to execute scan setting. For example, the operator selects the reading mode (monochrome in this embodiment), paper size (A4 in this embodiment), resolution (300 dpi in this embodiment), and reading surface (double-sided in this embodiment) by using the keyboard/mouse 125. The file name (test1 in this embodiment) of an image file to store a read image is also input by operating the keyboard/mouse 125. Finally, the operator clicks a scan button 301 using the keyboard/mouse 125.

When the scan button 301 is clicked by the keyboard/mouse 125, the capture application 210 (CPU 121) receives the scan settings, and writes them in the control file 204 of the scanner device 106. The control file 204 functions as a control file in which the information processing apparatus can write a control command to control the processing unit. The CPU 121 also writes scan start command data in the control file 204 (step S1014).

The CPU 110 of the scanner device 106 monitors the control file 204 on the RAM 203 functioning as an external storage device. The CPU 110 functions as a monitor unit which monitors whether the information processing apparatus has written a control command in the control file rasterized on the second storage area. Upon detecting that the scan settings and scan start command data are written in the control file 204, the CPU 110 reads the control file 204, and controls the image reading unit 112 in accordance with the scan settings, thereby starting scan. The CPU 110 and the image reading unit 112 function as an execution unit which reads out and executes the control command when it is written in the control file. When scan starts, the CPU 110 of the scanner device 106 writes the image read by the image reading unit 112 in the control file. The control file can be either identical to or different from the control file in which the scan settings can be written.

The CPU 121 of the computer 100 monitors whether image data is written in the control file 204 (step S1015). Upon detecting that image data has written in the control file 204, the CPU 121 reads out the image data from the control file 204 (step S1016). The CPU 121 creates an image file (file name "test1" in this embodiment) designated via the user interface, and stores it in the hard disk drive 122 (step S1017).

As described above, in the present invention, various computers can cause the single scanner device 106 to read an image without installing software such as a device driver or application in the computer 100. For example, even a user who cannot log in to the operating system 101 because of administrator authority or a user who uses a personal computer on the road can easily read an image.

Note that in the embodiment, an example has been described in which scan is started from the capture application 210 or 215. However, scan may start when the CPU 110 detects press of a start button arranged on the scanner device 106. At this time, the capture application 210 or 215 (CPU 121) may monitor the start button of the scanner device 106 via the control file 204. In this case, the CPU 110 writes press of the start button in the control file 204.

The capture application 210 or 215 (CPU 121) may instruct the scanner device 106 to start scan via the control file 204. Alternatively, the capture application 210 or 215 (CPU 121) may determine the start of scan upon detecting image data generation in the control file 204, and store the image file in the hard disk drive.

In the above-described embodiment, the capture application 210 or 215 is activated to display the user interface based on an operator instruction. However, the capture applications 210 and 215 may be resident in the operating system 101 such as Microsoft Windows® when the scanner device 106 is connected.

In the above-described embodiment, the capture applications 210 and 215 have no image display function. However, the capture applications 210 and 215 may have an image display function.

In the above-described embodiment, since the control files 204 and 216 are rasterized on the RAM 203, the settings are volatilized. In the scanner device 106, however, the scan settings may be stored in a nonvolatile memory (not shown). The settings may be stored for each user of the operating system 101.

In the above-described embodiment, an image reading device has been exemplified. However, the device may be a printer or a multi function peripheral having both an image reading function and an image forming function.

<Second Embodiment>

According to the feature of the second embodiment, a partition corresponding to each of a plurality of operating systems of different types is prepared to use a single scanner device 106 on the plurality of operating systems.

Figure 9:
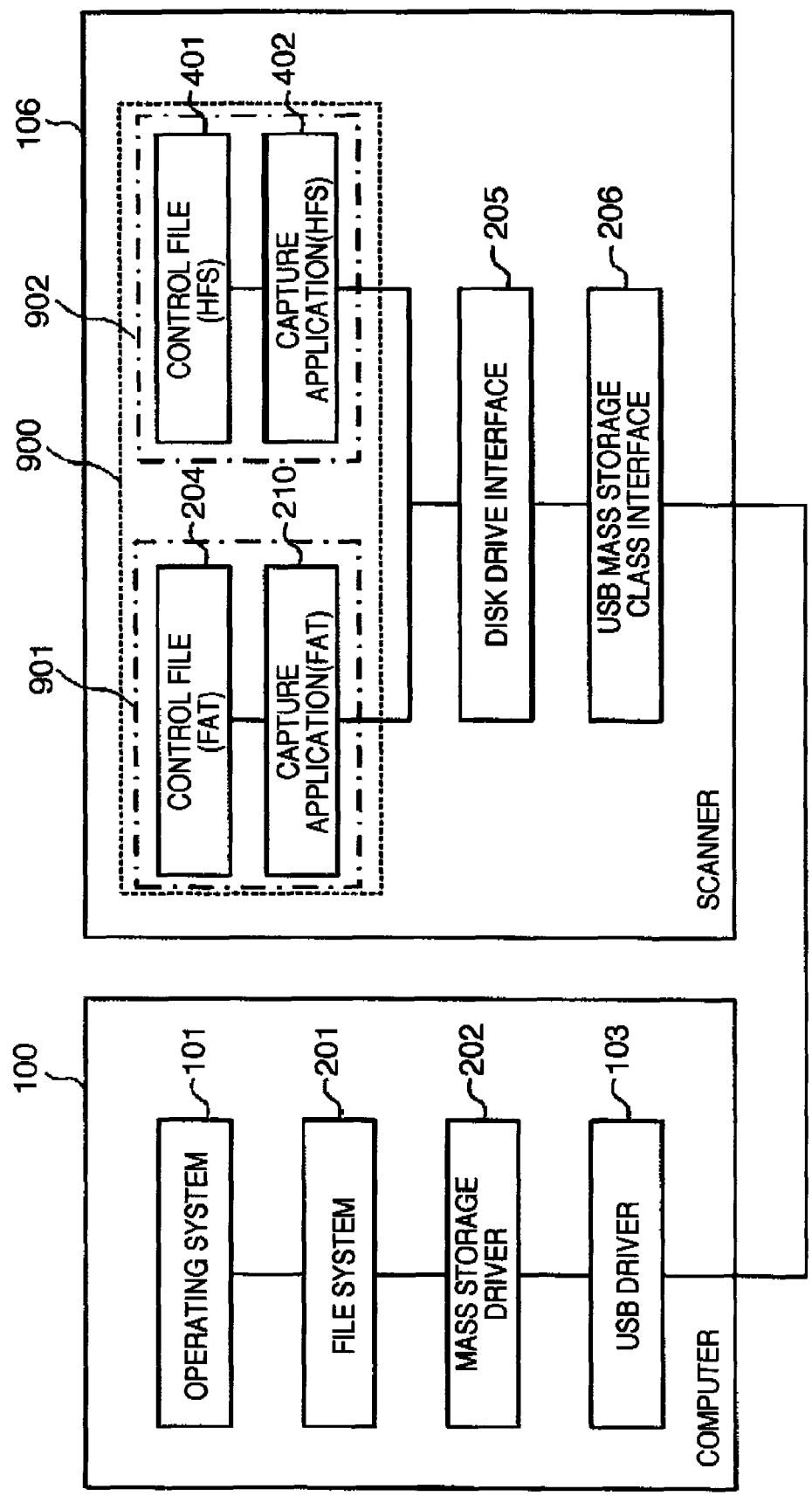
FIG. 9 is a software block diagram of a computer exemplified as a personal computer and a scanner serving as an image reading device according to the second embodiment of the present invention.

FIG. 9 is a software block diagram of a computer exemplified as a personal computer and a scanner serving as an image reading device according to the second embodiment of the present invention. Already described parts are given the same reference numbers to simplify the description. The scanner device 106 that is an example of a peripheral device includes a USB disk drive interface 205 and a USB mass storage class interface 206. A capture application 210 for FAT and a capture application 402 for HFS used by MacOS® that is the operating system of Apple Computer are software to be executed by a computer 100 to control image reading. The capture applications 210 and 402 are software different at binary level but identical in terms of function. A control file 204 for FAT is used by the capture application 210, as described above. On the other hand, a control file 401 for HFS is a file in which the computer 100 executing the capture application 402 writes a control command or the like.

A disk image 900 is held on a ROM 127 serving as a first storage area. A CPU 110 rasterizes the disk image 900 on a RAM 203 serving as a second storage area, thereby providing a USB memory drive serving as a storage area recognizable and accessible from the computer 100. The disk image 900 includes a plurality of partitions. A first partition 901 is a partition formatted by the FAT file system. That is, the first partition 901 is a file system of FAT format. A second partition 902 is a partition formatted by the HFS file system. That is, the second partition 902 is a file system of HFS format.

Figure 10:
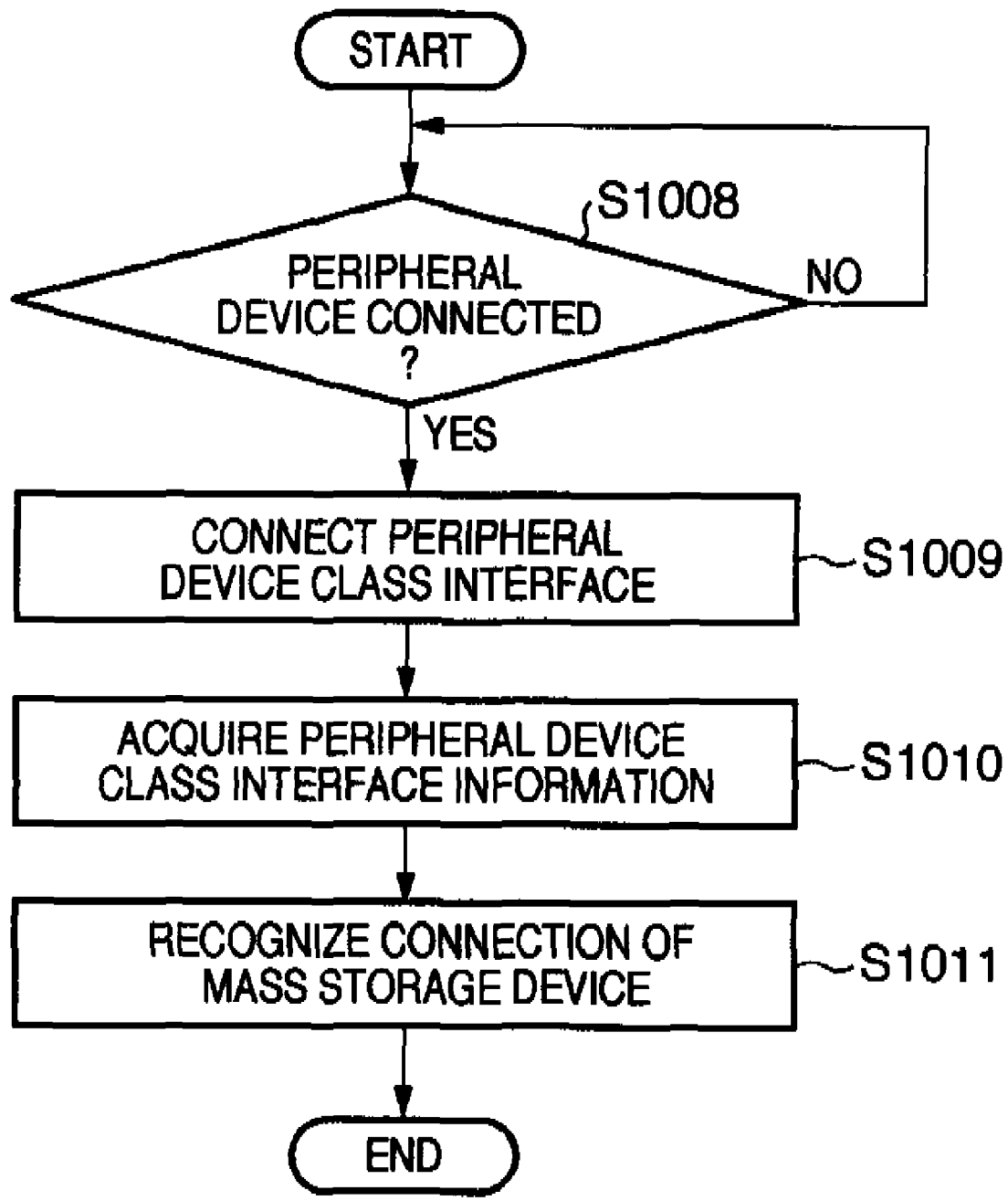
FIG. 10 is a flowchart of processing upon connecting a scanner device to a computer according to the second and third embodiments of the present invention.

FIG. 10 is a flowchart of processing upon connecting the scanner device 106 to the computer 100. Note that the flowchart is the same as that of steps S1008 to S1011 of FIG. 3, and will be described briefly. Since the arrangement of the scanner device 106 is different from that of the first embodiment, the processing result is different.

A CPU 121 of the computer 100 determines whether the scanner device 106 is connected (step S1008). If the scanner device 106 is connected (YES in step S1008), the CPU 121 connects the scanner device 106 as a peripheral device class interface (step S1009). The CPU 121 also acquires peripheral device class interface information from the scanner device 106 (step S1010). Unlike the first embodiment, since the USB disk drive interface 205 is always valid, the CPU 121 recognizes the connected scanner device 106 as a USB memory drive (step S1011).

The RAM 203 of the scanner device 106 is thus recognized as a disk drive having two partitions for FAT and HFS. Especially, it is preferable to arrange FAT as the first partition 901 and HFS as the second partition 902. A computer in which Microsoft Windows® runs recognizes only FAT of the first partition because of the specifications on the operating system side. A computer in which MacOS® runs recognizes both the partitions of FAT and HFS. Hence, each computer can recognize only file systems a corresponding operating system can support. Generally, if the computer 100 detects a file system incapable of read/write, a warning of formatting or a message representing that read is impossible is displayed. Since this embodiment enables to avoid such display, burden on the operator can be relaxed. Other advantages of the second embodiment are the same as those described in the first embodiment. A USB disk image including an OS discrimination script is unnecessary. Since the OS discrimination step (S1001 to S1007 in FIG. 3) is unnecessary, the time from connection of the scanner device 106 until it becomes ready to read can shorten. Additionally, since the USB disk image is unnecessary, a waste of the storage space of the ROM 127 can be reduced.

<Third Embodiment>

According to the feature of the third embodiment, the disk image of a common single file system accessible from at least two of a plurality of operating systems is stored. For example, FAT is readable/writable by both the operating systems Microsoft Windows® and MacOS®. Hence, adopting a versatile file system such as FAT makes it possible to simplify disk images to be prepared in a scanner device 106.

Figure 11:
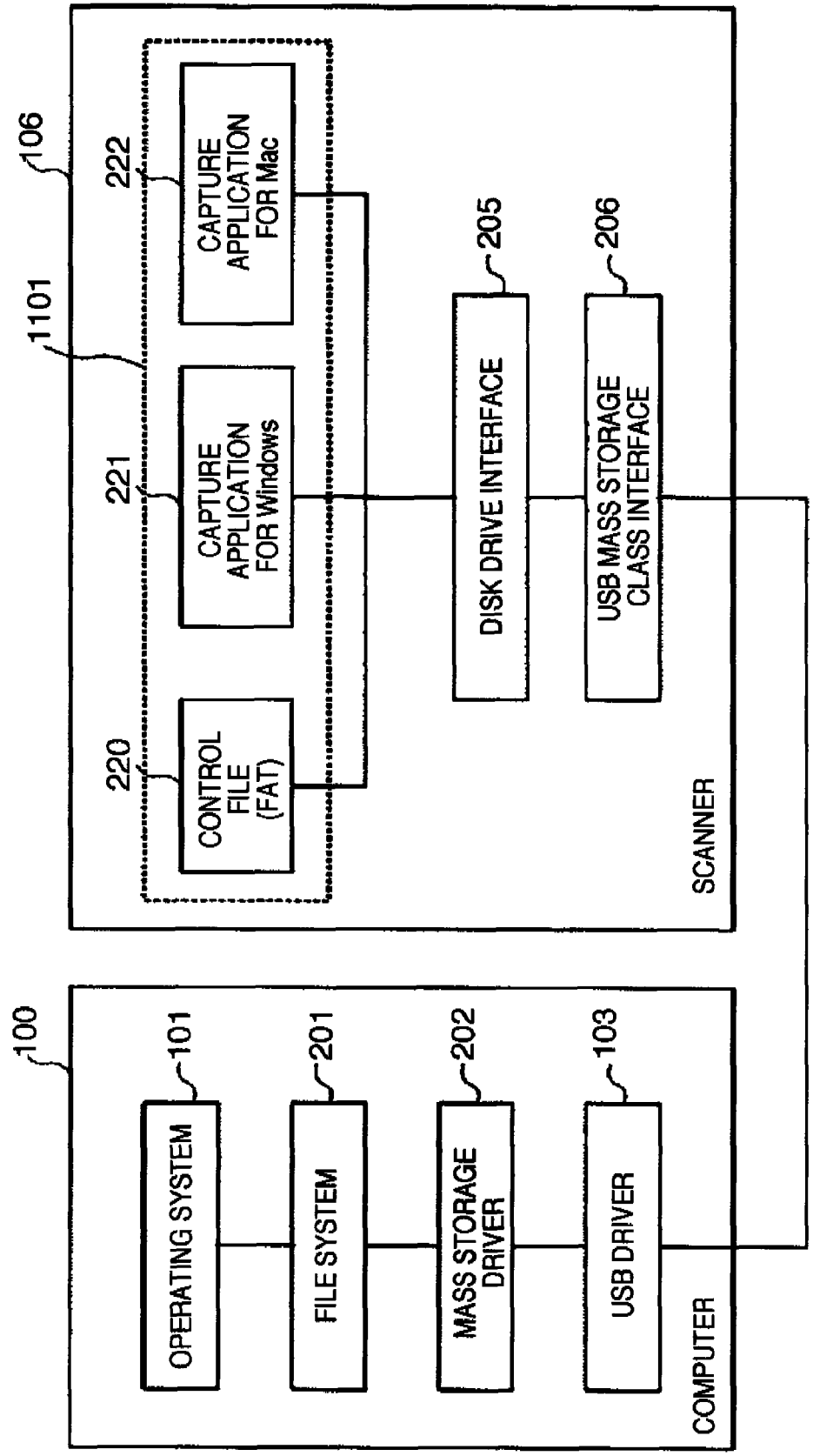
FIG. 11 is a software block diagram of a computer exemplified as a personal computer and a scanner serving as an image reading device according to the third embodiment of the present invention.

FIG. 11 is a software block diagram of a computer exemplified as a personal computer and a scanner serving as an image reading device according to the third embodiment of the present invention. Already described parts are given the same reference numbers to simplify the description. The FAT file system rasterized on a RAM 203 stores both a control program for Microsoft Windows® and that for MacOS®.

A WINDOWS® capture application 221 for FAT executable by Microsoft Windows® and a Mac capture application 222 for FAT executable by MacOS® are software to be executed by a computer 100 to control image reading. The function of these capture applications is the same as that of the above-described capture application 210. A control file 220 for FAT is a file in which the computer 100 executing the capture application 221 to 222 writes a control command or the like. The control file 220 has the same contents as those of the above-described control file 204. A ROM 127 serving as a first storage area holds a disk image 1101 of the FAT file system. This disk image is rasterized on part of the RAM 203 serving as a second storage area. A CPU 121 of the computer 100 accesses the storage area by recognizing it as the USB memory drive of the FAT file system.

Figure 12:
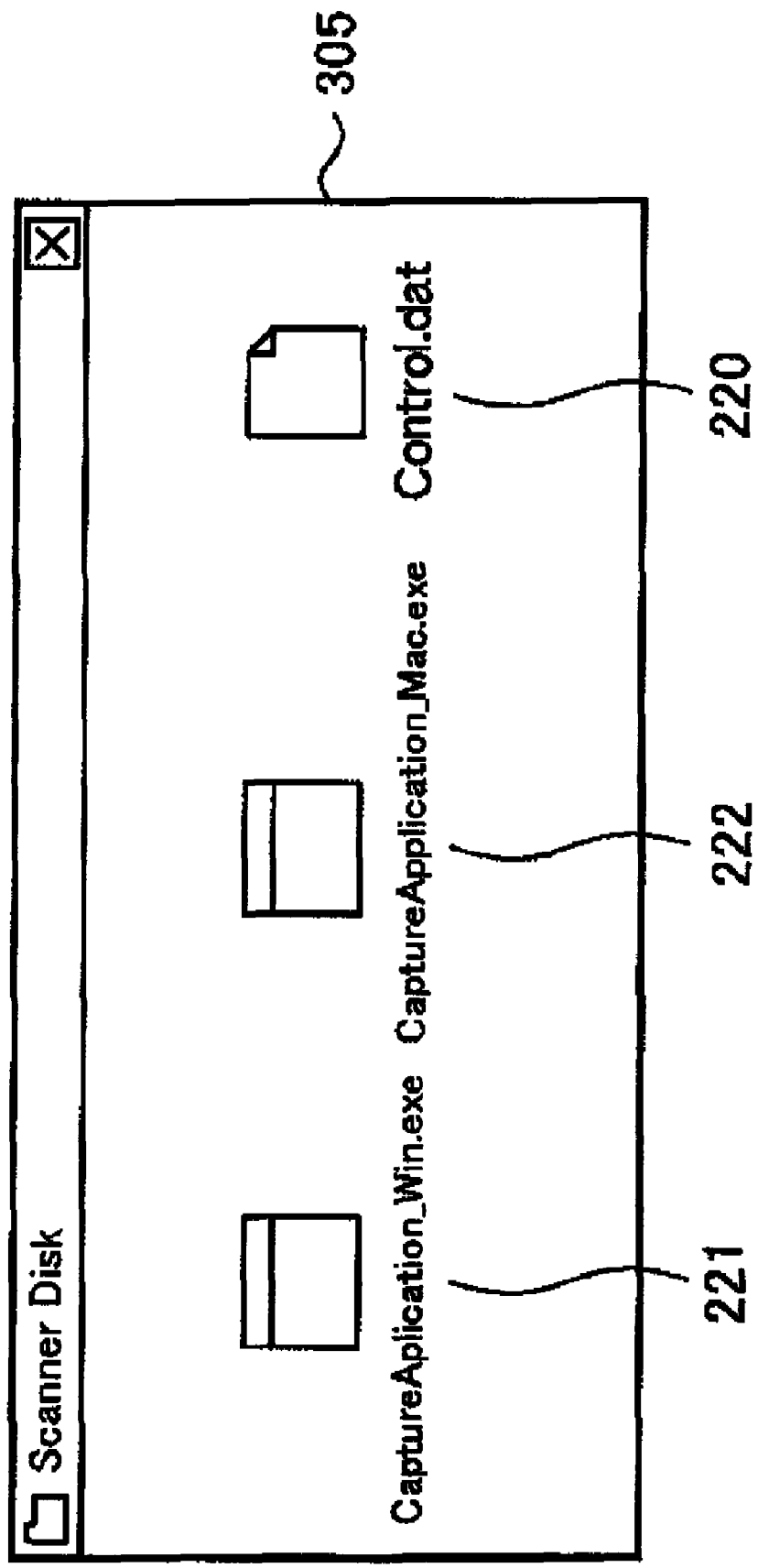
FIG. 12 is a view showing an example of a folder corresponding to a memory area recognized as a FAT disk drive according to the third embodiment of the present invention.

FIG. 12 is a view showing a state in which the scanner device 106 recognized by the computer 100 as an external storage device is opened as a folder. The CPU 121 recognizes that a folder 305 stores the WINDOWS® capture application 221, the Mac capture application 222, and the control file 220. The folder 305 is a folder in the FAT file system, and read/write of the file can be done by both the operating systems Microsoft Windows® and MacOS®. Note that the flowchart of image reading is the same as that shown in FIG. 7, and a description thereof will not be repeated here.

As described above, this embodiment also has the same advantages as in the first and second embodiments. In this embodiment, it is necessary to only prepare a single disk image to be rasterized as a single file system recognizable and accessible from both operating systems. Hence, the disk image can be simplified. Since storing the single disk image suffices, the storage space of the ROM 127 is not wasted. When the control file 220 is written back to the ROM 127, reading settings common to the plurality of operating systems can be used.

<Fourth Embodiment>

According to the feature of the fourth embodiment, a switch manually operable by the operator is provided in a scanner device 106 as a system switching unit which switches the file system of a second storage area recognized as an external storage device in accordance with the operating system of a computer 100.

Figure 13:
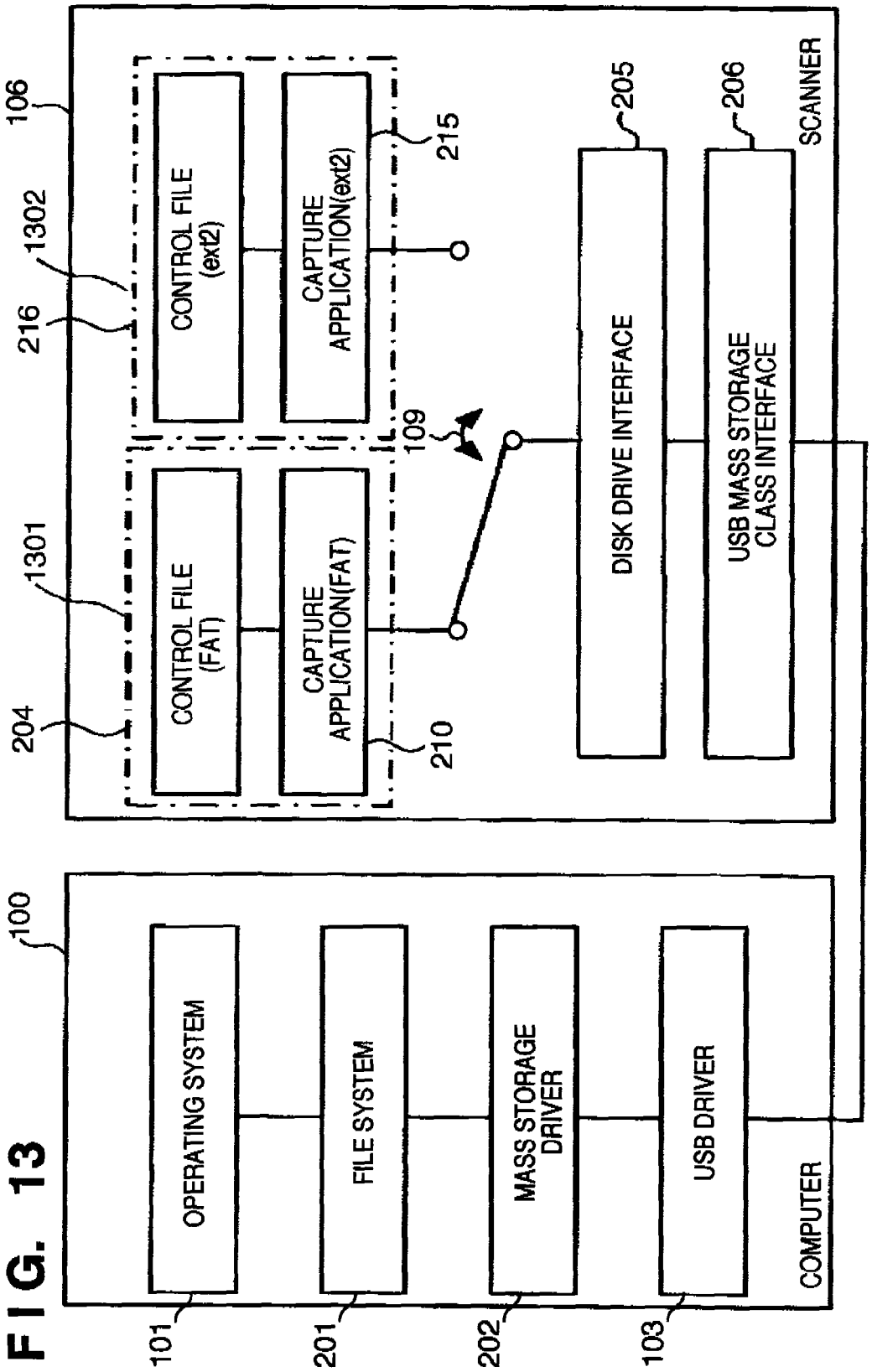
FIG. 13 is a software block diagram of a computer exemplified as a personal computer and a scanner serving as an image reading device according to the fourth embodiment of the present invention.
Figure 14:
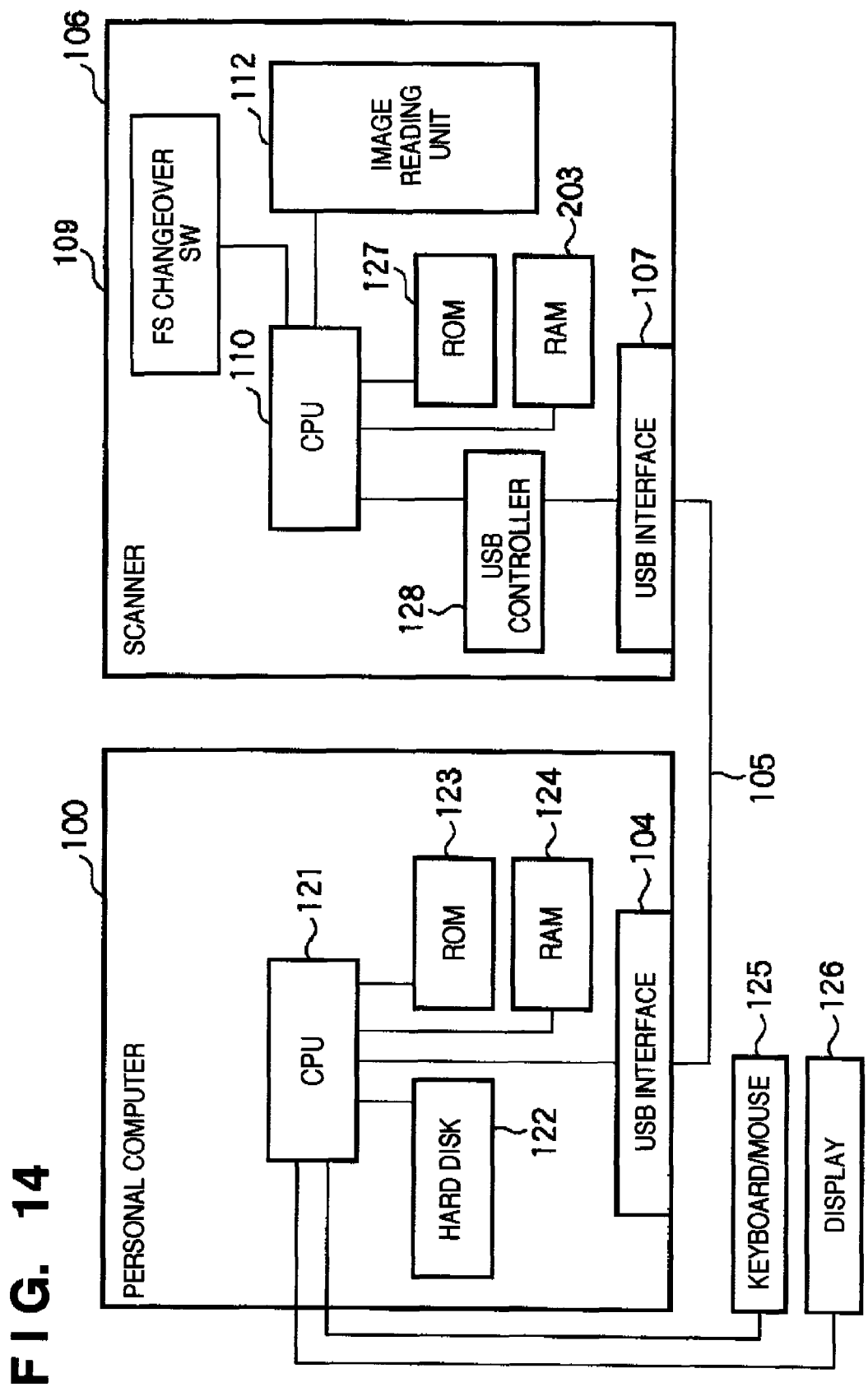
FIG. 14 is a hardware block diagram of the scanner and the computer exemplified as a personal computer according to the fourth embodiment of the present invention.

FIG. 13 is a software block diagram of a computer exemplified as a personal computer and a scanner serving as an image reading device according to the fourth embodiment of the present invention. FIG. 14 is a hardware block diagram of the scanner and the computer exemplified as a personal computer. Already described parts are given the same reference numbers to simplify the description.

As compared to the arrangement in FIG. 1, a capture application 210 for FAT and a control file 204 for FAT are stored in a first partition 1301 formatted by the FAT file system in the arrangement of FIG. 13. A capture application 215 for ext2 and a control file 216 for ext2 are stored in a second partition 1302 formatted by the ext2 file system. A ROM 127 stores a disk image corresponding to the first partition 1301 and a disk image corresponding to the second partition 1302. A CPU 110 detects the connection destination of a switch 109 to be used to switch the file system. If the switch 109 is connected to the FAT side, the CPU 110 rasterizes the disk image corresponding to the first partition 1301 on a RAM 203. The computer 100 thus recognizes the first partition 1301 of FAT as a USB memory drive. If the switch 109 is connected to the ext2 side, the CPU 110 rasterizes the disk image corresponding to the second partition 1302 on the RAM 203. The computer 100 thus recognizes the second partition 1302 of ext2 as a USB memory drive.

In the fourth embodiment, the switch 109 manually operable by the operator is provided to obtain the same effects as in the first embodiment. In the first embodiment, the auto-run file 207, OS discrimination script 211, and the like are necessary. However, they are unnecessary in the fourth embodiment. Since the OS discrimination step and the USB disk image are unnecessary, the same advantages as in the third embodiment are obtained.

In this embodiment, an example has been described in which the electrically operable switch 109 is used to switch the file system to be rasterized on the RAM 203 of the scanner device 106. Instead, the user interface of the capture application 210 or 215 shown in FIG. 15 may have a menu to switch the file system so as to write an FS designation command to designate the file system to be rasterized in the next activation in the control file 204 or 216 and the designation of the file system to be rasterized in the next activation in a nonvolatile memory such as the ROM 127 or an EEPROM (not shown) such that the CPU 110 can select the disk image to be rasterized on the RAM 203 in accordance with the above-described file system designation upon reboot according to manual power-on/off by the operator or power reset or software reset processing by a control program. That is, the switch 109 may be implemented as a software switch using an FS designation command and a nonvolatile memory.

<Fifth Embodiment>

In the above embodiments, the image reading device has been described as an example of a peripheral device. More specifically, the image reading unit 112 corresponds to the processing unit, and the CPU 110 corresponds to the reading control unit which controls the image reading unit 112. The CPU 110 controls the image reading unit 112 to sequentially write image data read by the image reading unit 112 in a control file on the RAM 203 serving as the second storage area. However, the peripheral device of the present invention can be an image forming device (printer) or a multi function peripheral having both an image reading function and an image forming function. In this case, the processing unit corresponds to the image forming unit, and the capture application corresponds to a print application. In addition, the CPU 110 functions as an image formation control unit which controls the image forming unit. The CPU 110 reads out data of an image formation job written in the storage unit by the information processing apparatus, and transfers it to the image forming unit so as to cause the image forming unit to execute image formation processing.

More specifically, a CPU 121 writes print job data in a control file 204 on the memory (a readable/writable disk drive assigned a drive letter) of the peripheral device in accordance with the print application. A CPU 110 of the peripheral device monitors the control file 204, and when the print job data is written, reads out the data, and transfers it to the image forming unit (printer engine). The CPU 110 may convert (for example, rasterize) the print job data as needed. The image forming unit thus executes print processing. As described above, the peripheral device may be an image forming device.

Note that in the present invention, since the device driver of the peripheral device is not installed in the computer, simple printing using the peripheral device is impossible. To do this, an application software (for example, wordprocessor or image editing software) of the computer writes the print target as a file of general-purpose format. The CPU 121 converts the file of general-purpose format into print job data, and writes it in the control file 204 or 216 in accordance with the print application activated from the storage unit of the peripheral device. Note that the file of general-purpose format may directly be written in the storage unit of the peripheral device. This allows the peripheral device to execute printing without installing its device driver.

In the above-described embodiments, the corresponding operating systems are Microsoft Windows®, MacOS®, and Linux®, and the corresponding file systems are FAT, HFS, and ext2, respectively. However, the corresponding operating systems may be any operating systems other than those described above. The corresponding file systems may also be any file systems other than those described above if they can read/write on the corresponding operating systems. The scanner device 106 may hold any file system combinations other than those described in the above embodiments. In addition, two or more file systems may be held.

The present invention has been described above based on the embodiments. However, the present invention can take a form of, for example, a system, apparatus, method, program (program product), or storage medium. More specifically, the present invention is applicable to a system including a plurality of devices, or an apparatus including a single device.

Note that according to the present invention, a peripheral device includes a storage unit having a first storage area which stores a plurality of control programs corresponding to a plurality of operating systems of different types, and a second storage area which is recognized by an information processing apparatus as an external storage device and in which at least one control program is replicated from the first storage area. The information processing apparatus reads out a control program from the second storage area recognized by the information processing apparatus as an external storage device, and executes the control program so that the information processing apparatus can control the peripheral device.

The "control program" is a program that allows the information processing apparatus to control the peripheral device. The program is executable by the information processing apparatus in a state in which the information processing apparatus recognizes the peripheral device (second storage area) as an external storage device.

"The information processing apparatus can control the peripheral device" indicates, for example, a case in which the operation of the peripheral device is controlled based on instruction information (example of a control signal) written by the information processing apparatus in the storage area of the peripheral device upon executing the control program. When the peripheral device is, for example, a scanner, the instruction information corresponds to scan setting information. Examples of scan setting information are various kinds of setting information including the reading mode (monochrome/color), paper size, resolution, and reading surface. Note that the instruction information includes information about the type of operating system of the information processing apparatus and instruction information to execute the control program corresponding to the operating system. By using these pieces of information, the peripheral device can quickly be connected so as to be controllable from the information processing apparatus. The instruction information may include information concerning the end or activation of the control program by the user. In this case, the user can know the control program use status in the information processing apparatus and, if the use of the control program has ended, switch the power of the peripheral device from on to off, contributing to reduction of power consumption.

The instruction information can be written in the storage area (more specifically, control file) of the peripheral device. In this case, the instruction information written in the storage area of the peripheral device is monitored in real time or at a predetermined timing, and the peripheral device is controlled based on the written instruction information. Whether the instruction information is written in the control file can be monitored by the above-described management program, the CPU of the peripheral device, or another monitoring unit. The control program may include the control file.

Note that in the present invention, the above-described control program may incorporate a management program that manages activation/termination of software or power-on/off of the peripheral device in accordance with the use state of software or the power state of the peripheral device.

In the present invention, the control program is executed in the storage area of the peripheral device by the information processing apparatus. However, the control program may be sent from the peripheral device to the storage area of the information processing apparatus and then executed by the information processing apparatus.

In the present invention, when the information processing apparatus is connected to the peripheral device, the connection is detected, and a control program corresponding to the operating system of the information processing apparatus is moved from the first storage area to the second storage area in the peripheral device so that the information processing apparatus can recognize the second storage area as an external storage device (area) and execute the control program, resulting in higher convenience to the user. This allows the information processing apparatus to use the peripheral device without installing, in it, a program to control the peripheral device. For this reason, even when the peripheral device has a limitation in installing a device driver or application software, or the user has not acquired the program, the peripheral device is usable. Additionally, since the peripheral device stores necessary software, the problem that the device becomes unusable because of missing of a CD-ROM can be solved.

Note that when the peripheral device is connected to the information processing apparatus by USB, and power is supplied to the peripheral device by USB bus power, an excellent effect can be obtained if the information processing apparatus is a battery-driven device such as a notebook personal computer. For example, if the information processing apparatus is a battery-driven device, the user requests long-time use in a limited battery capacity. In this case, reducing the power consumption of the peripheral device is especially advantageous in, for example, a battery-driven use environment.

In the above-described embodiments, when the information processing apparatus is connected to the peripheral device, the connection is detected, and the type of operating system of the information processing apparatus is determined. However, the present invention is not limited to this. For example, a plurality of connection units to the information processing apparatus may be provided on the main body of the peripheral device in correspondence with the operating systems, and the type of operating system may be specified based on the connection unit to which the information processing apparatus is connected.

In this case, the storage unit of the peripheral device may be partitioned for each operating system in correspondence with the connection units. However, this can also be implemented by preparing a moving unit or program that moves, out of the control programs corresponding to the types of operating systems, a control program corresponding to the specified operating system from the first storage area to the second storage area.

There may be a situation in which after use of the control program has completely finished on the information processing apparatus side, the peripheral device needs to be used immediately again. In this case, the cable that connects the information processing apparatus and the peripheral device may be removed/inserted, or the control program in the memory of the information processing apparatus may be searched for using the file system and re-executed. However, this makes the user operation cumbersome and brings some inconvenience. In the present invention, the user need not perform such a special operation because the peripheral device stores the control program, and the information processing apparatus may use it to execute the control program again. For example, in a state in which the peripheral device is connected to the information processing apparatus, and use of the control program has completely finished, the operation unit (for example, button) provided on the main body of the peripheral device may be operated to make the information processing apparatus execute the control program. If the peripheral device is a scanner, the information processing apparatus may execute the control program based on detection of the open/close operation of the paper feed tray or the like. When the information processing apparatus is connected to the peripheral device by USB, the USB bus power to the peripheral device may be turned on/off to attain the same situation as in removing/inserting a physical cable so as to cause the information processing apparatus to recognize the peripheral device again and execute the control program. Note that in the above-described examples, when the information processing apparatus is to execute the control program in the peripheral device, the control program may temporarily be moved from the peripheral device to the information processing apparatus and executed there. In any case, the above-described methods can further improve the convenience to the user in the peripheral device.

<Sixth Embodiment>

Setting information of an image reading device is generally held in a computer. However, a computer with limitations on installing software and the like can hold neither device drivers and software nor setting information without administrator authority. That is, if reading is performed after changing reading settings, setting information representing the contents of the change cannot be held in the computer for use later. Every time the image reading device is connected to the computer, initial settings take effect. This requires the user to do settings before reading each time and makes the burden heavy.

The present invention has as its object to solve at least one of this and other problems. For example, the present invention has as its object to enable to carry individual setting data of an image reading device while implementing image reading without installing the device driver of the image reading device in a computer. Note that additional objects of the present invention will become apparent throughout the specification.

The basic concept of the present invention will be explained first. An image reading device of the present invention includes a software storage unit which stores software to be executed by an information processing apparatus to use the image reading device, and a parameter file storage unit which stores a parameter to be applied to image reading for each information processing apparatus connected to the image reading device or for each user who uses the information processing apparatus. The software causes the information processing apparatus to function as a command sending unit which reads out a parameter corresponding to the information processing apparatus from the file storage unit and sends a command corresponding to the parameter to the image reading device.

The software has a feature of causing the information processing apparatus to function as, for example, an acquisition unit which acquires identification information assigned to the information processing apparatus, and a search extraction unit which searches the file storage unit for the corresponding parameter based on the identification information assigned to the information processing apparatus and extracts the parameter.

In addition, software has a feature of causing the information processing apparatus to function as an acquisition unit which acquires the identification information of a user who has logged in to the information processing apparatus, and a search extraction unit which searches the file storage unit for the corresponding parameter based on the identification information of the user and extracts the parameter.

Furthermore, the software has a feature of causing the information processing apparatus to function as a display unit which displays a user interface to present the parameter read out from the file storage unit, an accepting unit which accepts a change of the parameter via the user interface, and a write unit which writes the changed parameter in the file storage unit.

A control method of the present invention is a method of controlling an image reading device including an image reading unit, a software storage unit which stores software to be executed by an information processing apparatus to use the image reading device, and a file storage unit capable of reading/writing a file from the information processing apparatus, and includes the steps of causing the information processing apparatus to recognize the image reading device as an external storage device of the information processing apparatus, and reading out a control file written in the file storage unit by the information processing apparatus when the information processing apparatus has executed the software from the file storage unit, and executing a command included in the control file. The file storage unit stores at least one of a parameter to be applied to image reading for each information processing apparatus connected to the image reading device and a parameter to be applied to image reading for each user who uses the information processing apparatus. The software causes the information processing apparatus to function as a command sending unit which reads out the parameter from the file storage unit and sends a command corresponding to the readout parameter to the image reading device.

According to the present invention, since the information processing apparatus is made to recognize the image reading device as its external storage device, it is unnecessary to install the device driver of the image reading device in the information processing apparatus. In addition, since individual setting data for each user who uses the image reading device or for each computer connected to the image reading device can be carried, the burden on the user in setting is reduced.

Figure 16:
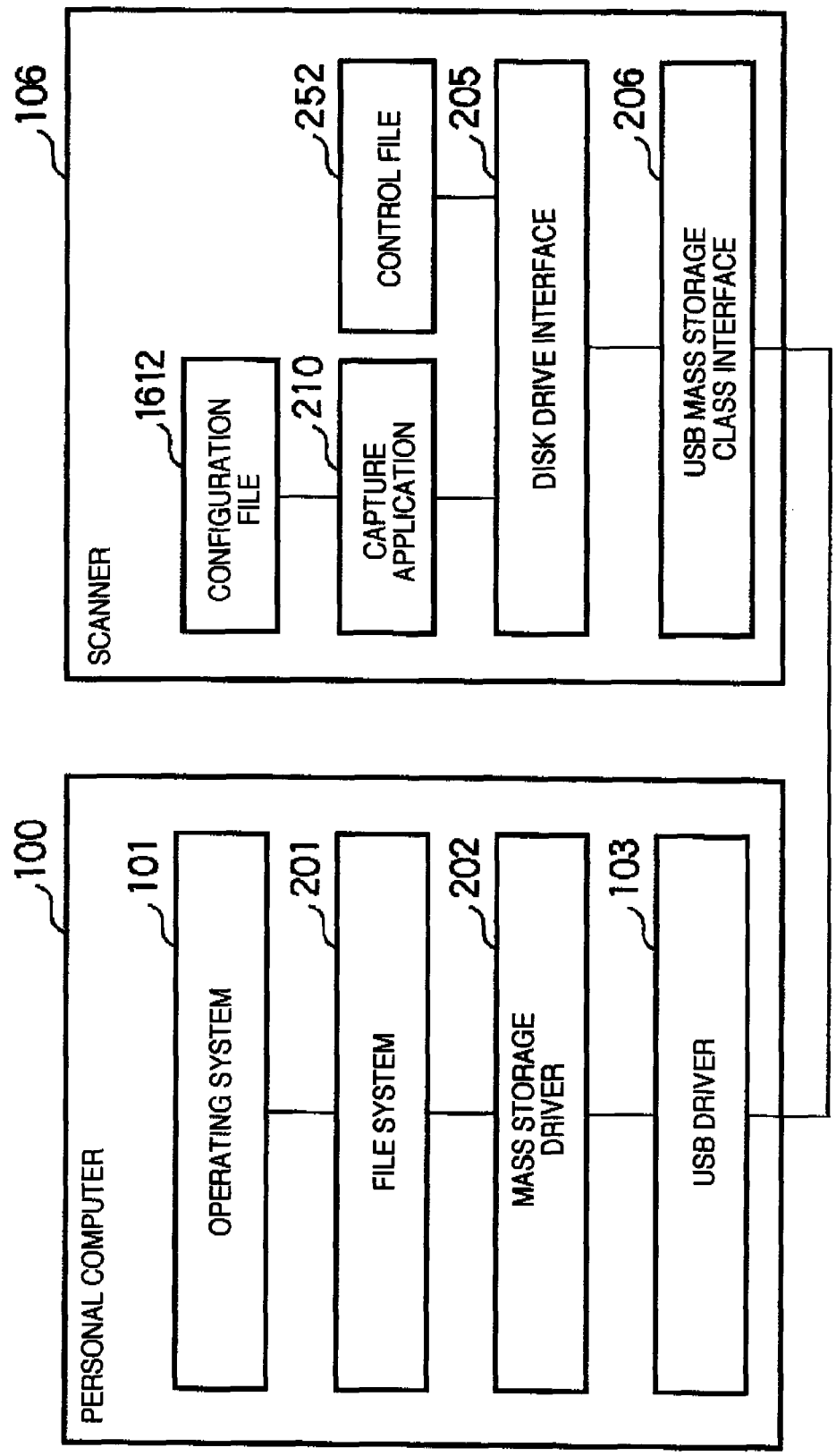
FIG. 16 is a software block diagram of a computer exemplified as a general information processing apparatus and a scanner serving as an image reading device according to the sixth embodiment of the present invention.

FIG. 16 is a software block diagram of a computer exemplified as a general information processing apparatus and a scanner serving as an image reading device according to the sixth embodiment of the present invention.

An operating system 101, file system 201, USB mass storage driver 202, and USB interface driver 103 are installed in a computer 100 that is an example of the information processing apparatus. The operating system 101 is a so-called OS serving as the fundamental software of the computer 100. The file system 201 is software configured to store files in a storage device such as a hard disk drive. The USB mass storage driver 202 is software configured to control a mass storage such as a hard disk drive, CD-ROM, DVD-ROM, CD-R, DVD-R, or USB memory. The USB interface driver 103 is software configured to control a USB device connected to a USB interface. Note that these pieces of software may be part of the OS.

On the other hand, a scanner device 106 that is an example of the peripheral device includes a capture application 210, control file 252, USB disk drive interface 205, and USB mass storage class interface 206. The capture application 210 is software to be executed by the computer 100 to control image reading. The control file 252 is a file in which the computer 100 executing the capture application 210 writes a control command or the like. The USB disk drive interface 205 is software configured to use a memory (for example, flash memory or EEPROM) provided in the scanner device 106 as a disk drive. The USB mass storage class interface 206 is software configured to use the memory as a USB mass storage via the USB disk drive interface 205.

Note that a general scanner device includes a USB scanner class interface in place of these pieces of software. A general computer includes capture application software and a dedicated scanner driver. In the present invention, however, the USB scanner class interface is not always needed. In addition, the personal computer does not always need the capture application software and the dedicated scanner driver.

A configuration file 1612 holds various kinds of parameters to be applied to image reading processing of the scanner device 106. Examples of parameters are the reading mode (monochrome/color), reading size (for example, A4/B5/arbitrary size), resolution (for example, 600 dpi/300 dpi), and reading surface (single-sided/double-sided).

Especially, the scanner device 106 of this embodiment executes image reading without installing the scanner driver and application software in the personal computer. This aims at making the scanner device 106 usable even if it is impossible to install these pieces of software without administrator authority. Note that if the user cannot install the software without administrator authority, it is also impossible to store the configuration file in the personal computer. This embodiment has a feature of storing, in the scanner device 106, at least one of a setting parameter for each computer and a setting parameter for each user.

The hardware block diagram of the computer and scanner is the same as FIG. 2. Note that in this embodiment, a ROM 127 is a nonvolatile memory in which the computer 100 can write information. The ROM 127 stores at least the capture application 210 and the configuration file 1612. Hence, the ROM 127 is an example of the file storage unit which stores the parameter to be applied to image reading for at least one of each information processing apparatus connected to the image reading device and each user who uses the information processing apparatus.

The scanner device 106 stores the capture application 210 and the control file 252 to control the scanner device 106 in the ROM 127 or RAM 203 in advance. The ROM 127 or RAM 203 can be implemented by combining a flash memory, EEPROM, DRAM, and the like. The capture application 210 is software to be used by the computer 100 to cause the scanner device 106 to read an image, and runs on the operating system 101.

The computer 100 forms, in a file folder associated with the file system 201, a table corresponding to the control file 252 and the capture application 210 stored in the scanner device 106.

Figure 17:
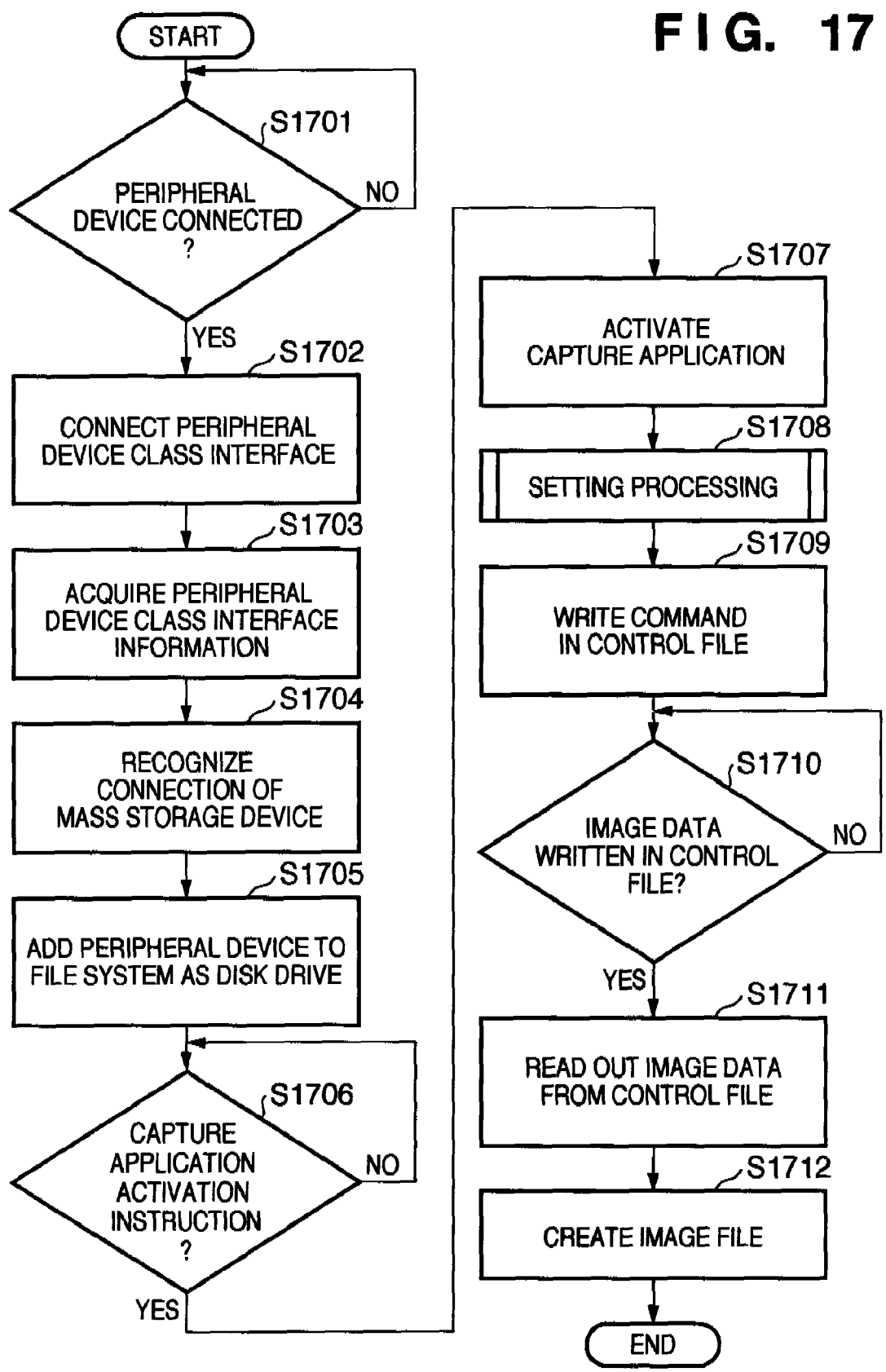
FIG. 17 is a flowchart of processing of causing the scanner device 106 to read an image using a capture application 210 from a computer 100.

FIG. 17 is a flowchart of processing of causing the scanner device 106 to read an image using the capture application 210 from the computer 100.

In step S1701, a CPU 121 of the computer 100 determines whether the scanner device 106 is connected.

In step S1702, the CPU 121 connects the scanner device 106 as a peripheral device class interface.

In step S1703, the CPU 121 acquires peripheral device class interface information from the scanner device 106. This information allows to recognize the type of connected peripheral device.

When the scanner device 106 is connected to the computer 100, the CPU 121 recognizes in step S1704 that a USB mass storage device is connected. This is because the scanner device 106 has the USB mass storage interface, as described above. The scanner device 106 has the USB disk drive interface 205 as the subclass of the USB mass storage class interface 206. For this reason, the CPU 121 recognizes the connected scanner device 106 as a disk drive. That is, the USB mass storage class interface 206 is an example of a recognition control unit which causes the information processing apparatus to recognize the image reading device as its external storage device.

In step S1705, the operating system 101 forms, in a file folder associated with the file system 201, a table corresponding to the control file 252 and the capture application 210 stored in the scanner device 106. This allows the CPU 121 to handle the control file 252 and the capture application 210 stored in the scanner device 106 as files on a disk drive assigned a drive letter. This is because the scanner device 106 is recognized as a disk drive assigned a drive letter by the OS.

Figure 18:
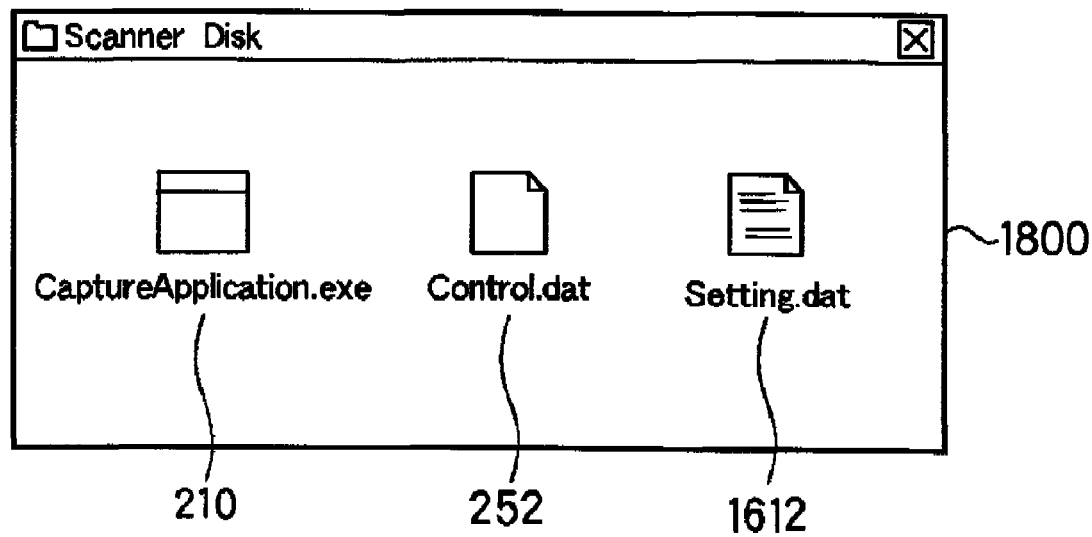
FIG. 18 is a view showing a state in which file management software (explorer) opens a disk drive (scanner) assigned a drive letter.

FIG. 18 is a view showing a state in which file management software (explorer) opens the disk drive (scanner) assigned a drive letter. The memory provided by the scanner device 106 corresponds to a folder 1800. The folder 1800 can be opened using a keyboard/mouse 125 connected to the computer 100. The folder 1800 stores the capture application 210 (file name: CaptureApplication.exe), the control file 252 (file name: Control.dat), and the configuration file 1612 (Setting.dat).

In step S1706, the CPU 121 determines whether an instruction to activate the capture application 210 in the folder 1800 is input. This instruction may be input from the keyboard/mouse 125 or by autorun.inf invisibly stored in the folder 1800. For example, in the Microsoft Windows® operating system, when a CD-ROM is inserted into the CD drive, the CPU detects a file called "autorun.inf" on the CD-ROM, and executes a command file designated to automatically run in "autorun.inf". Hence, the above-described CaptureApplication.exe is described in autorun.inf as the name of the command file that should automatically run.

Upon receiving the instruction to activate the capture application 210, the CPU 121 reads out the capture application 210 stored in the ROM 127 of the scanner device 106, loads the capture application to a RAM 124, and executes it in step S1707. The information processing apparatus thus executes software from the software storage unit of the image reading device recognized as an external storage device. Upon determining that a scan button 301 is clicked by the keyboard/mouse 125, the process advances to step S1708. In step S1708, the capture application 210 (CPU 121) executes scan settings. The computer 100 has a display 126 connected, and displays a user interface to execute the scan settings on the display 126.

Figure 19:
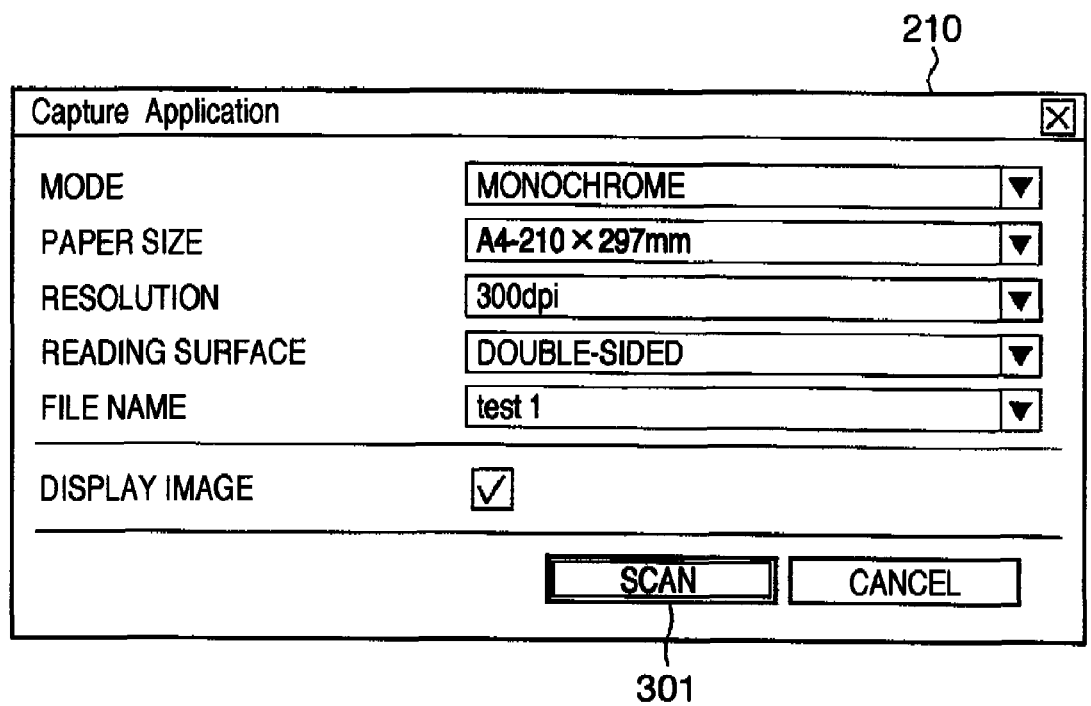
FIG. 19 is a view showing an example of a user interface displayed when the capture application 210 is activated.

FIG. 19 is a view showing an example of the user interface displayed when the capture application 210 is activated. When the user interface of the capture application 210 as shown in FIG. 19 is displayed, the user operates the keyboard/mouse 125 to input scan settings. For example, the user selects the reading mode (monochrome in this embodiment), paper size (A4 in this embodiment), resolution (300 dpi in this embodiment), and reading surface (double-sided in this embodiment) by using the keyboard/mouse 125. The file name (test1 in this embodiment) of an image file to store a read image is also input by operating the keyboard/mouse 125. In addition, an application setting, for example, whether to display, on the display 126, an image read by the capture application 210 (a checkmark ON state is TRUE in this embodiment) can be selected by operating the keyboard/mouse 125. Finally, the operator clicks the scan button 301 using the keyboard/mouse 125.

As described above, the user interface for scan setting confirmation and change shown in FIG. 19 displays the currently selected contents of various setting items. Especially, setting item contents selected immediately after activation of the capture application are selected based on the contents the CPU 121 has read out from the configuration file 1612. The reading setting contents are displayed on the user interface by causing the CPU 121 to recognize the identification information of the computer or user and extract reading setting contents corresponding to at least one of them from the configuration file 1612. Setting processing of changing the reading setting contents using the user interface will be described later in detail.

In step S1709, the capture application 210 (CPU 121) receives the scan settings, and writes them in the control file 252 in the scanner device 106, thereby sending the scan settings to the scanner device 106. The CPU 121 also writes a scan start command in the control file 252. Note that the scan settings may be data transferred as an attachment to the scan start command. The CPU 121 thus functions as a command sending unit which reads out the parameter corresponding to the information processing apparatus from the file storage unit, and sends a command corresponding to the readout parameter to the image reading device. The capture application 210 is an example of software which causes the information processing apparatus to function as the command sending unit.

A CPU 110 of the scanner device 106 monitors whether the control file 252 is updated. When the control file 252 is updated, the CPU 110 analyzes it, and executes a command included in the control file 252. For example, upon detecting that the scan settings and the scan start command are written in the control file 252, the CPU 110 controls an image reading unit 112 based on the scan settings written in the control file 252, thereby starting scan. That is, the CPU 110 is an example of an execution unit which analyzes the control file written in the file storage unit, and executes a command included in the control file. The CPU 110 is also an example of an execution unit which, when the information processing apparatus executes software from the software storage unit, reads out the control file the information processing apparatus has written in the file storage unit based on the software, and executes a command included in the control file.

When scan starts, the scanner device 106 writes image data read by the image reading unit 112 in a control file. The control file can be either identical to or different from the control file 252 in which the scan settings and command are written. They are assumed to be identical here for the descriptive convenience. Alternatively, not a control file but another file to be used to transfer image data may separately be prepared.

In step S1710, the CPU 121 of the computer 100 monitors whether the image data is written in the control file 252. Upon detecting that the image data is written in the control file 252, the process advances to step S1711.

In step S1711, the CPU 121 reads out the image data from the control file 252.

In step S1712, the CPU 121 creates a designated image file (file name "test1" in this embodiment), and stores it in a hard disk drive 122.

The data size per image may be larger than the size of the buffer allocated in the RAM 203. This readily occurs when the document size is large, or the image compression ratio is low. Note that the buffer may be allocated in a memory (not shown) other than the RAM 203.

In this embodiment, if the size of image data exceeds the storage capacity of the buffer, the CPU 110 executes reading and storage in the control file 252 for each partial image data in a size smaller than the image data size. Partial image data is image data of a part of overall image data representing a whole image.

When the buffer has become full of partial image data read from a document, the CPU 110 writes status data representing it in the control file 252. The CPU 110 also stores the partial image data in the control file 252. That is, the CPU 110 is an example of a saving unit which saves, in the control file, partial image data stored in the buffer.

The CPU 121 of the computer 100 reads out part of the control file 252, and determines whether the status data representing the full state is stored. That the status data representing the full state is stored means that the partial image data can be transferred. Hence, the CPU 121 reads out the partial image data from the control file 252, stores them in the RAM 124, and also deletes them from the control file 252. That is, the status data is an example of a notification unit which notifies that transfer of the partial image data is possible. Note that the notification unit may be prohibited from responding to a read request of a control file or another file from the information processing apparatus after the information processing apparatus executing the software has written the command in the control file until the execution unit has completed partial image data write in the control file or the other file.

When the partial image data are deleted from the control file 252, the CPU 110 of the scanner device 106 resumes image reading. When the buffer has become full of new partial image data read from the document, the CPU 110 writes status data representing it in the control file 252. These operations are repeatedly executed until image reading of one document is completed. When image reading of one document is completed, the CPU 110 writes status data representing completion of image reading in the control file 252.

The CPU 121 of the computer 100 reads out the control file 252, and determines whether the status data representing completion of reading is stored. If the status data representing completion of reading is stored, the CPU 121 creates image data corresponding to one image from the series of partial image data stored in the RAM 124. Note that the operation of the CPU 121 is implemented by causing the CPU 121 of the computer 100 to store the capture application 210 stored in the scanner device 106. On the other hand, the operation of the CPU 110 of the scanner device 106 is implemented by firmware.

<Image Data Transfer Processing>

A general scanner device executes image reading under the direct control of a scanner driver installed in a computer. Hence, the scanner device successively transfers image data to the computer. In this embodiment, however, since image data is transferred via not a scanner driver but a mass storage driver, the size of the buffer provided in the scanner device limits the size of image data.

In this embodiment, a method of divisionally storing image data larger than the size of the buffer of the scanner device 106 will be described in detail. That is, the above-described process in steps S1709 to S1712 will be explained in more detail.

[Command Sending/Reception]

Figure 20A:
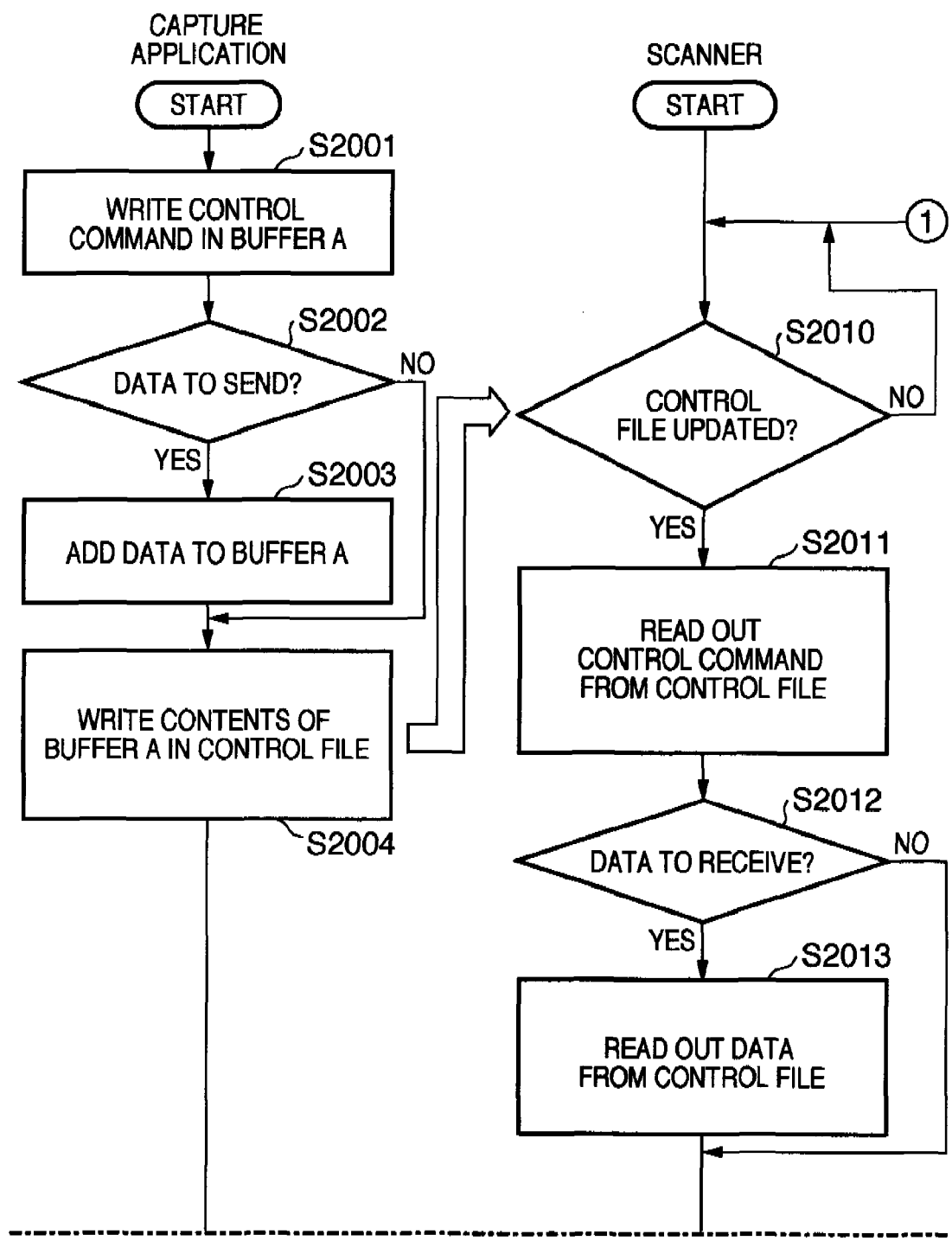
FIGS. 20A and 20B are flowcharts illustrating an example of divisional image data transfer.
Figure 20B:
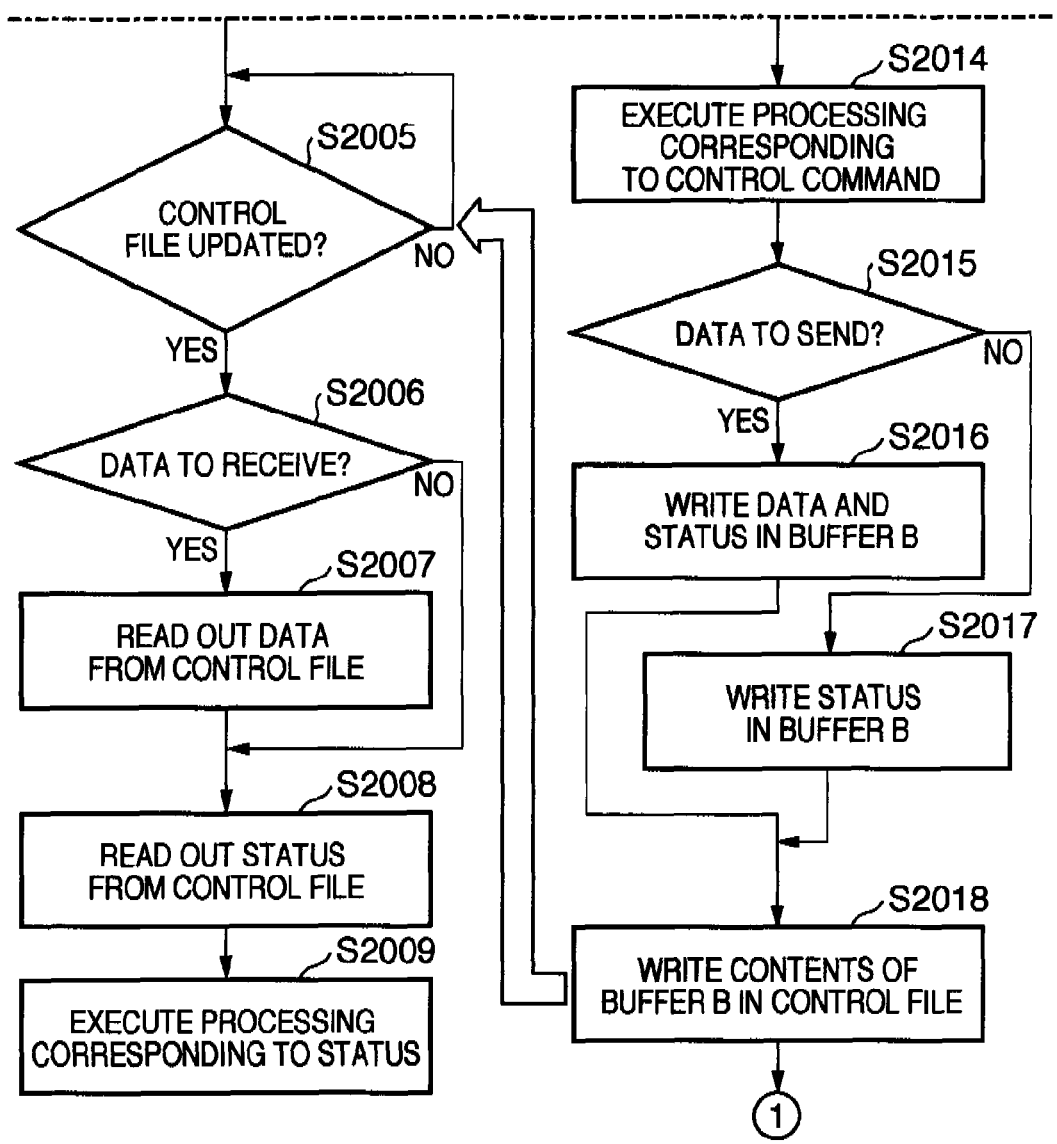

FIGS. 20A and 20B are flowcharts illustrating, as an example of divisional image data transfer, a communication protocol to be executed on the computer side and the scanner device side. Processing on the computer side to be described below is executed by the CPU 121 of the computer 100, which executes the capture application 210 stored on the side of the scanner device 106. That is, the subject on software is the capture application 210, and the subject on hardware is the CPU 121. Note that the CPU 121 of the computer 100 allocates a buffer A in the RAM 124 in accordance with the capture application 210. On the other hand, processing on the scanner device side to be described below is executed by the CPU 110 in accordance with firmware. That is, the subject on software is the firmware, and the subject on hardware is the CPU 110. Note that the CPU 110 of the scanner device 106 allocates a buffer B in the RAM 203 in accordance with the firmware. The CPU 121 of the computer 100 and the CPU 110 of the scanner device 106 access to the control file 252 temporarily using the buffer A and the Buffer B, respectively. For example, a command is firstly written in the buffer A, and then is written in the control file 252. Similarly, image data is firstly written in the buffer B, and then is written in the control file 252.

In step S2001, the CPU 121 of the computer 100 writes a control command in the buffer A in accordance with the capture application 210. The control command is, for example, a data sequence uniquely defined based on the SCSI command format.

As the control commands, for example, a Set Window command that sets the scan resolution and the like necessary for image acquisition, a Scan command that instructs to start image acquisition, a Read Image command to be used to read image data, and the like are defined in advance. Control command definition information representing the relationship between the control commands defined in advance and their meanings is held in both the capture application 210 and the scanner device 106. The control command definition information includes a unique command data sequence to identify each command, an integer value representing the length of the command data sequence, a true/false value representing the necessity of transfer of data attached to the command, and information representing the data transfer direction (transfer from the scanner device 106 to the capture application 210 or vice versa).

In step S2002, the CPU 121 determines whether it is necessary to send the control command together with attached data. The CPU 121 searches for command definition information using the control command written in the buffer A as a key, and determines based on the extracted true/false value whether to attach data. If data should be attached to the control command, the process advances to step S2003. On the other hand, if no data should be attached to the control command, the process advances to step S2004.

In step S2003, the CPU 121 additionally writes the data in the buffer A following the control command already written in step S2001.

In step S2004, the CPU 121 writes the contents of the buffer A in the control file 252 stored in the scanner device 106. Note that in this embodiment, when the capture application 210 starts read- or write-accessing the control file 252, the file cache function of Microsoft Windows® may impede normal communication. To prevent this, the CPU 121 disables the file cache function.

The scanner device 106 stands by while monitoring until the control file 252 is updated in step S2004. In step S2010, the CPU 110 of the scanner device 106 determines whether the control file 252 is updated. To detect update of the control file 252, for example, the CPU 110 refers to the sector address at which the control file 252 exists based on the address table of the file system held in the RAM 203 of the scanner device 106. When data write from the computer 100 to the sector address is performed, and the end of write is detected, the CPU 110 determines that the control file 252 is updated. As another example, the CPU 110 reads out the control file 252 at a predetermined period, and upon detecting a change in the contents, size, date, or the like of the control file 252, determines that the control file 252 is updated. The control file update detection processing is exclusively controlled not to overlap the write/read processing in the control file 252 by the capture application 210.

In step S2011, the CPU 110 reads out the command data sequence in a size corresponding to the control command from the top of the control file 252. The CPU 110 acquires the length of the control command written in the control file 252 by referring to the command definition information, thereby reading out the command data sequence.

In step S2012, the CPU 110 analyzes the control file 252, and determines whether data is attached to the received control command. If no data is attached, the process advances to step S2014. If data is attached, the process advances to step S2013.

In step S2013, the CPU 110 reads out the attached data from the end of the control file. The length of the attached data to be read out is acquired by referring to the above-described command definition information.

In step S2014, the scanner device 106 executes the control command extracted from the control file 252. For example, if the control command is the above-described Set Window command, the CPU 110 allocates an area to hold scan settings in the RAM 203 of the scanner device 106, and writes the scan settings in there based on the received attached data. For example, if the control command is a Scan command, the CPU 110 controls the image reading unit 112 and the like by referring to the area where the scan settings are held in the RAM 203, and saves acquired image data in a scan buffer separately allocated in the RAM 203.

In step S2015, the CPU 110 determines whether the control command extracted from the control file 252 requires attached data sending. This determination is executed by referring to the control command definition information. If the command requires data sending, the process advances to step S2016. If the command does not require data sending, the process advances to step S2017.

In step S2016, the CPU 110 writes data corresponding to the command in the buffer B together with status data corresponding to the received command. For example, if the control command is a Read Image command, the CPU 110 extracts, out of the image data acquired by controlling the image reading unit 112 and the like, image data in a size designated by the capture application 210, and writes the image data in the buffer B. Then, the process advances to step S2018.

In step S2017, the CPU 110 writes status information corresponding to the received command in the buffer B. Then, the process advances to step S2018. Status information represents the execution status of the received control command. Examples of status information are GOOD STATUS representing that processing corresponding to the control command has normally been performed, and BUSY representing that the scanner device 106 is executing another processing and cannot receive the command. Note that when attached data is written in the buffer B in step S2016, the CPU 110 adds similar status information to, for example, the end of the attached data.

When writing the data to be sent to the capture application 210 in the buffer B is completed, the CPU 110 writes the contents of the buffer B in the control file 252 in step S2018. Note that the data write processing in the control file 252 by the scanner device 106 is exclusively controlled not to overlap the write/read processing in the control file 252 by the capture application 210. At this time, the control command remains the same as the received one. However, the control command may be changed.

When the process in step S2018 has ended, the scanner device 106 returns to step S2010.

In step S2005, the CPU 121 of the computer stands by until the control file 252 is updated while monitoring the control file 252. To monitor the control file and detect its update, for example, the CPU 121 repeatedly reads out the contents of the control file 252 except the attached data at a predetermined period, and compares them with the contents of the control file stored in the RAM 124. If the current control file does not match the previous control file, the CPU 121 determines that the control file 252 is updated. Alternatively, for example, another notification file may be read out to determine update of the control file 252 based on its contents. Otherwise, for example, if the CPU 121 of the computer is going to read out the control file 252 during the time from control command update in step S2010 to update of the control file 252 in step S2018, the scanner device 106 may control the USB disk drive interface 205 to block the processing not to return a response. In this case, the CPU 121 of the computer executes read processing of the control file 252, and upon detecting the end of the processing, determines that the control file 252 is updated. The contents of the control file 252 having been determined to be updated and read out are held in the RAM 124.

In step S2006, the CPU 121 determines whether the control command written in the control file 252 for sending in step S2004 or the control command read out from the control file 252 in step S2005 requires reception of attached data. This determination is executed by referring to the above-described command definition information, as in step S2002. If the sent or readout control command requires reception of attached data, the process advances to step S2007. If the command does not require reception of attached data, the process advances to step S2008.

In step S2007, the CPU 121 reads out the attached data from the control file 252.

In step S2008, the CPU 121 reads out the status information from the control file 252. If attached data exists, the status information is extracted from the end of the attached data. On the other hand, if no attached data is received, the status information is read out from the top of the control file 252.

In step S2009, the CPU 121 determines the operation to be performed next based on the status information, and executes it. For example, if the status information is GOOD STATUS, the CPU 121 continuously executes next command sending/reception. If the status information is, for example, BUSY indicating an error, the CPU 121 issues a new command to acquire the factor (step S2001). The CPU 121 reads out detailed information the scanner device 106 has written in the control file 252 in response to the command (S2007 and S2008). In accordance with the detailed information, the CPU 121 displays a dialog box to notify the factor on the display 126.

<Details of Image Data Transfer Processing>

Figure 21:
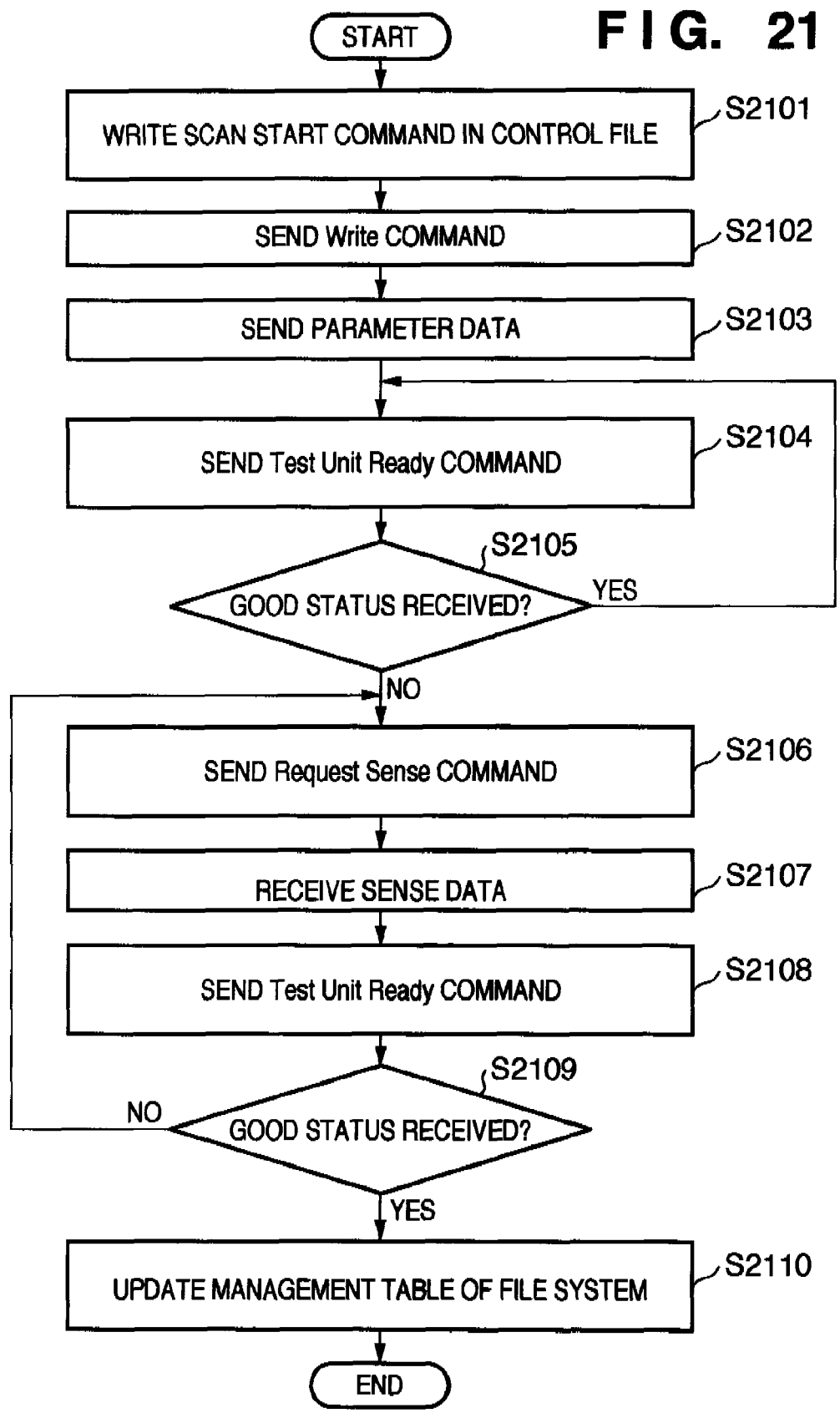
FIG. 21 is a flowchart illustrating an example of image transfer processing on the computer side according to the embodiments.
Figure 22:
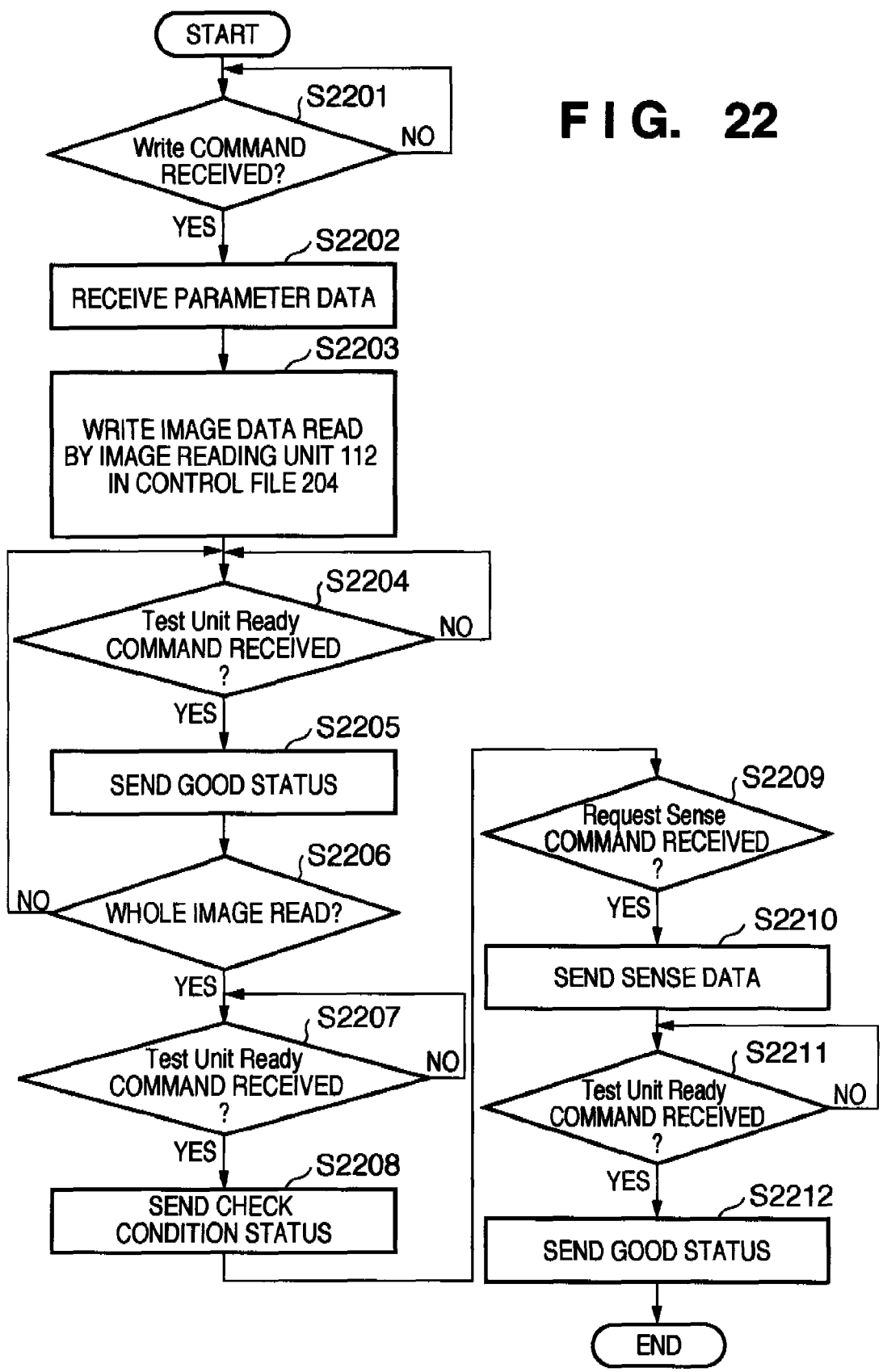
FIG. 22 is a flowchart illustrating an example of image transfer processing on the scanner side according to the embodiments.

FIG. 21 is a flowchart illustrating an example of image transfer processing on the computer side according to the above-described embodiments. FIG. 22 is a flowchart illustrating an example of image transfer processing on the scanner side according to the above-described embodiments.

The mass storage class of the above-described embodiments supports sending/reception in the SCSI command system. That is, the computer 100 issues commands of the SCSI command system to the mass storage device. When a mass storage device is connected, the Microsoft Windows® operating system 101 of the computer 100 periodically issues a Test Unit Ready command.

When sending a scan start command from the computer 100 to the scanner device 106, the capture application 210 first prepares writing the scan start command in the control file 252 (S2101). More specifically, the capture application 210 performs an operation of reading out reading setting contents for each computer or user from the configuration file 1612, an operation of writing the reading setting contents in the control file 252 so as to send them and do reading setting of the scanner device 106, and the like. Next, when the Microsoft Windows® operating system 101 issues a Write command (S2102), the capture application 210 writes, as its parameter data, the scan start command in the control file 252 so as to send it (S2103).

The scanner device 106 reads out the parameter data of the Write command from the control file 252 (S2201 and S2202), starts scan, and writes image data read by the image reading unit 112 in the control file 252 (S2203).

At this time, if read image data is being written in the control file 252, the scanner device 106 returns GOOD status representing the normal state in response to the Test Unit Ready command (S2204 and S2205). The computer 100 periodically sends the Test Unit Ready command (S2104).

After that, when image data write in the control file 252 has ended (S2206), the scanner returns, in response to the Test Unit Ready command (S2207), CHECK CONDITION status representing an error end state (S2208).

Upon receiving CHECK CONDITION status in place of GOOD status from the scanner device 106 (NO in step S2105), the operating system 101 of the computer 100 issues a REQUEST SENSE command to acquire detailed information of the error end state (S2106).

The scanner device 106 has returned CHECK CONDITION status in response to the preceding Test Unit Ready command. For this reason, upon receiving the REQUEST SENSE command (S2209), the scanner device 106 sends a MEDIUM NOT PRESENT sense key and sense code or a MEDIUM MAY HAVE CHANGED sense key and sense code as sense data to cause the computer to virtually recognize that the CD-ROM or the like has changed (S2110).

Upon receiving the MEDIUM NOT PRESENT sense key and sense code or the MEDIUM MAY HAVE CHANGED sense key and sense code from the scanner device 106 as sense data (S2107), the operating system 101 of the computer 100 determines that the medium of the mass storage device such as a CD-ROM is ejected. Additionally, the operating system 101 of the computer 100 periodically issues the Test Unit Ready command to wait for insertion of a medium of the mass storage device (S2108).

Upon receiving the next Test Unit Ready command after returning the check condition status (S2211), the scanner device 106 returns GOOD status representing the normal state (S2212).

The operating system 101 of the computer 100 receives the GOOD status (S2109), and determines that a medium of the mass storage device is inserted. The operating system 101 updates the management table in the file system 201 corresponding to the control file 252 in the scanner device 106, and recognizes by the updated management table that image data is written in the control file 252 (S2110).

The capture application 210 thus recognizes image data write in the control file 252, and saves the written image data in a designated save file name (test1 in this embodiment).

Note that in the embodiment, CHECK CONDITION status is returned in response to the Test Unit Ready command, as described above. However, the CHECK CONDITION status may be returned in response to another command (for example, Mode Select command or Start-Stop Unit command) issued by the operating system 101 of the computer 100. That is, the CPU 110 returns CHECK CONDITION status upon receiving one of the Test Unit Ready command, Mode Select command, and Start-Stop Unit command sent from the information processing apparatus after partial data transfer is enabled. Update of the control file 252 is thus communicated.

In the above-described embodiment, the scanner device behaves to make the computer virtually recognize that the medium of the mass storage device is ejected/inserted, thereby prompting the operating system 101 to update the management table in the file system 201. However, the scanner device may control to nullify both the D+ and D− signals of the USB bus and transit to a USB bus reset state, thereby behaving as if the USB device were detached. More specifically, when partial data is written in the buffer, as described above, the CPU 110 changes both the D+ and D− signals of the USB bus that connects the image reading device and the information processing apparatus to zero to transit to the USB bus reset state. This allows to communicate update of the control file 252.

According to the above-described embodiments, the information processing apparatus recognizes the image reading device as its external storage device (for example, USB mass storage class), thereby obviating the necessity of installing the device driver of the image reading device in the information processing apparatus. In addition, since partial image data in a small size is acquired and stored in the control file so as to be readable, even a relatively large image can be read.

Especially, reading and transfer of image data are executed for each of a plurality of smaller partial image data, thereby transferring a large image even when the buffer size is small.

In addition, transferring partial data via a control file allows to implement image reading while keeping the image reading device recognized as an external storage device.

Normally, to transfer partial data via a control file, the information processing apparatus needs to be notified that the partial data is written in the control file. There also exists a method of monitoring the control file periodically. However, if the monitoring period is long, many delays occur. If the monitoring period is too short, waste of monitoring operation increases. To prevent this, the image reading device may notify the information processing apparatus that the partial image data is written in the control file. More specifically, the image reading device returns CHECK CONDITION status upon receiving the Test Unit Ready command, Mode Select command, or Start-Stop Unit command from the information processing apparatus. This causes the information processing apparatus to look up the file table and recognize update of the control file.

Alternatively, both the D+ and D− signals of the USB bus may be changed to zero to transit to the USB bus reset state. In this case as well, the file table is looked up, and update of the control file is recognized.

As described above, according to this embodiment, the image reading device is usable without installing a device driver or software in the computer. This is implemented by causing the information processing apparatus to recognize the image reading device as an external storage device, writing an image file in the external storage device, and causing the information processing apparatus to read out the image file. In general, the operating system (OS) that controls the information processing apparatus has not the device driver of the image reading device but the device driver of the external storage device. Placing focus on this point, the present invention makes it possible to cause the information processing apparatus to recognize the image reading device as an external storage device and perform image reading processing.

This saves the user installing the device driver or application software in the information processing apparatus. In addition, even a user without administrator authority can execute image reading.

It is unnecessary to prepare the device driver or application software. The CD-ROM storing them need not be carried or may be lost. The manufacturer need not place the CD-ROM in the product package to result in a lower manufacturing cost.

<Details of Setting Processing>

Details of scan setting described concerning step S1708 of FIG. 17 will be explained here.

Figure 23:
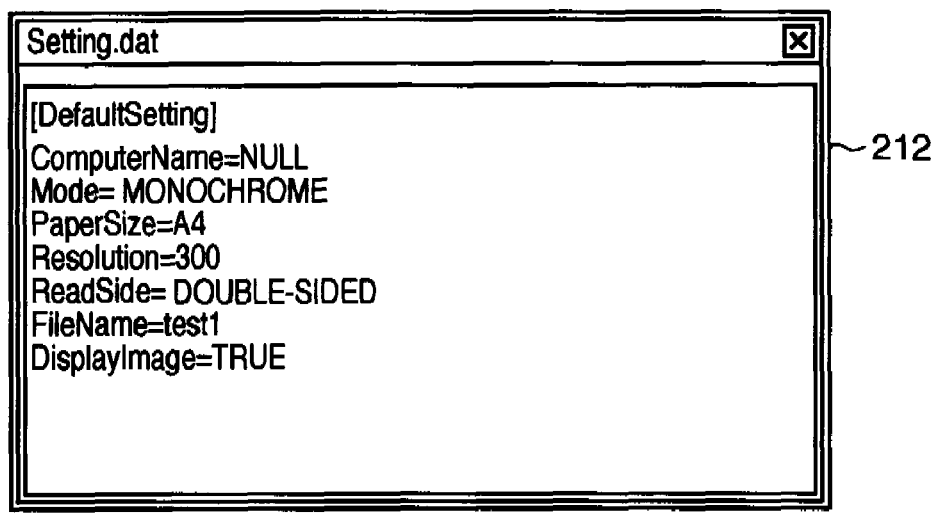
FIG. 23 is a view showing an example of a configuration file in the default state.

FIG. 23 is a view showing an example of a configuration file in the default state. In this case, setting items for each computer or user are described in one configuration file. Individual configuration files may be prepared for computers or users, as a matter of course, although it is cumbersome.

[DefaultSetting] indicates initial settings. The initial settings are used when the computer or user cannot be specified. Hence, NULL representing independence of computers is set in ComputerName. Mode represents the monochrome reading mode or color reading mode. PaperSize is the reading size. Resolution is the reading resolution. ReadSide represents single-side reading or double-sided reading. FileName is the file name to be given to a read image. DisplayImage represents whether to display a read image.

Figure 24:
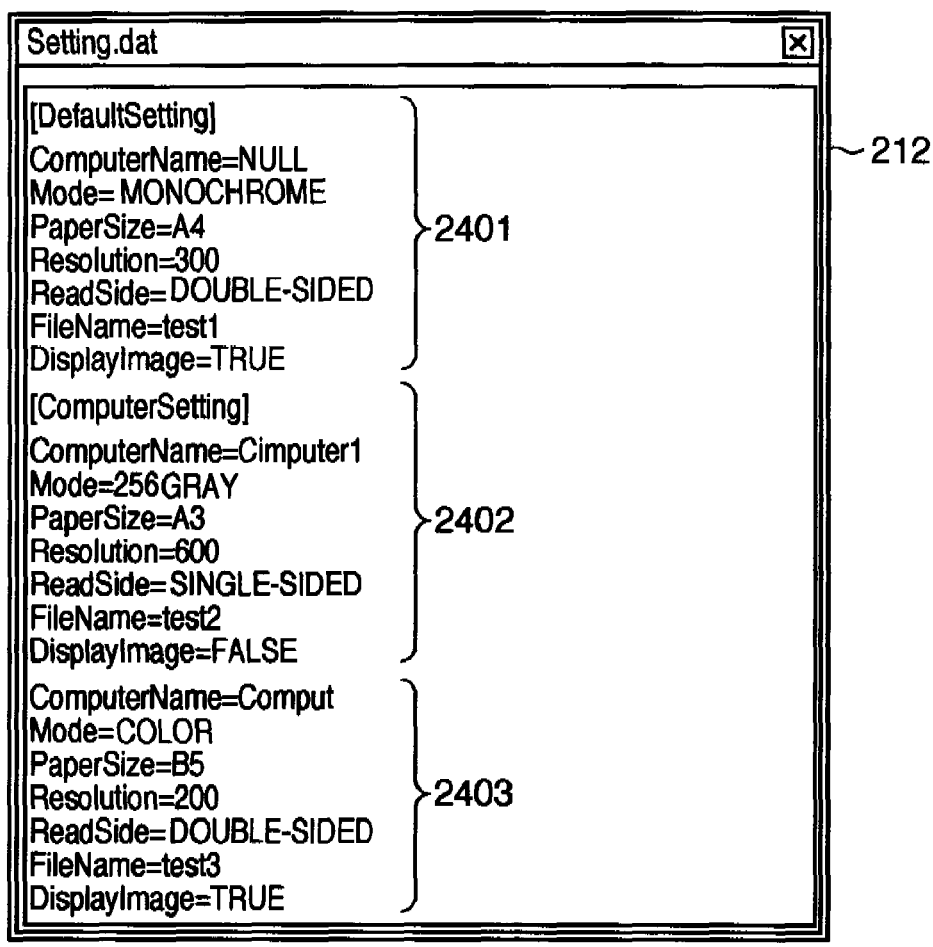
FIG. 24 is a view showing an example of the configuration file.

FIG. 24 is a view showing an example of the configuration file. In addition to an initial setting set 2401, a setting set 2402 for a first computer and a setting set 2403 for a second computer are illustrated. Each setting set includes a plurality of parameters (setting items and set contents).

As can be seen, the setting set 2402 for the first computer is used by a computer named "Computer1". Mode is 256-tone grayscale. PaperSize is A3. Resolution is 600 dpi. ReadSide indicates single-sided printing. FileName is "test2". DisplayImage is set to "off".

The setting set 2403 for the second computer is used by a computer named "Comput", as is apparent. Mode is color. PaperSize is B5. Resolution is 200 dpi. ReadSide indicates double-sided printing. FileName is "test3". DisplayImage is set to "on".

A method of identifying the computer 100 that uses the scanner device 106 will be described next.

The CPU 121 can acquire, by query, information managed by the operating system 101, for example, information such as the computer name or MAC address (Media Access Control address) of the computer 100 currently in use in accordance with the capture application 210. Although the software name is used as the operation subject for the descriptive convenience, the operation subject on hardware is the CPU 121.

More specifically, the capture application 210 sends the GetHostName command of Win32API, the address of the buffer that stores the computer name, and the data length of the computer name to the operating system 101 as parameters. The operating system 101 stores the computer name in the buffer designated by the capture application 210. This allows the capture application 210 to acquire the computer name of the computer 100 currently in use.

The capture application 210 inquires about the MAC address registered in a network card 129 using NetBios of Win32API. In response to this query, the operating system 101 acquires the MAC address from the network card 129 and sends it to the capture application 210. The capture application 210 can thus acquire the MAC address of the computer 100 currently in use.

The capture application 210 can identify the computer 100 in use based on uniquely assigned identification information such as the MAC address.

If a setting item included in the initial setting set is changed, the capture application 210 adds, to the configuration file 1612, a setting set having ComputerName that describes unique identification information such as a computer name or MAC address and setting items corresponding to the identification information. Such a new setting set is created by the CPU 121 by, for example, copying the initial setting set and reflecting only the changed setting item to the new setting set.

Figure 25:
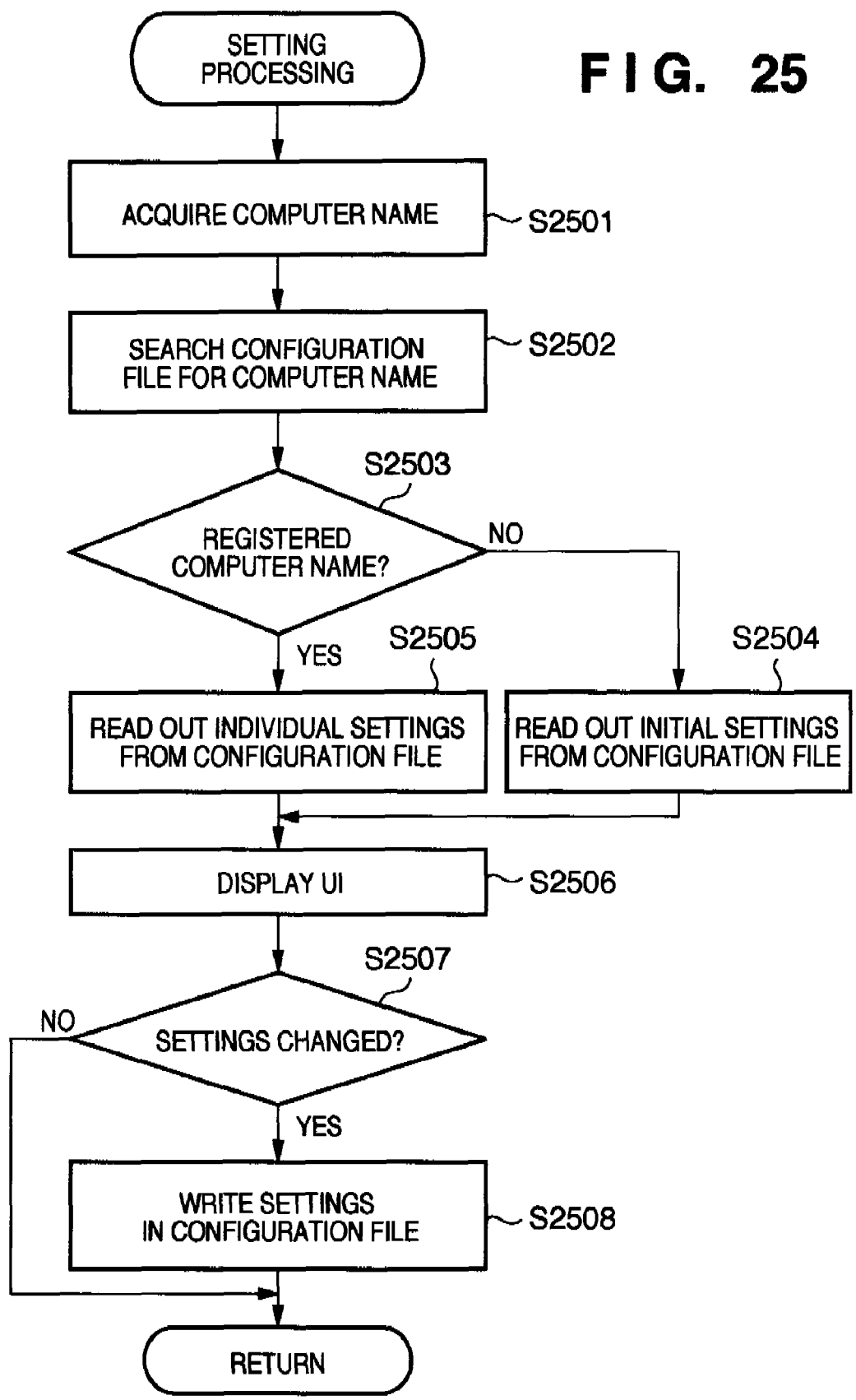
FIG. 25 is a flowchart illustrating an example of scanner setting processing.

FIG. 25 is a flowchart illustrating an example of scanner setting processing. This setting processing is a subroutine of step S1708. The following processing is executed cooperatively by the capture application 210 and the OS.

In step S2501, the CPU 121 of the computer 100 acquires the computer name of the computer 100. That is, the CPU 121 is an example of an acquisition unit which acquires identification information assigned to the information processing apparatus.

In step S2502, the CPU 121 searches the configuration file 1612 for the acquired computer name.

In step S2503, the CPU 121 determines based on the search result whether the acquired computer name is registered in the configuration file 1612. If the computer name is not registered in the configuration file 1612, the process advances to step S2504.

In step S2504, the CPU 121 reads out the initial setting set from the configuration file 1612 stored in the ROM 127 of the scanner device 106. The CPU 121 displays, on the display 126, a user interface that reflects the readout initial setting set (FIG. 19).

On the other hand, if the computer name is registered in the configuration file 1612, the process advances to step S2505.

In step S2505, the CPU 121 reads out various scan settings (setting sets) corresponding to the computer name from the configuration file 1612. That is, the CPU 121 is an example of a search extraction unit which searches the file storage unit for corresponding parameters based on the identification information assigned to the information processing apparatus, and extracts the parameters.

In step S2506, the CPU 121 displays, on the display 126, a user interface that reflects the individual readout setting sets (FIG. 19). Hence, the CPU 121 is an example of a display unit which displays a user interface to present the parameters read out from the file storage unit.

The CPU 121 detects that the user has pressed the scan button by operating the keyboard/mouse 125. Note that the user can select or input various scan settings via the user interface. The CPU 121 recognizes the scan settings selected or input via the keyboard/mouse 125. Hence, the CPU 121 can be regarded as an example of an accepting unit which accepts a change of a parameter via the user interface.

In step S2507, the CPU 121 compares the setting item designated via the user interface with the setting item specified from the configuration file 1612 (S2504 and S2505), thereby determining whether the setting item has changed. If the setting item is not changed, the process skips step S2508 and advances to step S1709. If the setting item is changed, the process advances to step S2508.

In step S2508, the CPU 121 writes the computer name and the changed setting item in the configuration file 1612. Hence, the CPU 121 is an example of a write unit which whites the changed parameter in the file storage unit. The set contents written at this time are read out by the computer 100 again before image reading in correspondence with the computer name. The computer 100 sends a command for scan setting by writing it in a control file so as to cause the scanner device 106 to do various settings necessary for image reading. Note that the command for scan setting may be integrated with the above-described scan start command.

Note that if the computer name of the computer 100 currently used by the user is already registered, and a parameter is changed, the CPU 121 rewrites the corresponding setting item in the configuration file 1612 in step S2508. On the other hand, if the computer name is not registered in the configuration file 1612, the CPU 121 adds a setting set corresponding to the computer name to the configuration file 1612. Then, the process advances to step S1709.

According to this embodiment, since the scanner device 106 holds the configuration file 1612 that stores settings corresponding to each personal computer, settings corresponding to the connected personal computer can easily be reflected. This is especially effective when the user cannot write a configuration file in the storage device of the personal computer because of limitations for the sake of security. The present invention is also applicable to a computer capable of writing a configuration file in the storage device of its own, as a matter of course.

When a setting is changed, the setting change is reflected on the configuration file stored in the scanner device 106. Hence, even when the computer connected to the scanner device 106 has changed, the user can read out and use new set contents that would be appropriate for the computer.

<Seventh Embodiment>

In the sixth embodiment, settings for each computer connected to the scanner device are stored in a configuration file. The settings may be switched between users. In the seventh embodiment, storing settings for each user in a configuration file will be described.

Generally, a CPU 121 (capture application 210) can acquire identification information of the current login user by inquiring of an operating system 101.

More specifically, the capture application 210 sends the GetHostName command of Win32API, the address of the buffer that stores the user name, and the data length of the user name to the operating system 101 as parameters. The operating system 101 stores the user name in the buffer designated by the capture application 210. This allows the capture application 210 to acquire the user name of the current login user.

The capture application 210 can discriminate the user who uses a computer 100 based on the acquired user name. The capture application 210 saves the user name in a configuration file 1612 as needed.

FIG. 26 is a view showing an example of the configuration file. As compared to FIG. 24, UserName representing a user name is employed in place of ComputerName. [DefaultSetting] indicates an initial setting set independent of the user name. [UserSetting] describes the contents of scan setting or application setting for each user. The remainings are the same as described with reference to FIG. 24.

FIG. 27 is a flowchart illustrating an example of scanner setting processing. This setting processing is a subroutine of step S1708. The following processing is executed cooperatively by the capture application 210 and the OS.

In step S2701, the CPU 121 of the computer 100 acquires the user name of the computer 100. That is, the CPU 121 is an example of an acquisition unit which acquires identification information of the user who has logged in to the information processing apparatus.

In step S2702, the CPU 121 searches the configuration file 1612 for the acquired user name.

In step S2703, the CPU 121 determines based on the search result whether the acquired user name is registered in the configuration file 1612. If the user name is not registered in the configuration file 1612, the process advances to step S2704.

In step S2704, the CPU 121 reads out the initial setting set from the configuration file 1612 stored in a ROM 127 of a scanner device 106. The CPU 121 displays, on a display 126, a user interface that reflects the readout initial setting set (FIG. 19).

On the other hand, if the user name is registered in the configuration file 1612, the process advances to step S2705.

In step S2705, the CPU 121 reads out various scan settings (setting sets) corresponding to the user name from the configuration file 1612. That is, the CPU 121 is an example of a search extraction unit which searches the file storage unit for corresponding parameters based on the identification information of the user, and extracts the parameters.

In step S2706, the CPU 121 displays, on the display 126, a user interface that reflects the individual readout setting sets (FIG. 19). Hence, the CPU 121 is an example of a display unit which displays a user interface to present the parameters read out from the file storage unit.

The CPU 121 detects that the user has pressed the scan button by operating a keyboard/mouse 125. Note that the user can select or input various scan settings via the user interface. The CPU 121 recognizes the scan settings selected or input via the keyboard/mouse 125. Hence, the CPU 121 can be regarded as an example of an accepting unit which accepts a change of a parameter via the user interface.

In step S2707, the CPU 121 compares the setting item designated via the user interface with the setting item specified from the configuration file 1612 (S2704 and S2705), thereby determining whether the setting item has changed. If the setting item is not changed, the process skips step S2708 and advances to step S1709. If the setting item is changed, the process advances to step S2708.

In step S2708, the CPU 121 writes the user name and the changed setting item in the configuration file 1612. Hence, the CPU 121 is an example of a write unit which whites the changed parameter in the file storage unit. The set contents written at this time are read out by the computer 100 again before image reading in correspondence with the user name. The computer 100 sends a command for scan setting by writing it in a control file so as to cause the scanner device 106 to do various settings necessary for image reading. Note that the command for scan setting may be integrated with the above-described scan start command.

Note that if the user name of the user who is currently using the computer 100 is already registered, and a parameter is changed, the CPU 121 rewrites the setting item in the configuration file 1612 in step S2708. On the other hand, if the user name is not registered in the configuration file 1612, the CPU 121 adds a setting set corresponding to the user name to the configuration file 1612. Then, the process advances to step S1709.

According to this embodiment, since the scanner device 106 holds the configuration file 1612 that stores settings corresponding to each user, settings corresponding to the login user can easily be reflected. This is especially effective when the user cannot write a configuration file in the storage device of the personal computer because of limitations for the sake of security. The present invention is also applicable to a computer capable of writing a configuration file in the storage device of its own, as a matter of course.

When a setting is changed, the setting change is reflected on the configuration file stored in the scanner device 106. Hence, even when the computer connected to the scanner device 106 has changed, the user can read out and use new set contents that would be appropriate for the user's application purpose.

<Eighth Embodiment>

In the sixth or seventh embodiment, the settings of the scanner device or application are changed in accordance with the identification information of the computer or user. Especially, the identification information is information held in the operating system 101. However, another identification information may be used to switch the individual settings.

FIG. 28 is a view showing an example of a user interface displayed when a capture application 210 is activated. In this case, identification information (individual setting name) to identify individual settings is an arbitrary character string (for example, my setting α) the user has input using the keyboard. Hence, a configuration file 1612 employs UserSettingName in place of ComputerName or UserName.

UserSettingName representing the individual setting name describes an arbitrary character string (for example, my setting α) the user has input using the keyboard. If a plurality of individual setting names exist in the configuration file 1612, the individual setting can be switched using a pull-down menu. To create a new individual setting, the user selects "new setting" from the pull-down menu instead of "my setting α", and inputs a new individual setting name via a dialog. A CPU 121 adds, to the configuration file, the new individual setting name input via the dialog and various kinds of corresponding set contents. An arbitrary constituent element of the above-described embodiments may be added to another embodiment, and this is also incorporated in the present invention. For example, the configuration file may include a mixture of setting information identified by ComputerName and setting information identified by UserName. In addition, some or all components of the present invention may be implemented by software to be executed by one or a plurality of CPUs.

Note that the application 210 for FAT uses Windows32API to obtain HostName, MacAdress and UserName. However, the application 215 for ext2 uses a shell utility command "hostname" to obtain HostName, uses a network utility command "ifconfig" to obtain MacAdress, and uses a shell utility command "whoami" to obtain UserName. By this way, the application 215 for ext2 can conduct the same process as that the application 210 for FAT does.

<Ninth Embodiment>

Conventionally, an image reading device connected to an external control device such as a personal computer activates a dedicated application on the personal computer or the like so as to register reading settings to be used for reading execution and then execute reading (Japanese Patent Laid-Open No. 2001-008002). When executing reading by activating the application on the personal computer or the like from a user interface such as a switch provided on the device, the image reading device can read a document using settings previously registered in the external control device such as the personal computer.

However, before the user executes image reading, the above-described conventional image reading device requires a number of processes of connecting the device to an external control device such as a personal computer, registering reading settings by activating the dedicated application, and then issuing a reading execution command to start reading. That is, the user needs to install the driver for the image reading device, install the dedicated application, and register reading settings from the dedicated application before execution of image reading.

The application on the external control device may be activated automatically via a user interface such as a reading execution switch provided on the device so as to perform reading by one-touch operation. In this case, however, the user cannot know in advance the current settings to be used for reading.

The present invention has been made in consideration of the above-described problems, and has a feature of providing an image reading device easily operable using internally stored reading settings and capable of confirming/changing the stored reading settings.

An image reading device of the present invention is an image reading device including an image reading unit which reads an image from a document, and a communication unit which sends the image to an external control device, comprising a setting storage unit which stores reading setting information concerning image reading, and a control unit which, in accordance with connection of the image reading device to the external control device, controls to send information to the external control device via the communication unit so as to cause the external control device to recognize the setting storage unit as an external storage device and then controls to send the reading setting information in the setting storage unit to the external control device via the communication unit.

The image reading device may further comprise a program storage unit which stores a program that reads out the reading setting information and displays it on the external control device. The control unit may control to send the program to the external control device via the communication unit in accordance with connection of the image reading device to the external control device.

The image reading device may have an auto-run information file configured to instruct the external control device to automatically activate the program loaded to it.

The program may display the reading setting information on a display unit provided on the external control device.

The image reading device may have control software which causes the external control device to control the image reading device when loaded to the external control device and executed without being installed in it.

The image reading device may comprise a software storage unit which stores control software configured to cause the external control device to control the image reading device when loaded to the external control device and executed, and a control unit which, in accordance with connection of the image reading device to the external control device, controls to cause the external control device to recognize the image reading device as an external storage device and controls to allow the external control device to load the software stored in the software storage unit.

A control method of the present invention is a method of controlling an image reading device including an image reading unit which reads an image from a document, and a communication unit which sends the image to an external control device. The image reading device may further include a setting storage unit which stores reading setting information concerning image reading. The method comprises the step of, in accordance with connection of the image reading device to the external control device, controlling to send information to the external control device via the communication unit so as to cause the external control device to recognize the setting storage unit as an external storage device and then controlling to send the reading setting information in the setting storage unit to the external control device via the communication unit.

According to the present invention, when the image reading device is connected to an external control device such as a personal computer, the display unit of the external control device displays current reading setting based on data stored in the storage unit incorporated in the image reading device. This enables the user to know the reading setting to be used for the operation of the image reading device without any special operation.

Figure 30:
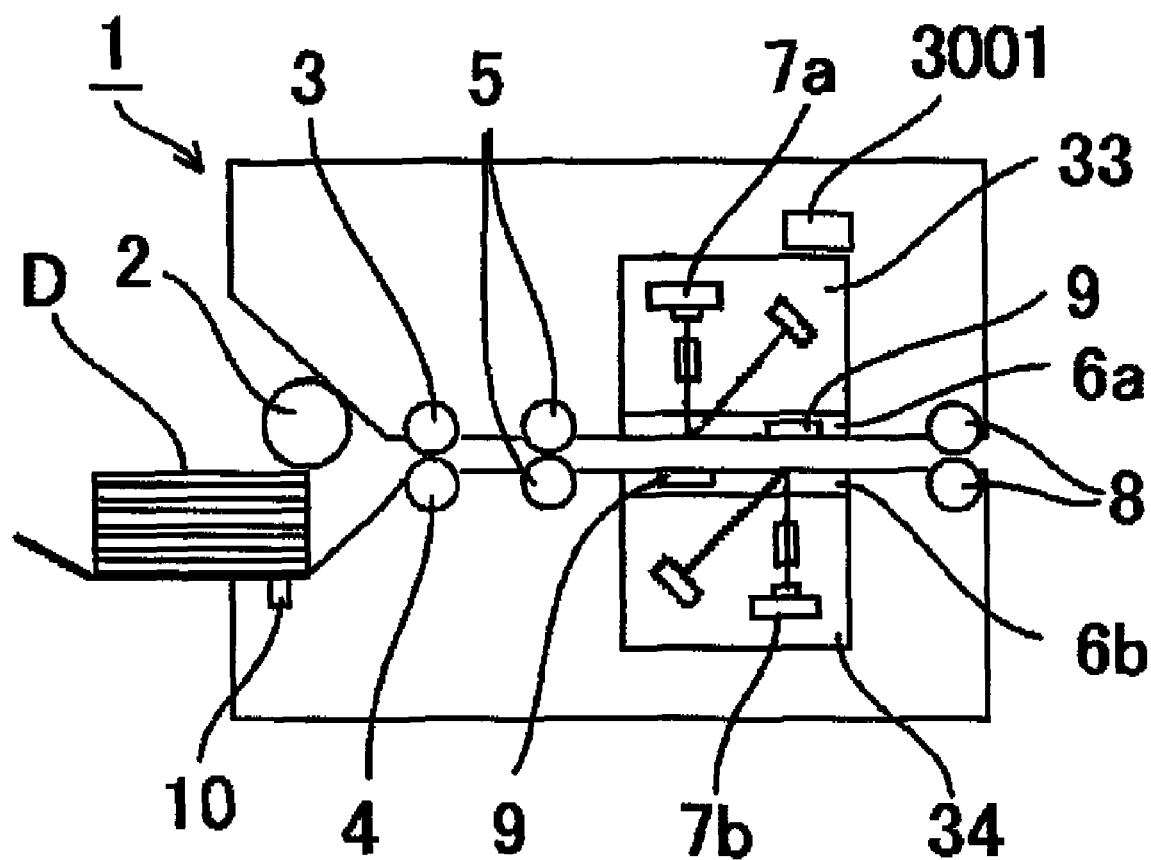
FIG. 30 is a schematic view showing the internal structure of the image reading device.

FIG. 30 is a sectional view schematically showing the overall arrangement of the image reading device according to the embodiment of the present invention. An image reading device 1 includes a pickup roller 2 which picks up document sheets D, a feed roller 3 which feeds the document sheets D picked up by the pickup roller 2 into the device, a separation roller 4 which separates each of the document sheets D picked up, and a document detection sensor 10 which detects whether document sheets are loaded. The image reading device 1 also includes a registration roller pair 5 to convey the document sheet D.

An image reading unit 33 which reads the obverse surface of the document includes a line image sensor 7a which reads the obverse surface image information of the document sheet D via a contact glass 6a, and a counter member 9 formed from a white board. An image reading unit 34 which reads the reverse surface of the document includes a line image sensor 7b which reads the reverse surface image information of the document sheet D via a contact glass 6b, and the counter member 9, and is controlled by a scanner control unit 3001 together with the image reading unit 33. The image reading device 1 includes a conveyance roller pair 8 disposed downstream the image reading units 33 and 34.

The image reading device feeds the document sheets D inside by the pickup roller 2 and the feed roller 3, and separates each sheet by the separation roller 4. The document sheet D is conveyed while being sandwiched by the registration roller pair 5 and the conveyance roller pair 8 so that the image reading unit 33 reads the image in the main scanning direction (the direction almost perpendicular to the document conveyance direction).

Figure 31:
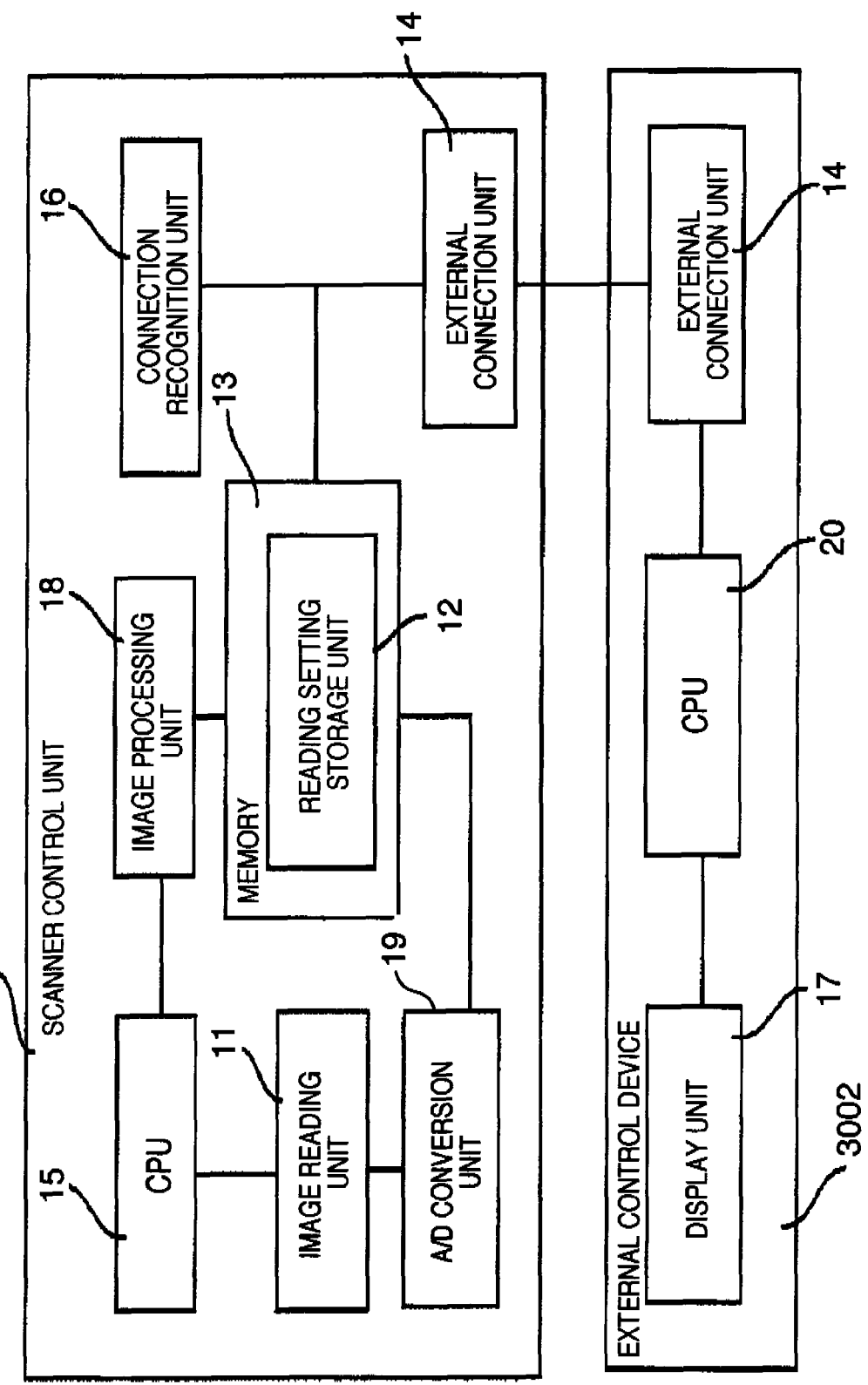
FIG. 31 is a block diagram for explaining the schematic arrangement of the control system of the image reading device.

FIG. 31 is a block diagram for explaining the schematic arrangement of the scanner control unit 3001 of the image reading device 1 and an external control device 3002 such as a personal computer. The scanner control unit 3001 includes an image reading unit 11, an A/D conversion unit 19, an image processing unit 18, a CPU 15 functioning as the control center, a memory 13 for temporarily storing image data, a connection recognition unit 16, and an external connection unit 14. A reading setting storage unit 12 is provided in the memory 13. The memory 13 is an example of the setting storage unit. The external connection unit 14 is an example of the communication unit.

The external control device 3002 includes the external connection unit 14, a CPU 20 serving as a control unit, and a display unit 17. Setting information stored in the reading setting storage unit 12 is read out to the external control device 3002, as will be described later. Under the control of the external control device 3002 based on the settings, the image reading unit 11 of the scanner control unit 3001 sends a color or gray image signal from the image reading unit 33 or 34 to the A/D conversion unit 19. The A/D conversion unit 19 performs A/D conversion to convert the received analog electrical signal into a digital electrical signal. The image data generated by the A/D conversion unit 19 is sent to the image processing unit 18. The image processing unit 18 performs shading correction for each pixel of the image data so as to correct sensitivity unevenness of the line image sensor and image processing based on the settings stored in the reading setting storage unit 12. After that, the image data is transferred to the external control device 3002 via the external connection unit 14 formed from a general-purpose USB or SCSI.

Note that the memory 13 stores firmware to be executed by the CPU 15. The CPU 15 controls the device while reading out the program commands of the firmware from the memory 13. The memory 13 also functions to temporarily store image data processed by the image processing unit 18.

Figure 33:
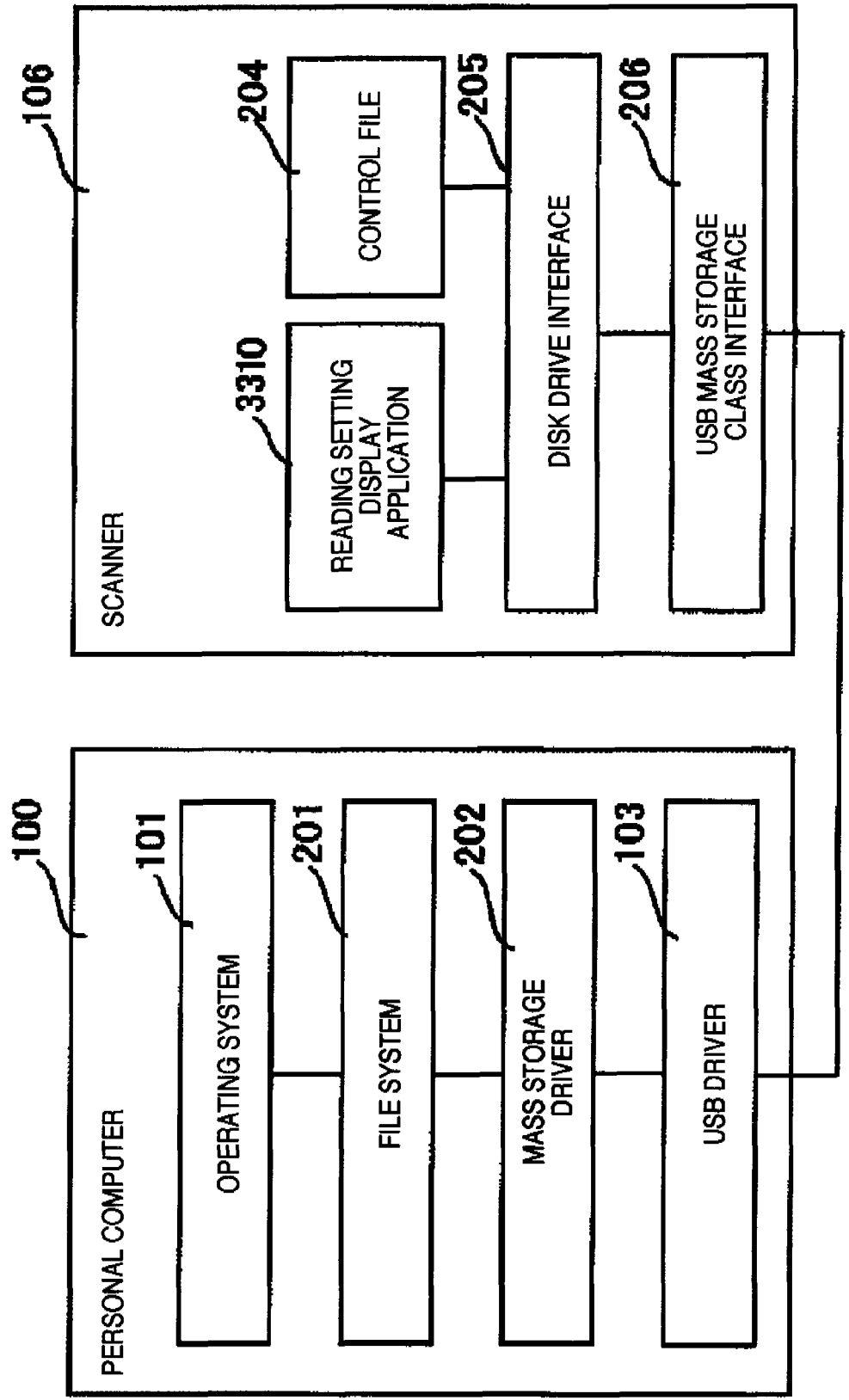
FIG. 33 is a block diagram of control software according to the typical embodiment of the present invention.

A more detailed configuration of control software will be described with reference to FIG. 33. An operating system 101, file system 201, USB mass storage driver 202, and USB interface driver 103 are installed in a personal computer 100 in FIG. 33 that is an example of the external control device 3002. The operating system 101 is a so-called OS serving as the fundamental software of the personal computer 100.

The file system 201 is software configured to store files in a storage device such as a hard disk drive. The software is activated by the CPU 20 serving as a control unit in FIG. 31. The USB mass storage driver 202 is software configured to control a mass storage such as a hard disk drive, CD-ROM, DVD-ROM, CD-R, DVD-R, or USE memory. The USB interface driver 103 is software configured to control a USB device connected to a USB interface. These pieces of software correspond to the external connection unit 14 in FIG. 31, and may be part of the OS.

On the other hand, the scanner device 106 that is an example of the image reading device includes a reading setting display application 3310, control file 204, USB disk drive interface 205, and USB mass storage class interface 206. The reading setting display application 3310 is a program which is loaded to the personal computer 100 and executed to enable change and display of the contents of image reading setting data currently stored in the scanner device 106. The memory 13 is an example of a program storage unit which stores a program such as the reading setting display application 3310.

The control file 204 is stored in, for example, the memory 13 to cause the personal computer 100 which loads, from the image reading device, the reading setting display application 3310 or a control program (not shown) to control the image reading device and executes it to write a control command and the like or transfer data. The USB disk drive interface 205 is software configured to use a memory (for example, flash memory or EEPROM) provided in the scanner device 106 as a disk drive. The USB mass storage class interface 206 is software configured to use the memory as a USB mass storage via the USB disk drive interface 205.

Note that a commercially available scanner device has a USB scanner class interface in place of the control software and the USB disk drive interface. Hence, it is necessary to install a dedicated scanner driver in the personal computer. In the present invention, the USB scanner class interface is not always necessary. In addition, the personal computer does not always need the dedicated scanner driver.

In the scanner device 106 shown in FIG. 2, the reading setting display application 3310 is stored in a ROM 127 or a RAM 203 corresponding to the memory 13 in FIG. 31 in advance. The control file 204 to be used to transfer a control command to control the scanner device 106 is stored in the RAM 203 or the like in advance. The ROM 127 or RAM 203 can be implemented by arbitrarily combining a flash memory, EEPROM, DRAM, and the like.

The reading setting display application 3310 is a program which is loaded to the personal computer 100 and runs on the operating system 101 to cause a display 126 of the personal computer 100 to display image reading setting information in the scanner device 106. The personal computer 100 forms, in a file folder associated with the file system 201, a table corresponding to the control file 204 and the reading setting display application 3310 stored in the scanner device 106.

Figure 29:
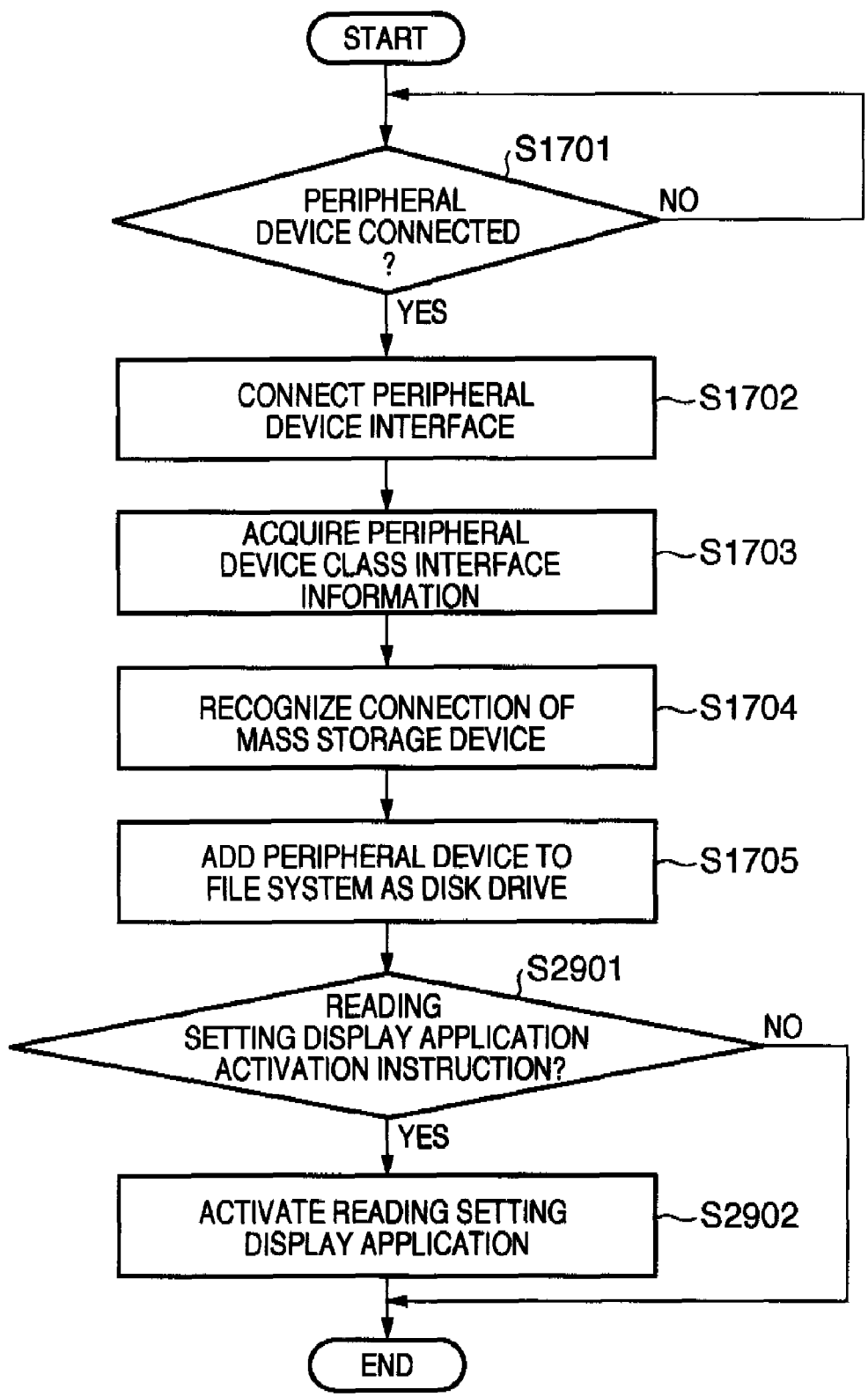
FIG. 29 is a flowchart illustrating causing the display unit of an external control device to display settings of the image reading device.

The operation of the present invention will now be described with reference to the flowchart of FIG. 29. FIG. 29 is a flowchart showing processing of displaying the image reading settings of the scanner device 106 using the reading setting display application 3310 from the personal computer 100. The CPU 20 of the personal computer 100 determines whether the scanner device 106 is connected (step S1701). The CPU 20 connects the scanner device 106 as a peripheral device class interface (step S1702). The CPU 20 acquires peripheral device class interface information from the scanner device 106 (step S1703). This information allows to recognize the type of connected peripheral device.

As described above, the scanner device 106 has the USB mass storage interface. For this reason, when the scanner device 106 is connected to the personal computer 100, the CPU 20 recognizes that a USB mass storage device is connected (step S1704). The scanner device 106 has the USB disk drive interface 205 as the subclass of the USB mass storage class interface 206. For this reason, the CPU 20 recognizes the connected scanner device 106 as a disk drive.

The operating system 101 forms, in a file folder associated with the file system 201, a table corresponding to the control file 204 and the reading setting display application 3310 stored in the scanner device 106. This allows the CPU 20 to handle the control file 204 and the reading setting display application 3310 stored in the scanner device 106 as files on a disk drive assigned a drive letter (step S1705). This is because the scanner device 106 is recognized as a disk drive assigned a drive letter by the OS.

The CPU 20 determines whether an instruction to activate the reading setting display application 3310 exists (step S2901). This instruction is done by describing the file name of the reading setting display application 3310 in, for example, autorun.inf that is an example of an auto-run information file stored in the memory 13 shown in FIG. 31 or the like. For example, in the Microsoft Windows® operating system, when a CD-ROM is inserted into a USB-CD device such as a USB-CD-ROM drive or USB-CD-RW drive, the CPU detects a file called "autorun.inf" on the CD-ROM, and executes a file designated to automatically run in "autorun.inf". Hence, the file name of the reading setting display application 3310 needs to be described in autorun.inf such that the application is recognized as the program to automatically run.

Upon recognizing that there is an instruction to activate the reading setting display application 3310 serving as a program to change/display reading settings (YES in step S2901), the CPU 20 loads the reading setting display application stored in the memory 13 of the scanner device 106 or the like to a RAM 124, and activates it (step S2902). When the reading setting display application is activated, the display 126 of the personal computer 100 displays the current reading settings as shown in FIG. 32. Upon recognizing that there is no instruction to activate the reading setting display application 3310 (NO in step S2901), the processing ends.

An operation to be performed when the image reading device can store a plurality of pieces of reading setting information will be described next. Note that the control configuration is the same as described above.

Figure 34:
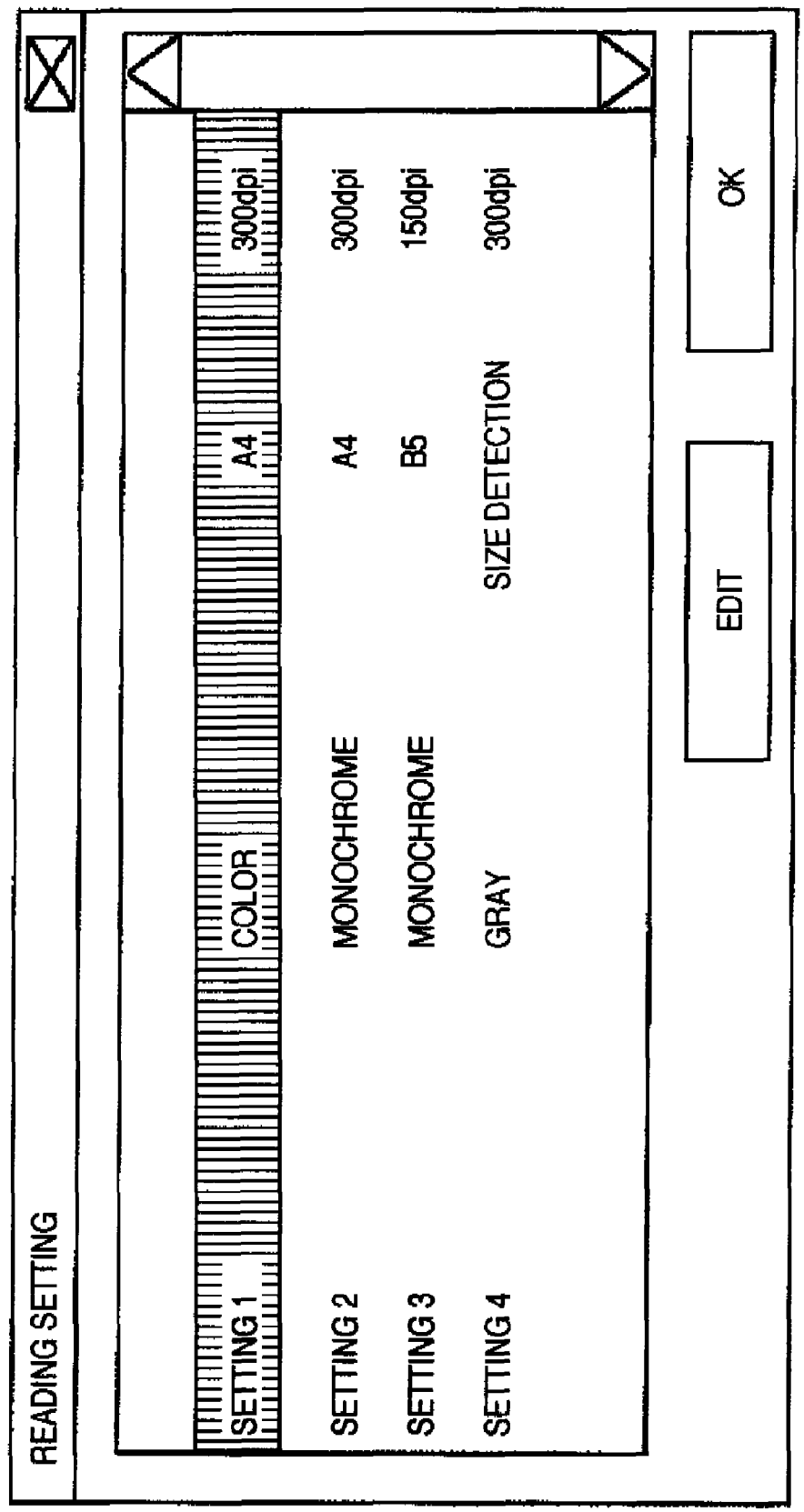
FIG. 34 is a view of a screen which displays a plurality of reading settings.

When the image reading device stores a plurality of reading settings, a reading setting screen as shown in FIG. 34 is displayed upon activating the above-described reading setting display application. The user can select a reading setting to be used for actual image reading from the plurality of existing reading settings displayed by the reading setting display application. The reading setting storage unit 12 stores which reading setting is currently selected. The image reading unit 11 performs reading in accordance with the selected reading setting.

The reading setting display application can rewrite the contents of reading settings currently stored in the image reading device. It is therefore possible to change the reading settings of the image reading device by the automatically activated reading setting display application without installing an application for reading setting in the external control device. The reading setting display application functions when being activated without installation. The reading setting display application may be installed, as a matter of course.

Figure 35:
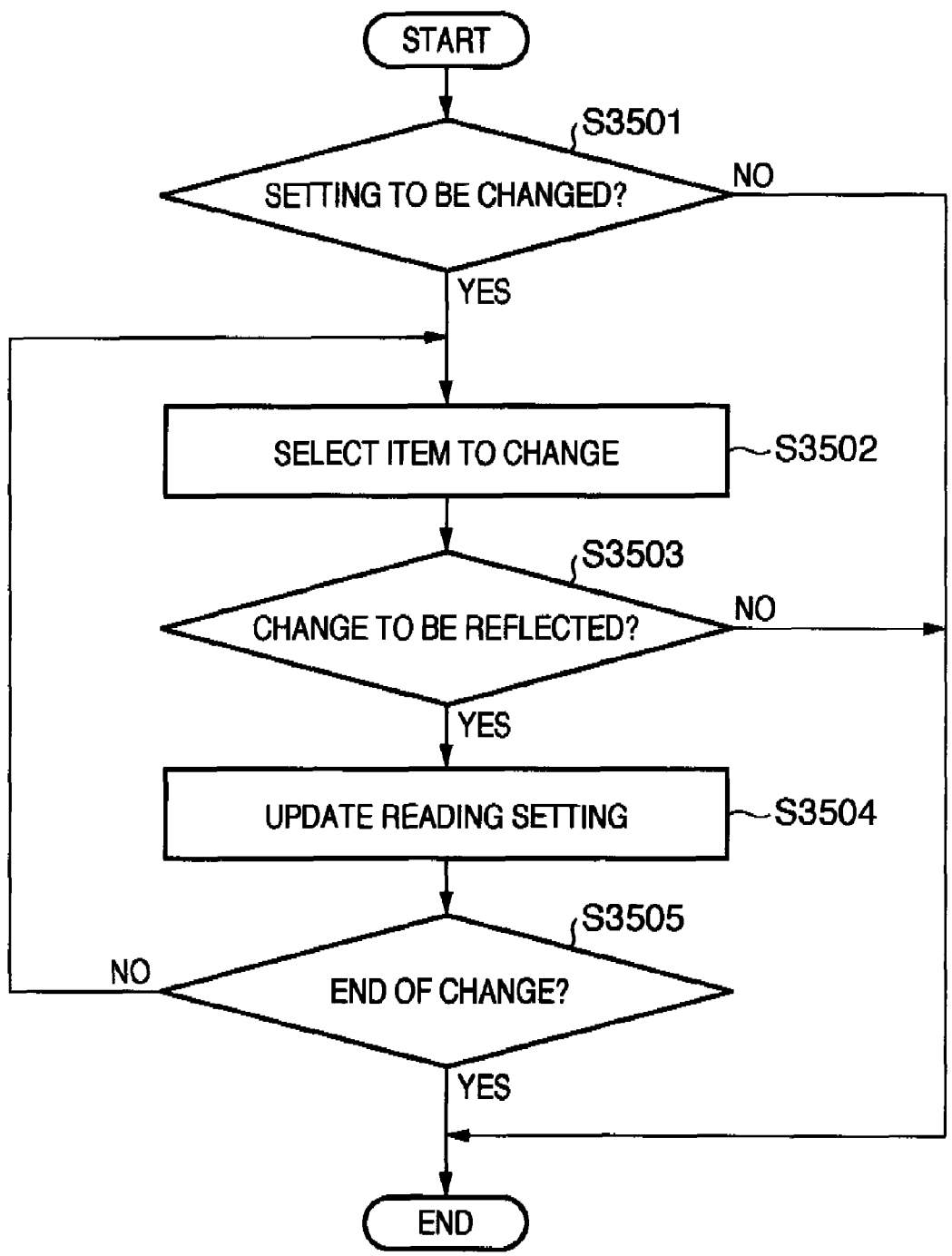
FIG. 35 is a flowchart illustrating an operation of changing the reading settings.

The reading setting rewrite operation will be described with reference to the flowchart of FIG. 35. When the reading setting display application as shown in FIG. 32 is activated, and it is determined that the user has performs the setting change operation (YES in step S3501), the CPU accepts the user operation of selecting an item (for example, resolution) to be changed from the reading setting display application (step S3502). Note that the reading setting display application has a function of displaying, on the screen of the display 126, set values at which the image reading device can operate as choices.

The user can select and temporarily determine, by operating a keyboard/mouse 125 or the like, a preferable set value from the choices displayed on the screen of the display 126 by the reading setting display application. If the user performs an operation of discarding the set value change without reflecting (NO in step S3503), the application ends. If the user performs an operation of reflecting the change, the set value is registered in the reading setting storage unit 12 as the current reading setting (step S3504). If there is a setting item yet to be changed, and the user does not perform the operation of ending the reading setting display application (NO in step S3505), the operation in steps S3502 to S3505 is repeated. The reading setting display application immediately displays the changed reading setting as the current reading setting.

Note that the setting items to be changed are not limited to the mode, size, reading surface, resolution, and saving destination in FIG. 32. The external control device controls the image reading device based on the thus changed reading setting contents to read an image. Note that instead of causing the external control device to control the image reading device based on the reading setting contents, the image reading device may execute image reading based on internally stored reading setting contents or changed and stored reading setting contents. As described above, it is possible to use the image reading device based on various reading settings without installing, in the external control device, a driver dedicated to the image reading device or an application that enables to change reading settings. When the image reading device is connected to the external control device such as a personal computer without the driver and application installed, the current reading setting stored in the reading setting storage unit of the image reading device recognized as an external storage device can be read out and displayed. Additionally, a plurality of reading settings can be read out and displayed. This allows the user to know the current reading setting and the available reading settings without any special operation.

As described above, according to the present invention, when the image reading device is connected to the external control device, a program to change/display reading settings stored in the image reading device is loaded to the external control device and displayed. Hence, it is possible to confirm or change the reading settings stored in the image reading device from the external control device without installing the program.

This enables even a general user without administrator authority to confirm or change the current reading setting of the image reading device. Since the program necessary for changing/displaying reading settings is stored in the program storage unit of the image reading device, the problem that the device becomes unusable because of missing of a CD-ROM can be solved.

The image reading device of the present invention may cause a software storage unit to store and hold the control software to be executed by the external control device to use the image reading device. When the image reading device is connected to the external control device via the communication unit, the control unit may control to cause the external control device to recognize the software storage unit as its external storage device and also control to cause the external control device to load the control software stored in the software storage unit and activate the software. Note that the software storage unit can be either identical to or different from the above-described storage unit. The reading setting display application may be incorporated in the above-described control software.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-267149, filed Nov. 25, 2009, and Japanese Patent Application No. 2010-056531, filed Mar. 12, 2010 which are hereby incorporated by reference herein in their entirety.

What is claimed is:

1. A peripheral device comprising:
a connection unit connected to an information processing apparatus;
a processing unit which executes predetermined processing based on a control signal from the information processing apparatus;
a communication unit which communicates with the information processing apparatus via said connection unit; and
a storage unit having a plurality of storage areas, said storage unit including:
a first storage area which stores a plurality of control programs corresponding to a plurality of operating systems of different types for information processing apparatuses;
a second storage area which is recognized by the information processing apparatus as an external storage device and in which at least one control program is replicated from the first storage area;
a control unit which controls to cause the information processing apparatus to recognize the second storage area as the external storage device; and
a connection detection unit which detects that said connection unit is connected to the information processing apparatus,
wherein the peripheral device is controlled by the information processing apparatus which reads out the control program from the second storage area recognized by the information processing apparatus as the external storage device and executes the control program, and
when said connection detection unit detects that said connection unit is connected to the information processing apparatus, said control unit controls to replicate at least one of the control programs from the first storage area to the second storage area.

2. The device according to claim 1, further comprising:
an image reading unit which functions as said processing unit; and
a reading control unit which controls said image reading unit,
said reading control unit controlling to sequentially write image data read by said image reading unit in the second storage area.

3. The device according to claim 1, further comprising:
an image forming unit which functions as said processing unit; and
an image formation control unit which controls said image forming unit,
said image formation control unit reading out data of an image formation job written in said storage unit by the information processing apparatus and transferring the data to said image forming unit so as to cause said image forming unit to execute image formation processing.

4. A peripheral device comprising:
a connection unit connected to an information processing apparatus;
a processing unit which executes predetermined processing based on a control signal from the information processing apparatus;
a communication unit which communicates with the information processing apparatus via said connection unit; and
a storage unit having a plurality of storage areas, said storage unit including:
a first storage area which stores a plurality of control programs corresponding to a plurality of operating systems of different types for information processing apparatuses;
a second storage area which is recognized by the information processing apparatus as an external storage device and in which at least one control program is replicated from the first storage area; and
a control unit which controls to cause the information processing apparatus to recognize the second storage area as the external storage device, wherein
the peripheral device is controlled by the information processing apparatus which reads out the control program from the second storage area recognized by the information processing apparatus as the external storage device and executes the control program, the first storage area stores a disk image of a common and single file system accessible by at least two of the plurality of operating systems, and said control unit rasterizes the disk image on the second storage area.

5. The device according to claim 4, wherein the disk image includes a control file in which the information processing apparatus can write a control command configured to control said processing unit.

6. The device according to claim 5, further comprising:
a monitoring unit which monitors whether the information processing apparatus has written the control command in the control file rasterized on the second storage area; and
an execution unit which, when the control command is written in the control file, reads out and executes the control command.

7. The device according to claim 4, wherein
a FAT file system is rasterized on the second storage area, and
the FAT file system stores a control program for Microsoft Windows® and a control program for MacOS®.

8. The device according to claim 4, further comprising:
an image reading unit which functions as said processing unit; and
a reading control unit which controls said image reading unit,
said reading control unit controlling to sequentially write image data read by said image reading unit in the second storage area.

9. The device according to claim 4, further comprising:
an image forming unit which functions as said processing unit; and
an image formation control unit which controls said image forming unit,
said image formation control unit reading out data of an image formation job written in said storage unit by the information processing apparatus and transferring the data to said image forming unit so as to cause said information unit to execute image formation processing.

10. A peripheral device comprising:
a connection unit connected to an information processing apparatus;
a processing unit which executes predetermined processing based on a control signal from the information processing apparatus;
a communication unit which communicates with the information processing apparatus via said connection unit; and
a storage unit having a plurality of storage areas,
said storage unit including:
a first storage area which stores a plurality of control programs corresponding to a plurality of operating systems of different types for information processing apparatuses;
a second storage area which is recognized by the information processing apparatus as an external storage device and in which at least one control program is replicated from the first storage area and
a control unit which controls to cause the information processing apparatus to recognize the second storage area as the external storage device, wherein
the peripheral device is controlled by the information processing apparatus which reads out the control program from the second storage area recognized by the information processing apparatus as the external storage device and executes the control program, the first storage area stores disk images of a plurality of file systems corresponding to the plurality of operating systems, respectively, and said control unit rasterizes, on the second storage area, the disk image corresponding to the operating system running on the information processing apparatus.

11. The device according to claim 10, further comprising a system switching unit which switches the file system in the second storage area in accordance with the operating system of the information processing apparatus connected to said connection unit,
wherein said control unit causes the information processing apparatus to recognize the file system switched by said system switching unit as the external storage device.

12. The device according to claim 11, wherein said system switching unit is operable by an operator.

13. The device according to claim 10, wherein said control unit comprises a discrimination unit which discriminates the type of operating system running on the information processing apparatus, and based on a discrimination result of said discrimination unit, rasterizes the disk image corresponding to the operating system running on the information processing apparatus from the first storage area to the second storage area.

14. The device according to claim 13, wherein said discrimination unit discriminates the type of operating system running on the information processing apparatus in accordance with Java® Script replicated from the first storage area to the second storage area.

15. The device according to claim 10, wherein
the second storage area includes
a first partition, and
a second partition,
the first partition storing a file system of FAT, and
the second partition storing a file system of HFS.

16. The device according to claim 10, further comprising:
an image reading unit which functions as said processing unit; and
a reading control unit which controls said image reading unit,
said reading control unit controlling to sequentially write image data read by said image reading unit in the second storage area.

17. The device according to claim 10, further comprising:
an image forming unit which functions as said processing unit; and
an image formation control unit which controls said image forming unit,
said image formation control unit reading out data of an image formation job written in said storage unit by the information processing apparatus and transferring the data to said image forming unit so as to cause said image forming unit to execute image formation processing.

18. An information processing system comprising an information processing apparatus and a peripheral device connected to said information processing apparatus,
said peripheral device comprising a connection unit connected to said information processing apparatus, a processing unit which executes predetermined processing based on a control signal from said information processing apparatus, a communication unit which communicates with said information processing apparatus via said connection unit, and a storage unit having a plurality of storage areas, and said storage unit including a first storage area which stores a plurality of control programs corresponding to a plurality of operating systems of different types for information processing apparatuses, and a second storage area which is recognized by said information processing apparatus as an external storage device and in which at least one control program is replicated from the first storage area, said peripheral device further comprising a control unit which controls to cause the information processing apparatus to recognize the second storage area as the external storage device and a connection detection unit which detects that said connection unit is connected to the information processing apparatus, wherein said information processing apparatus reads out the control program from the second storage area recognized as the external storage device and executes the control program, thereby controlling said peripheral device, and when said connection detection unit detects that said connection unit is connected to the information processing apparatus, said control unit controls to replicate at least one of the control programs from the first storage area to the second storage area.

19. An information processing system comprising an information processing apparatus and a peripheral device connected to said information processing apparatus, said peripheral device comprising a connection unit connected to said information processing apparatus, a processing unit which executes predetermined processing based on a control signal from said information processing apparatus, a communication unit which communicates with said information processing apparatus via said connection unit, and a storage unit having a plurality of storage areas, and said storage unit including a first storage area which stores a plurality of control programs corresponding to a plurality of operating systems of different types for information processing apparatuses, and a second storage area which is recognized by said information processing apparatus as an external storage device and in which at least one control program is replicated from the first storage area, said peripheral device further comprising a control unit which controls to cause the information processing apparatus to recognize the second storage area as the external storage device, wherein said information processing apparatus reads out the control program from the second storage area recognized as the external storage device and executes the control program, thereby controlling said peripheral device, the first storage area stores a disk image of a common and single file system accessible by at least two of the plurality of operating systems, and said control unit rasterizes the disk image on the second storage area.

20. An information processing system comprising an information processing apparatus and a peripheral device connected to said information processing apparatus, said peripheral device comprising a connection unit connected to said information processing apparatus, a processing unit which executes predetermined processing based on a control signal from said information processing apparatus, a communication unit which communicates with said information processing apparatus via said connection unit, and a storage unit having a plurality of storage areas, and said storage unit including a first storage area which stores a plurality of control programs corresponding to a plurality of operating systems of different types for information processing apparatuses, and a second storage area which is recognized by said information processing apparatus as an external storage device and in which at least one control program is replicated from the first storage area, said peripheral device further comprising a control unit which controls to cause the information processing apparatus to recognize the second storage area as the external storage device, wherein said information processing apparatus reads out the control program from the second storage area recognized as the external storage device and executes the control program, thereby controlling said peripheral device, the first storage area stores disk images of a plurality of file systems corresponding to the plurality of operating systems, respectively, and said control unit rasterizes, on the second storage area, the disk image corresponding to the operating system running on the information processing apparatus.

* * * * *